United States Patent
Matsuo et al.

(10) Patent No.: US 10,114,310 B2
(45) Date of Patent: Oct. 30, 2018

(54) OPTICAL WRITING DEVICE AND IMAGE FORMING APPARATUS

(71) Applicant: Konica Minolta, Inc., Chiyoda-ku, Tokyo (JP)

(72) Inventors: Takahiro Matsuo, Toyokawa (JP); So Yano, Ibaraki (JP); Masayuki Iijima, Okazaki (JP); Takaki Uemura, Seto (JP); Akira Taniyama, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 133 days.

(21) Appl. No.: 15/337,662

(22) Filed: Oct. 28, 2016

(65) Prior Publication Data

US 2017/0123341 A1 May 4, 2017

(30) Foreign Application Priority Data

Oct. 30, 2015 (JP) ................. 2015-214712

(51) Int. Cl.
*G03G 15/043* (2006.01)
*H04N 1/06* (2006.01)
*H04N 1/29* (2006.01)
*G06K 7/10* (2006.01)

(52) U.S. Cl.
CPC ............ *G03G 15/043* (2013.01); *H04N 1/06* (2013.01); *H04N 1/29* (2013.01); *G06K 2007/10495* (2013.01)

(58) Field of Classification Search
CPC .......... G03G 15/043; G03G 15/04063; G03G 15/04054
See application file for complete search history.

(56) References Cited

U.S. PATENT DOCUMENTS

| | | | |
|---|---|---|---|
| 2006/0092264 A1 | 5/2006 | Matsuzaki et al. | |
| 2007/0024912 A1 | 2/2007 | Inoue et al. | |
| 2014/0300934 A1* | 10/2014 | Nakamura | H04N 1/405 358/3.13 |
| 2016/0209773 A1* | 7/2016 | Otani | G03G 15/043 |

FOREIGN PATENT DOCUMENTS

| | | |
|---|---|---|
| JP | 2006-123391 A | 5/2006 |
| JP | 2007-030383 A | 2/2007 |

* cited by examiner

*Primary Examiner* — Benjamin Schmitt
*Assistant Examiner* — Milton Gonzalez
(74) *Attorney, Agent, or Firm* — Buchanan Ingersoll & Rooney PC

(57) ABSTRACT

An optical writing device driving a light-emitting element array, modulating light according to a screening pattern that expresses a dithered image, and performing optical writing by focusing light emitted from the light-emitting element array through a lens array onto a photoreceptor. The optical writing device includes an acquisition unit that acquires a write start position for writing to the photoreceptor in a main scanning direction and a control unit that performs a control when the write start position corresponds to an i-th light-emitting element from a reference position that corresponds to a first light-emitting element in the main scanning direction, i being a positive integer greater than 1, wherein the control unit supplies pixel values to the i-th light-emitting element onwards, the pixel values being assigned from pixels of the screening pattern from an i-th pixel onwards, from a leading pixel of the screening pattern in the main scanning direction.

12 Claims, 33 Drawing Sheets

FIG. 29

| Cumulative print count Pa | 0 ≤ Pa < 1000 | 1000 ≤ Pa < 2000 | 2000 ≤ Pa < 3000 | ... |
|---|---|---|---|---|
| Screening extension start point Z | Light-emitting element A1 | Light-emitting element A2 | Light-emitting element A1 | ... |

OPTICAL WRITING DEVICE AND IMAGE FORMING APPARATUS

This application claims priority under the Paris Convention based on Japanese patent application No. 2015-214712 filed on Oct. 30, 2015, the contents of which are hereby incorporated by reference.

BACKGROUND OF THE INVENTION (1) Field of the Invention

The present invention relates to optical writing devices that perform optical writing on a photoreceptor by using a light beam, and image forming devices incorporating same.

(2) Related Art

Among image forming devices such as printers are image forming devices that have an optical head that focuses light beams emitted from a plurality of light-emitting elements through an optical lens, for example a rod-lens array, to expose a photoreceptor.

FIG. 39 is a schematic plan view showing positional relationships between light-emitting elements and a rod-lens array, when the light-emitting elements are viewed through the rod lens array from the photoreceptor.

As shown in FIG. 39, light-emitting elements 1 are arranged in a two-dimensional array, i.e., a plurality of light-emitting elements 1 are arranged in a light-emitting element row 901, which is a line along a main scanning direction, and a plurality of light-emitting element rows 901 are arranged along a sub scanning direction. Each of the light-emitting elements 1 emits a light beam towards a rod-lens array 910.

The rod-lens array 910 is an elongate member in which a plurality of rod lenses 911 are arranged in a zigzag pattern along the main scanning direction, each of the rod lenses 911 having a diameter greater than a diameter of one of the light-emitting elements 1. Light beams emitted from the light-emitting elements 1 are transmitted through the rod-lens array 910 and are focused on a photoreceptor surface.

Screening is known as one method of dithering to express a concentration of mid-range values of an image in binary values.

For example, as shown in FIG. 40A, when an image 602 of a uniform mid-range concentration is present on a page area 601 and screening is performed on the image 602, the image 602 is converted into a screening pattern 603 (output image) in which fine dots (black pixels) are arranged at a density corresponding to the concentration, as shown in FIG. 40B.

Specifically, the screening pattern 603 is a pattern image in which a plurality of pixels 9-1, 9-2, . . . , are arranged in a matrix along the main scanning direction and the sub scanning direction, in which filled pixels correspond to black pixels and unfilled pixels correspond to white pixels.

Each of the pixels 9-1, 9-2, . . . along the main scanning direction corresponds one-to-one with light-emitting elements 1-1, 1-2, . . . . By switching a light-emitting element between light-emitting and non-light-emitting (off) states, black and white pixels can be expressed.

In FIG. 40B, the page area 601 indicates an example for which a reference position R in a new image forming device is a write start position in the main scanning direction for writing an image on a photoreceptor.

For example, the write start position, due to execution of an image stabilizing operation for maintaining image quality above a certain level over a long period of time, may be changed from the reference position R when the device is new by a shift in the main scanning direction as required to maintain image quality.

FIG. 40C shows an example of the page area 601 when the write start position has shifted from the reference position R by a distance α in the main scanning direction. According to this example, the page area 601 is formed on the photoreceptor at a position shifted by the distance α in the main scanning direction.

Before and after change in the write start position, if the image 602 is the same, the whole of the screening pattern 603 shown in FIG. 40B can be expressed before and after change as the same gradation expression by using the screening pattern 605 shifted in the main scanning direction by the distance α, as shown in FIG. 40D.

However, the image 602 shown in FIG. 40A and the image 602 shown in FIG. 40C have different write start positions in the main scanning direction.

In other words, the screening pattern 603 shown in FIG. 40B is formed by light-emitting elements 1 in the main scanning direction from the light-emitting element 1-1 at the reference position R. In contrast, the screening pattern 605 shown in FIG. 40D is formed by light-emitting elements 1 in the main scanning direction from the light-emitting element 1-4, which is the fourth light-emitting element from the reference position R.

According to the shift in the write start position in the main scanning direction, pixels 9-4, and 9-5 of the screening pattern 603 are expressed as black pixels by the light-emitting elements 1-4 and 1-5, and pixels 9-4 and 9-5 of the screening pattern 605 are expressed as black pixels by the light-emitting elements 1-7 and 1-8, and therefore the same pattern and the same pixels are expressed by different light-emitting elements for the screening pattern 603 and the screening pattern 605.

FIG. 41A is an enlarged schematic diagram showing examples of shapes of beam spots 3 after light beams pass through the rod-lens array 910 and are focused on a photoreceptor when a plurality of the light-emitting elements 1 each emit a light beam of the same light intensity. FIG. 41B shows examples of waveforms of light intensity distribution of each of the beam spots 3 on the photoreceptor. Here, in FIG. 41A, a high light intensity portion of the beam spots 3 is indicated by a light color and a low light intensity portion is indicated by a dark color.

As indicated in FIG. 41A and FIG. 41B, each of the beam spots 3 on the photoreceptor have slightly different shapes and slightly different light intensity distributions according to where light beams emitted from the light-emitting elements 1 pass through the rod-lens array 910. This is because the rod-lens array 910, due to its structure, has optical properties that make transmittance of light beams different depending on where the light beams pass through the rod-lens array 910.

According to the optical properties of the rod-lens array 910, light emission amounts of each of the light-emitting elements 1 can be corrected by, for example, adjusting current supplied to each of the light-emitting elements 1, but it is difficult to correct the beam spots 3 so that shape and light intensity distribution of each becomes identical.

Accordingly, when, for example, the pixels 9-4 and 9-5 of the screening pattern 603 in FIG. 40B and the pixels 9-4 and 9-5 of the screening pattern 605 in FIG. 40D are expressed as black pixels, differences occur in the exposure amounts of the photoreceptor and in shapes of dots.

Differences occurring in exposure amounts of the photoreceptor means differences occur in concentration and shape of the black pixels before and after the change in write start position.

Thus, even if an input image is the same, there is a problem of variance occurring in concentration and shape of black pixels constituting a screening pattern before and after the change in write start position.

A screening pattern simulates expression of gradation by using only black pixels, i.e., by dot arrangement, and therefore according to the size of the variance in dot concentration and shape, there is a risk of a user perceiving different gradation in a visual comparison of the same input image when the image is expressed by using a screening pattern according to screening processing before the change in write start position and when the image is expressed by using the screening pattern according to screening processing after the change in write start position.

The occurrence of this problem is not limited to when image stabilizing operations are performed, and may occur, for example, when the write start position in the main scanning direction is changed according to a user's instructions.

SUMMARY OF THE INVENTION

An aim of the present invention is to provide an optical writing device and an image forming device that can suppress variance in concentration of a screening pattern caused by changes in write start position, according to a configuration used in screening processing.

To achieve at least the abovementioned aim, an optical writing device reflecting one aspect of the present invention is an optical writing device that drives a light-emitting element array of light-emitting elements, modulating light emitted therefrom according to a screening pattern that expresses an image as a dithered image, the optical writing device performing optical writing by focusing light emitted from the light-emitting element array through a lens array onto a surface of a photoreceptor, the optical writing device comprising: an acquisition unit that acquires a write start position for writing to the photoreceptor in a main scanning direction; and a control unit that performs a control when the write start position corresponds to an i-th light-emitting element of the light-emitting element array, counting from a reference position that corresponds to a first light-emitting element in ascending numerical order of the light-emitting elements in the main scanning direction, i being a positive integer greater than 1, wherein the control unit supplies pixel values to the i-th light-emitting element onwards, the pixel values being assigned from pixels of the screening pattern from an i-th pixel onwards, counting from a leading pixel in ascending numerical order of the screening pattern in the main scanning direction.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 29 shows a relationship between cumulative print count and screening extension start point.

DESCRIPTION OF PREFERRED EMBODIMENTS

Hereinafter, an embodiment of the present invention will be described with reference to the drawings. However, the scope of the invention is not limited to the illustrated examples.

Embodiments of an optical writing device and image forming device pertaining to the present invention are described below by using a tandem-type color printer (hereinafter, "printer") as an example thereof.

Embodiment 1

Overall Configuration of Printer

Figure 1:
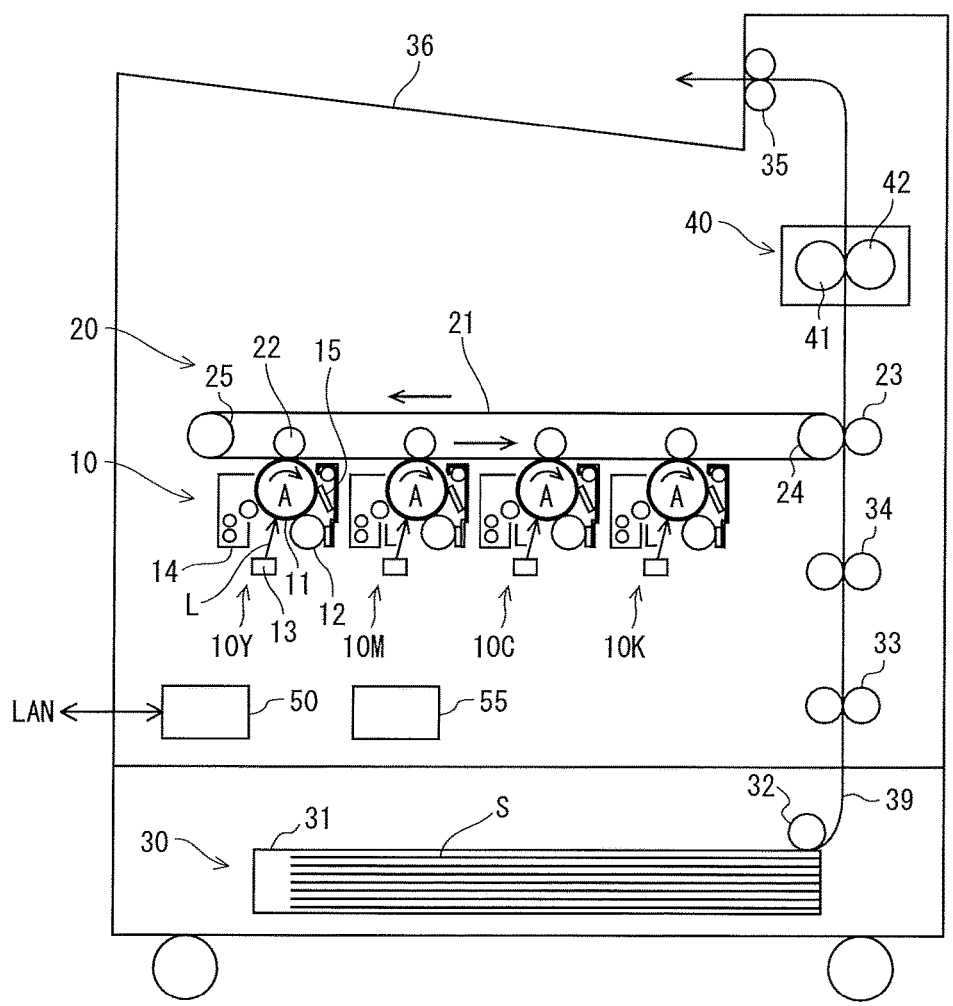
FIG. 1 shows a configuration of a printer pertaining to embodiment 1.

FIG. 1 is a schematic diagram showing an overall configuration of a printer pertaining to the present embodiment.

As shown in FIG. 1, the printer forms images by an electrophotographic system and includes an image processing unit 10, an intermediate transfer unit 20, a feeder unit 30, a fixing unit 40, a control unit 50, and an image processor 55. The printer executes color image forming (printing) based on execution of job requests from an external terminal device (not illustrated) via a network (for example, a LAN).

The image processing unit 10 includes imaging units 10Y, 10M, 10C, 10K, corresponding to developer colors yellow (Y), magenta (M), cyan (C), and black (K).

The imaging unit 10Y includes a photoreceptor drum 11 as an image carrier, and a charger 12, an exposure unit 13, a developer unit 14, a cleaner 15, etc., arranged around the photoreceptor drum 11.

The charger 12 charges a surface of the photoreceptor drum 11 while it rotates in the direction indicated arrow A.

The exposure unit 13 exposes the charged photoreceptor drum 11 by using a light beam L, in order to form an electrostatic latent image on the photoreceptor drum 11. The exposure unit 13 includes a plurality of current-driven organic EL elements, also referred to as OLEDs, disposed in a zigzag pattern along a rotational axis direction of the photoreceptor drum 11 (hereinafter, "main scanning direction") and included in a print head arranged on a substrate. Hereinafter, OLEDs are referred to as light-emitting elements. Configuration of print heads is described later.

The developer unit 14 develops the electrostatic latent image on the photoreceptor drum 11 by using yellow toner. Thus, a yellow toner image is formed on the photoreceptor drum 11 and the yellow toner image is transferred ("primary transfer") onto an intermediate transfer belt 21 of the intermediate transfer unit 20. The cleaner 15 cleans off residual toner on the photoreceptor drum 11 after the primary transfer. The imaging units 10M, 10C, 10K have the same structure as the imaging unit 10Y, and reference signs for the imaging units 10M, 10C, 10K are omitted from FIG. 1.

The intermediate transfer unit 20 includes the intermediate transfer belt 21 that is suspended in a tensioned state by and rotated in a direction of travel indicated by arrows by a drive roller 24 and a driven roller 25, primary transfer rollers 22 that are each disposed opposite the photoreceptor drum 11 of the imaging units 10Y, 10M, 10C, 10K sandwiching the intermediate transfer belt 21, and a secondary transfer roller 23 disposed opposite the drive roller 24, with the intermediate transfer belt 21 therebetween.

The feeder unit 30 includes a cassette 31 that houses sheets, hereinafter collectively and individually referred to as sheets S and sheet S, a feed roller 32 that feeds the sheets S one sheet at a time to a transport path 39, and transport rollers 33, 34 that transport fed ones of the sheets S.

The fixing unit 40 includes a fixing roller 41 and a pressure roller 42 pressed against the fixing roller 41.

The control unit 50 centrally controls operations of the image processing unit 10, the intermediate transfer unit 20, the feeder unit 30, and the fixing unit 40, in order to smoothly execute jobs. When executing a job, the following operations are executed according to the control unit 50.

In other words, based on print image data included in a received job, a digital light intensity signal is generated by the image processor 55. The digital light intensity signal indicates light emission amount (luminance) for each of a plurality of light-emitting elements disposed in the exposure unit 13 of each of the imaging units 10Y, 10C, 10M, 10K. The digital light intensity signal is transmitted to the exposure unit 13.

In the exposure unit 13, the digital light intensity signal is converted to an analog voltage light intensity signal and light-emitting elements emit light beams L of light intensities based on the converted light intensity signal.

For each of the imaging units 10Y, 10M, 10C, 10K, an electrostatic latent image is formed on the photoreceptor drum 11 according to light beams L emitted from light-emitting elements of the exposure unit 13, the electrostatic latent image is developed by toner to form a toner image, and the toner image is transferred ("primary transfer") onto the intermediate transfer belt 21 by electrostatic action of the primary transfer roller 22.

Each color image forming operation by the imaging units 10Y, 10M, 10C, 10K is executed at staggered timings from upstream to downstream so that each color of toner image is transferred to superimpose onto the same position of the intermediate transfer belt 21 in motion.

In accordance with the timings of image forming, the sheet S from the cassette 31 is transported from the feeder unit 30 towards the secondary transfer roller 23 to arrive at the secondary transfer roller 23, and as the sheet S passes between the secondary transfer roller 23 and the intermediate transfer belt 21, the color toner images transferred onto and superimposed on the intermediate transfer belt 21 are collectively transferred ("secondary transfer") onto the sheet S by electrostatic action of the secondary transfer roller 23.

The sheet S after the secondary transfer of the color toner images is transported to the fixing unit 40, and as the sheet S passes between the fixing roller 41 and the pressure roller 42 of the fixing unit 40, the toner on the sheet S is fused and fixed by applied heat and pressure. The sheet S that has passed through the fixing unit 40 is discharged onto a discharge tray 36 by a discharge roller 35.

Print Head Schematic Configuration

Figure 2:
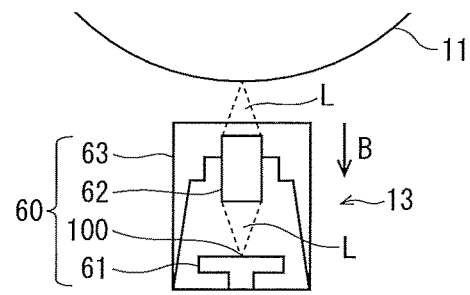
FIG. 2 shows a schematic configuration of a print head in an exposure unit of a printer.

FIG. 2 shows a schematic configuration of a print head 60 included in the exposure unit 13.

The print head 60, as shown in FIG. 2, includes an OLED panel 61, a rod-lens array 62, and a housing 63 housing these.

The OLED panel 61 has a light-emitting element array (light-emitting unit) 100 in which a plurality of light-emitting elements are disposed in a zigzag pattern along the main scanning direction. Each of the light-emitting elements emits a light beam L.

The rod-lens array 62 is disposed between the light-emitting element array 100 and the photoreceptor drum 11, light beams L emitted from each of the light-emitting elements pass through the rod-lens array 62 and are focused on the photoreceptor drum 11, which is disposed in a forward direction of light emission of the light-emitting element array 100.

OLED Panel Configuration

Figure 3:
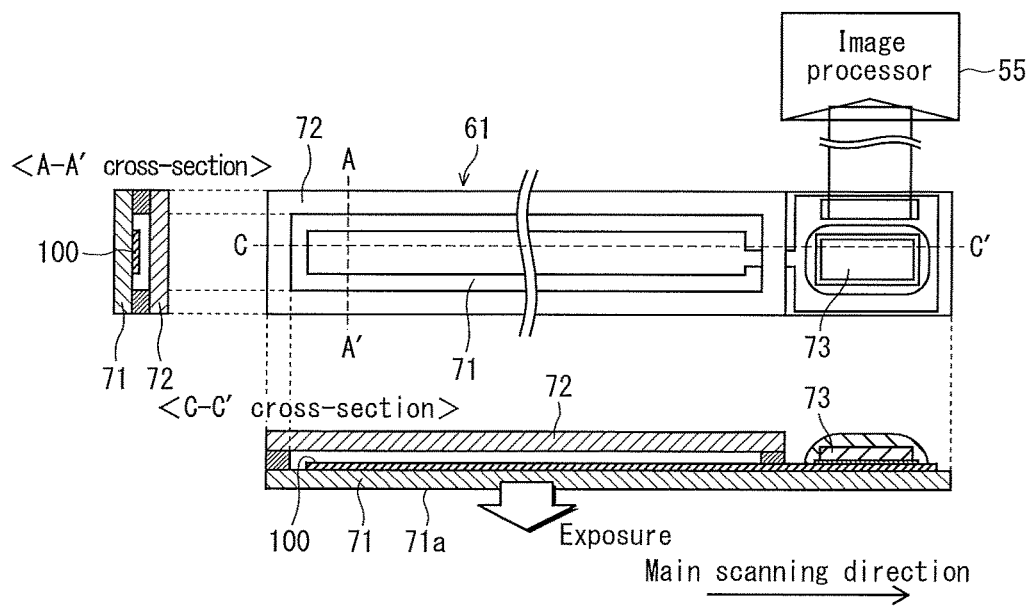
FIG. 3 includes a schematic plan view and cross-section of an OLED panel in a print head.

FIG. 3 shows a schematic plan view of the OLED panel 61, a cross-section taken along the line A-A', and a cross-section taken along the line C-C'.

As shown in FIG. 3, the OLED panel 61 includes a thin film transistor (TFT) substrate 71, a sealing plate 72, and a source IC 73.

The light-emitting element array 100 is disposed on the TFT substrate 71. The TFT substrate 71 is provided with a dot circuit, etc., that supply drive current to the light-emitting elements in the light-emitting element array 100 to modulate light of the light-emitting elements. The light-emitting element array 100, dot circuit, etc., constitute a circuit configuration formed on the TFT substrate 71.

For each of the light-emitting elements, a light beam L emitted therefrom is transmitted through the TFT substrate 71 and emitted from a surface 71a of the TFT substrate 71 on a side of the TFT substrate 71 that is opposite a side of the TFT substrate 71 where the light-emitting element array 100 is disposed.

The sealing plate 72 seals a region on the TFT substrate 71 where the light-emitting element array 100 is disposed, in order that the region is not exposed to external air.

The source IC 73 is mounted in a region on the TFT substrate 71 other than the region of the sealing plate 72, converts the digital light intensity signal outputted from the image processor 55 into an analog voltage light intensity signal, and supplies the light intensity signal after conversion to the dot circuit.

Further, the source IC 73 corrects the light emission amount for each of the light-emitting elements. This correction may, for example, be performed in the following way. Light-emitting elements have a property of their light emission amounts gradually decreasing even when the same amount of drive current is supplied, due to deterioration over a period of time in which they are driven from when they are new until the present time (cumulative light emission time). Further, according to optical properties of the rod-lens array 62, variation occurs in light intensity of beam spots on the photoreceptor drum 11 according to where the light beam L of each of the light-emitting elements is transmitted through the rod-lens array 62.

Accordingly, when new, a reference drive current is determined for each of the light-emitting elements to produce a uniform light intensity when the light beams L from the light-emitting elements are transmitted through the rod-lens array 62 and focused on the photoreceptor drum 11. For any time from this point onwards, for each of the light-emitting elements, a control is executed to increase drive current from the reference drive current determined when new, according to the cumulative light emission time of the light-emitting element. Methods other than described above may be used for correction.

Positional Relationship of Light-Emitting Elements and Rod-Lens Array

Figure 4:
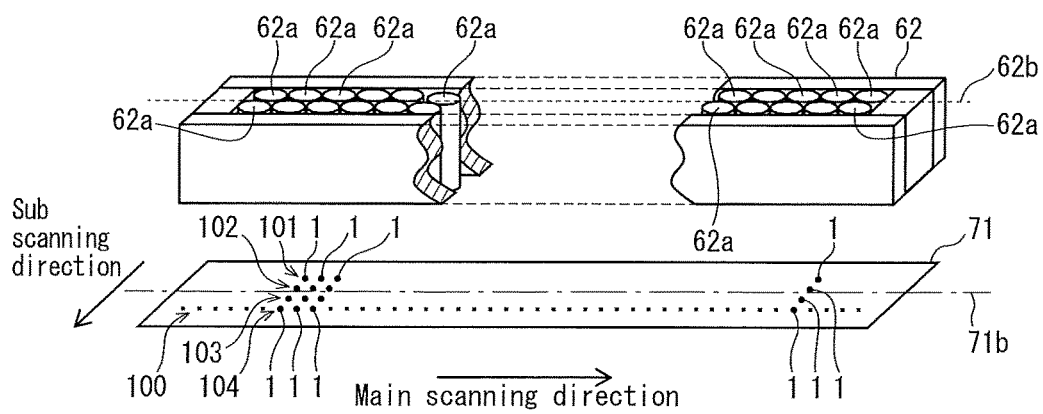
FIG. 4 is a perspective view schematically showing positional relationships in a main scanning direction and sub scanning direction of a light-emitting element array and rod-lens array.
Figure 5:
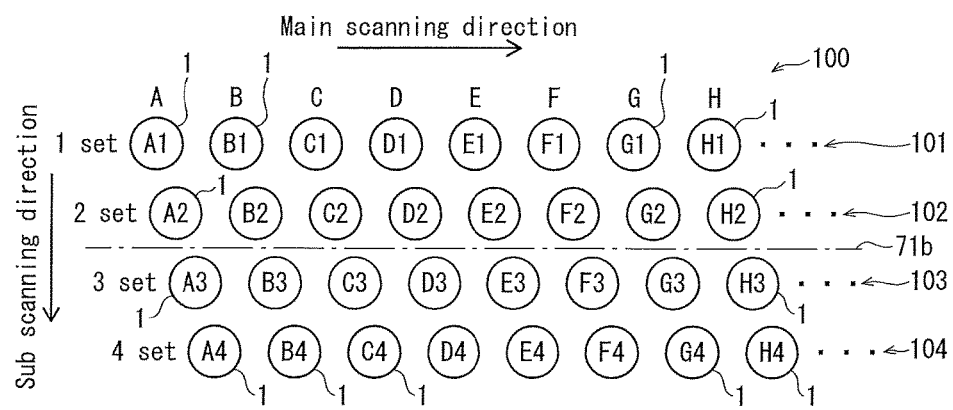
FIG. 5 is a plan view schematically showing a plurality of light-emitting elements arranged on a TFT substrate.
Figure 6:
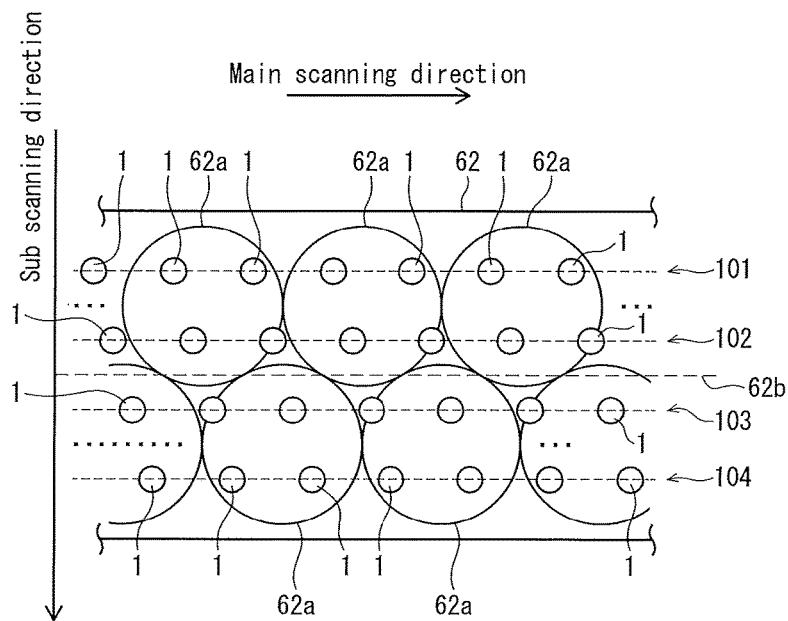
FIG. 6 is a plan view schematically showing positional relationships in the main scanning direction and the sub scanning direction of the light-emitting elements and the rod-lens array.

FIG. 4 is a perspective view schematically showing positional relationships in the main scanning direction and the sub scanning direction of the light-emitting element array 100 and the rod-lens array 62. A portion of the rod-lens array 62 is shown in cross-section. FIG. 5 is a plan view schematically showing a plurality of light-emitting elements 1 arranged on the TFT substrate 71. FIG. 6 is a plan view schematically showing positional relationships in the main scanning direction and the sub scanning direction of the light-emitting elements 1 and the rod-lens array 62. Both FIG. 5 and FIG. 6 show the light-emitting element array 100 through the rod-lens array 62 from the direction indicated by the arrow B in FIG. 2.

As shown in FIG. 4, FIG. 5, and FIG. 6, the light-emitting element array 100 includes light-emitting element rows 101, 102, 103, 104, in each of which a plurality of the light-emitting elements 1 are arranged in a line along the main scanning direction. The light-emitting element rows 101, 102, 103, 104 are arranged along the sub scanning direction, which is orthogonal to the main scanning direction, in this order.

Each of the light-emitting elements 1 has a diameter of 60 μm, for example, and the same shape, size, material, etc., as the other light-emitting elements 1, and is made from a material having the same properties, but has a different position in the main scanning direction from the other light-emitting elements 1. In plan view, the light-emitting elements 1 are arranged in a zigzag pattern along the main scanning direction.

The light-emitting element rows 101, 102, 103, 104, relative to each other, have equal pitch intervals between light-emitting elements 1 in the main scanning direction. Adjacent ones of the light-emitting element rows 101, 102, 103, 104 have equal intervals separating them in the sub scanning direction.

In the following description, when the light-emitting elements 1 are distinguished, for light-emitting elements 1 in the light-emitting element row 101 shown in FIG. 5, a light-emitting element 1 positioned furthest upstream in the main scanning direction is A1, and other light-emitting elements 1 in order, from A1, downstream in the main scanning direction are B1, C1, D1, etc. In the same way, light-emitting elements 1 in the light-emitting element row 102 are A2, B2, C2, D2, etc., in order downstream in the main scanning direction. Further, light-emitting elements 1 in the light-emitting element row 103 are A3, B3, C3, D3, etc., in order downstream in the main scanning direction, and light-emitting elements 1 in the light-emitting element row 104 are A4, B4, C4, D4, etc., in order downstream in the main scanning direction. The light-emitting elements 1 in the order A1, A2, A3, A4, B1, B2, etc., are disposed offset from each other by a predetermined interval in the main scanning direction. The predetermined interval (light source pitch interval) may, for example, be 21 μm.

The rod-lens array 62 includes a plurality of rod-lenses 62a, each of which has a diameter greater than the diameter of one of the light-emitting elements 1, the plurality of the rod-lenses 62a being disposed in a zigzag pattern along the main scanning direction. As per the rod-lens array 910 described above, the rod-lens array 62 has a property of a different transmission rate depending on where a light beam L is transmitted through the rod-lens array 62.

Here, a dashed line 62b shown in FIG. 4 and FIG. 6 indicates a virtual central axis of the rod-lens array 62 along the main scanning direction on a center point of the sub scanning direction. Further, a dot-dash line 71b shown in FIG. 4 and FIG. 5 indicates a virtual central axis of the light-emitting element array 100 along the main scanning direction on a center point of the sub scanning direction, corresponding to a central position in the sub scanning direction between the light-emitting element row 102 and the light-emitting element row 103. The relative positions of the light-emitting element array 100 and the rod-lens array 62 are determined so that the central axis 71b of the light-emitting element array 100 and the central axis 62b of the rod-lens array 62 match up in the sub scanning direction. In FIG. 6, only the central axis 62b of the rod-lens array 62 is shown, but the central axis 62b matches up with the central axis 71b of the light-emitting element array 100.

Figure 7:
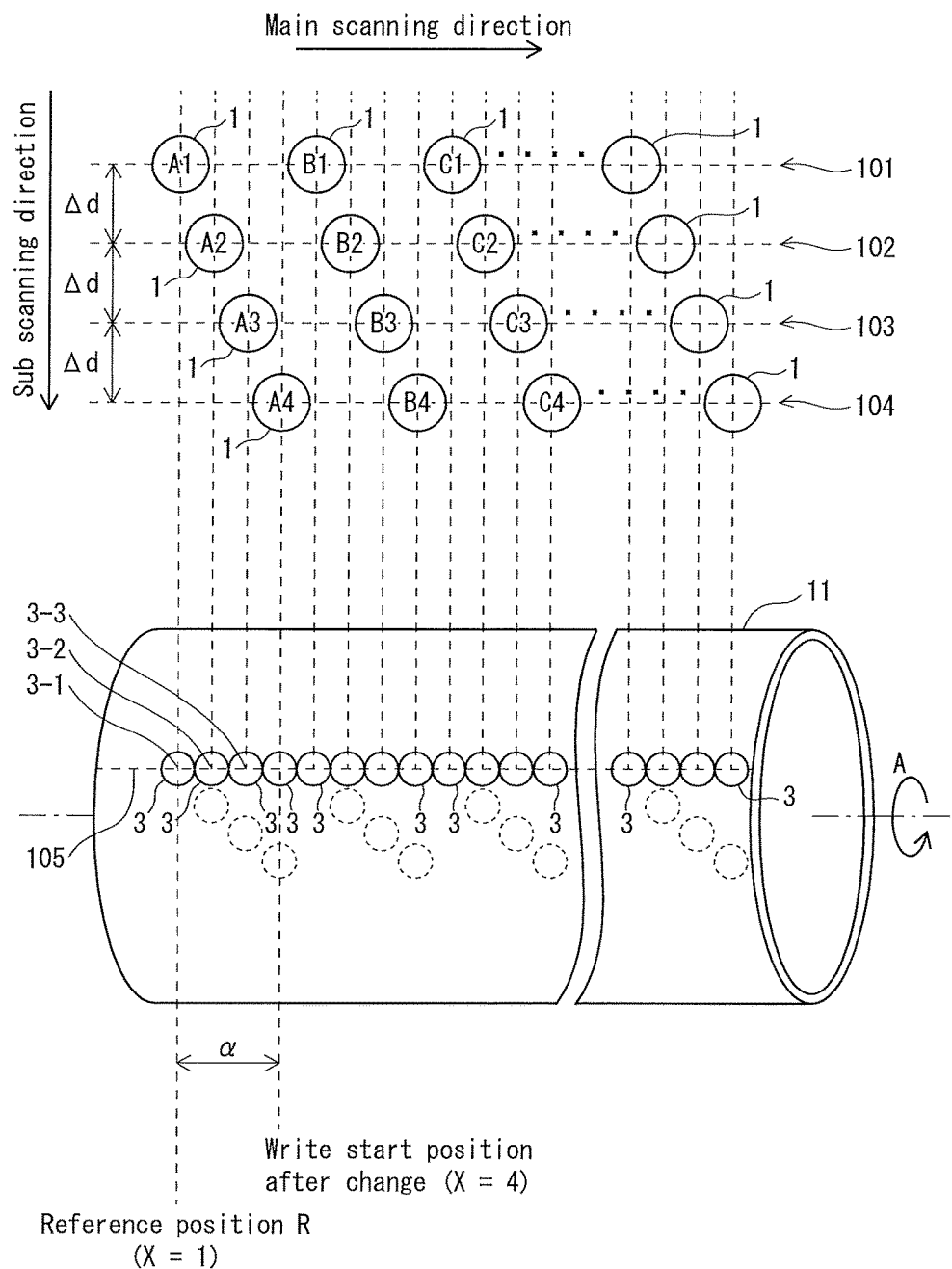
FIG. 7 is a schematic diagram showing beam spots formed on a rotating photoreceptor drum according to light beams from light-emitting elements focused by the rod-lens array.

FIG. 7 is a schematic diagram showing beam spots 3 formed on the photoreceptor drum 11, which rotates in the direction indicated by the arrow A, according to light beams from the plurality of the light-emitting elements 1 arranged in a zigzag pattern along the main scanning direction that are transmitted through and focused by the rod-lens array 62. In FIG. 7, the beam spots 3 are shown lined up along the main scanning direction, starting from a reference position R, to form a main scanning line 105. The reference position R corresponds to an origin position in the main scanning direction, and each one of the beam spots 3 corresponds to one pixel in an image formed on the photoreceptor drum 11.

When the light-emitting elements A1, A2, A3, . . . , which are in different positions from each other along the main scanning direction, are labelled so that A1, which is furthest upstream in the main scanning direction, is first, A2 is second, A3 is third, etc., light beams emitted from the light-emitting elements 1, after being transmitted through different positions of the rod-lens array 62, are focused on irradiation positions 3-1, 3-2, 3-3, . . . , on the photoreceptor drum 11 along the main scanning direction in the same order as the first, second, third, etc., ones of the light-emitting elements A1, A2, A3, . . . along the main scanning direction, starting from the reference position R. That is, the irradiation position 3-1 according to the light-emitting element A1 is on the reference position R in the main scanning direction on the photoreceptor drum 11.

As shown in FIG. 7, configuring the light-emitting elements 1 in a zigzag pattern enables more light-emitting elements 1 to be disposed in a given length in the main scanning direction than configuring the light-emitting elements 1 in a row along the main scanning direction. Thus, a pitch interval on the photoreceptor drum 11 of the beam spots 3 in the main scanning direction from light beams emitted from the light-emitting elements 1 is made smaller, i.e., resolution in the main scanning direction is increased.

According to the zigzag pattern, positions of the light-emitting element rows 101, 102, 103, 104 are offset from each other in the sub scanning direction. Thus, if image data of an input image were used "as is" and the light emitting elements 1 were made to emit light for each main scanning line, then conventionally, one line of the input image would not be reproduced as one line on the main scanning line 105, as the beam spots 3 (dashed lines) would irradiate the photoreceptor drum 11 at positions offset in the sub scanning direction according to the positions of each of the light-emitting element rows 101, 102, 103, 104.

In order to avoid this, light emission start timing of the light-emitting elements in each of the light-emitting element rows 102, 103, 104 is controlled to be offset from the light-emitting element row 101 by a time corresponding to an offset amount Δd corresponding to positions in the sub scanning direction of the light-emitting elements 1, so that the light-emitting element A2 is offset with respect to the light-emitting element A1, the light-emitting element A3 is offset with respect to the light-emitting element A2, etc.

Configuration of Control Unit 50 and Image Processor 55

Figure 8:
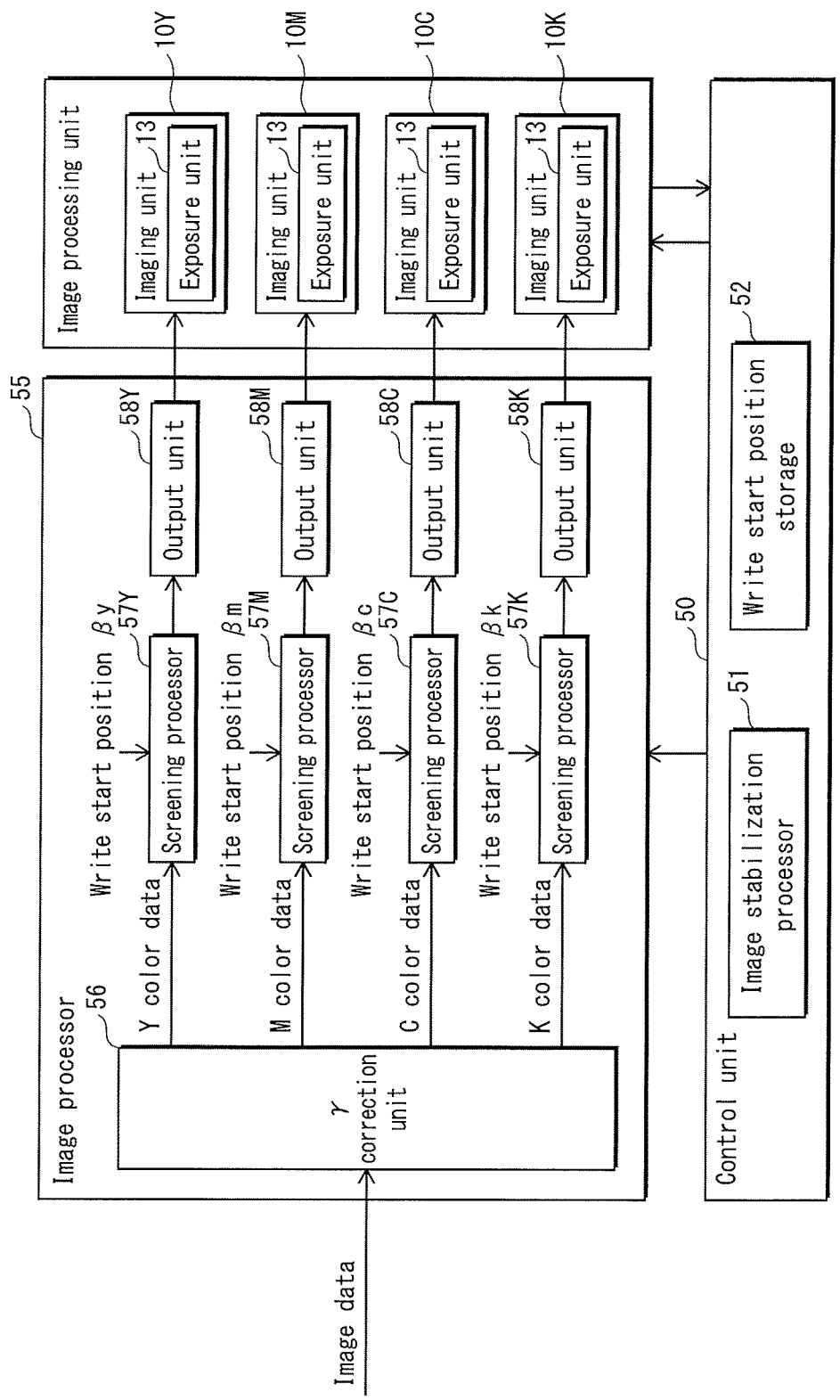
FIG. 8 is a block diagram showing a configuration of a control unit and an image processor.

FIG. 8 is a block diagram showing a configuration of the control unit 50 and the image processor 55.

As shown in FIG. 8, the control unit 50 includes an image stabilization processor 51 and a write start position storage unit 52. The image stabilization processor 51 executes resist correction as an image stabilization operation. Resist correction is executed as described below.

At a predefined timing other than during printing, toner patches that are predefined shapes in each of the colors Y, M, C, K are formed on the intermediate transfer belt 21 at positions separated by predefined intervals in the sub scanning direction. Subsequently, positions on the intermediate transfer belt 21 in the main scanning direction at which toner patches of each color are formed are detected by using an optical detection sensor (not illustrated).

Subsequently, based on the results of detection, the write start positions in the main scanning direction of images on the photoreceptor drum 11 are corrected for each of the imaging units 10Y, 10M, 10C, 10K so that positions in the main scanning direction match up for toner images in the colors Y, M, C, K that are transferred onto the intermediate transfer belt 21.

Here, when an irradiation position 3-1 at the reference position R in the main scanning direction on the photoreceptor drum 11 is "first", and irradiation positions are counted along the main scanning direction to determine an X-th irradiation position, the write start position is the X-th irradiation position in the main scanning direction at which image writing starts.

In FIG. 7, one light-emitting element corresponds to one irradiation position, and one irradiation position corresponds to one pixel (beam spot 3). For example, when image writing starts from the light-emitting element A1, which is most upstream in the main scanning direction, a write start position X is 1, and when image writing starts from the light-emitting element A4, the write start position X is 4.

If, prior to resist correction, the write start position X for color K is 1 (irradiation position 3-1), and the result of detection by the detection sensor is that the write start position X has been changed to 4 (irradiation position 3-4), and the write start positions for each of the colors Y, M, and C are judged as matching, the write start position X for color K is corrected from 1 to 4. For each imaging unit, when the write start position is corrected, the write start position X stored in the write start position storage unit 52 is updated with write start position information indicating the write start position X after correction.

Figures 9, 10, 11:
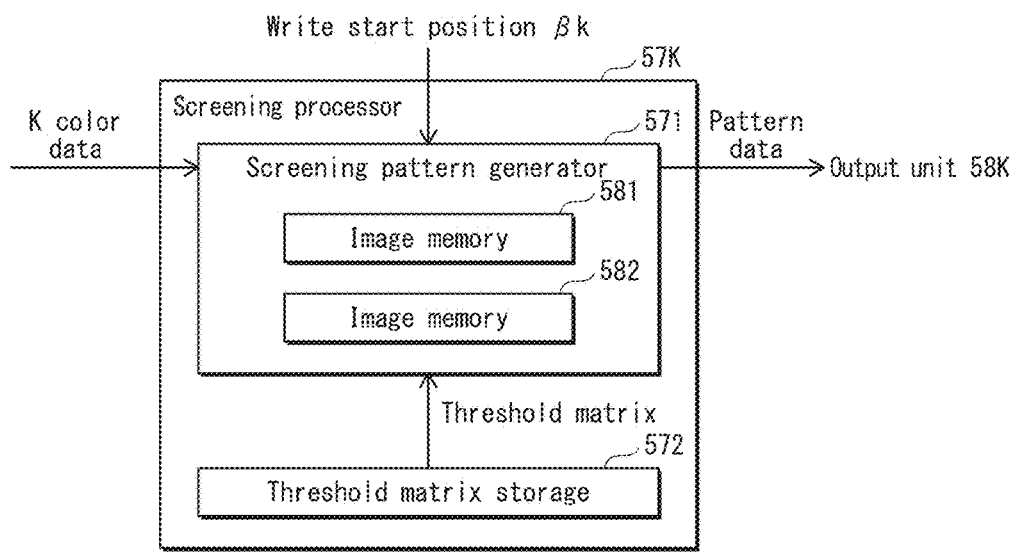
FIG. 9 is a diagram showing an example of write start position information contained in a write start position storage unit.
FIG. 10 is a block diagram showing a configuration of a screening processor.
FIG. 11 shows an example of a threshold matrix.

FIG. 9 shows an example of write start position information 521 stored in the write start position storage unit 52. The write start position information 521 includes the write start position X in the main scanning direction for each of the colors Y, M, C, K.

When a print job is executed after resist correction, each of the imaging units 10Y, 10M, 10C, 10K read their corresponding write start position X stored in the write start position storage unit 52 and perform writing of the image in the main scanning direction based on the corresponding write start position X.

For example, in FIG. 7, when the write start position X for the color K is 1, the light-emitting elements A1, A2, A3, . . . are controlled based on image data. However, when the write start position X for the color K is corrected to 4, the light-emitting elements A4, B1, B2, . . . are controlled based on image data.

That is, when the write start position for the color K is changed, an entirety of a K color image to be formed on the photoreceptor drum 11 is formed at a position shifted a distance from the reference position R in the main scanning direction corresponding to the change, which is a distance α in the example of FIG. 7. Forming an image on the photoreceptor drum 11 at a position shifted in the main scanning direction according to a change in the write start position X is also performed for the other colors Y, M, and C.

Thus, occurrence can be prevented of deviation in the main scanning direction between each color toner image in a superimposed YMCK image on the intermediate transfer belt 21.

As the predefined timing, examples include when printing is executed on a certain number of sheets of paper, or when device ambient temperature changes by at least a certain value.

Returning to FIG. 8, the image processor 55 executes γ correction and screening processing as image processing of an input image that is a target of screening processing. The image processor 55 includes a γ correction unit 56, screening processors 57Y, 57M, 57C, 57K, and output units 58Y, 58M, 58C, 58K.

The γ correction unit 56 receives image data of an input image, executes known γ (gamma) correction on the image data as gradation correction according to image reproducibility, such as development characteristics, and outputs a multi-level gradation value for Y, M, C, K colors after γ correction, for example 256-gradation digital data, to the screening processors 57Y, 57M, 57C, 57K.

The screening processors 57Y, 57M, 57C, 57K execute screening processing on the received multi-level data to obtain binary pseudo-gradation expression. The screening processors 57Y, 57M, 57C, 57K each essentially execute the same processing, and therefore the following describes processing of the screening processor 57K and description of processing of the screening processors 57Y, 57M, and 57C is omitted.

The screening processor 57K includes a screening pattern generator 571 and a threshold matrix storage 572, as shown in FIG. 10.

The threshold matrix storage 572 is a storage that stores a threshold matrix used in creating a screening pattern for expressing a multi-level K color data image in binary.

FIG. 11 shows an example of a threshold matrix 110. In the main scanning direction and the sub scanning direction, numeric values $P_{11}, P_{21}, \ldots, P_{xy}$ are thresholds corresponding one-to-one with pixels of K color data. The magnitude of each numeric value is predetermined according to certain rules. For example, with 256 gradations, a threshold is a value from 0 to 255.

In FIG. 11, an example of the threshold matrix 110 is shown, but, for example, a most appropriate threshold matrix may be automatically selected or selected by a user from a plurality of different threshold matrices, according to input data.

Returning to FIG. 10, the screening pattern generator 571 includes image memory 581 and image memory 582. The screening pattern generator 571 performs screening processing by using the threshold matrix 110 on the K color data, to generate a screening pattern. The following describes specifics of screening pattern generation, in which an example is described in which K color data that is a target of screening is data of an input image 121, which is rectangular and K color, included in a page region 120 shown in FIG. 12 and indicated by hatching. A region that is a target of screening may be obtained by methods such as automatic determination from gradation values of pixels of an input image or specification from an operation unit (not illustrated) according to user operation input.

Here, the input image 121 is a uniformly pale mid-range concentration image. As shown in the enlarged schematic diagram in FIG. 13, when the input image 121 is divided into pixel units, a pixel 2-1 is an origin at the reference position R in the main scanning direction, and along the main scanning direction pixels 2-2, 2-3, 2-4 . . . are arranged in columns, and along the sub scanning direction main scanning lines are arranged into a first line, second line, third line . . . . The input image 121 has the pixel 2-1 that is first in the main scanning direction at the reference position R, and is therefore an image for which the write start position X in the main scanning direction is 1.

The screening pattern generator 571 executes storage processing that stores gradation values of pixels of received K color data in the image memory 581.

Figure 13:
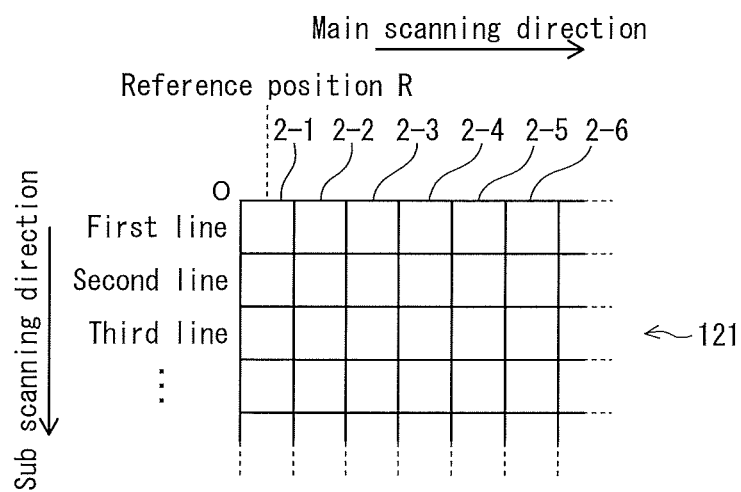
FIG. 13 is an enlarged schematic diagram showing an input image divided into pixel units.
Figure 14:
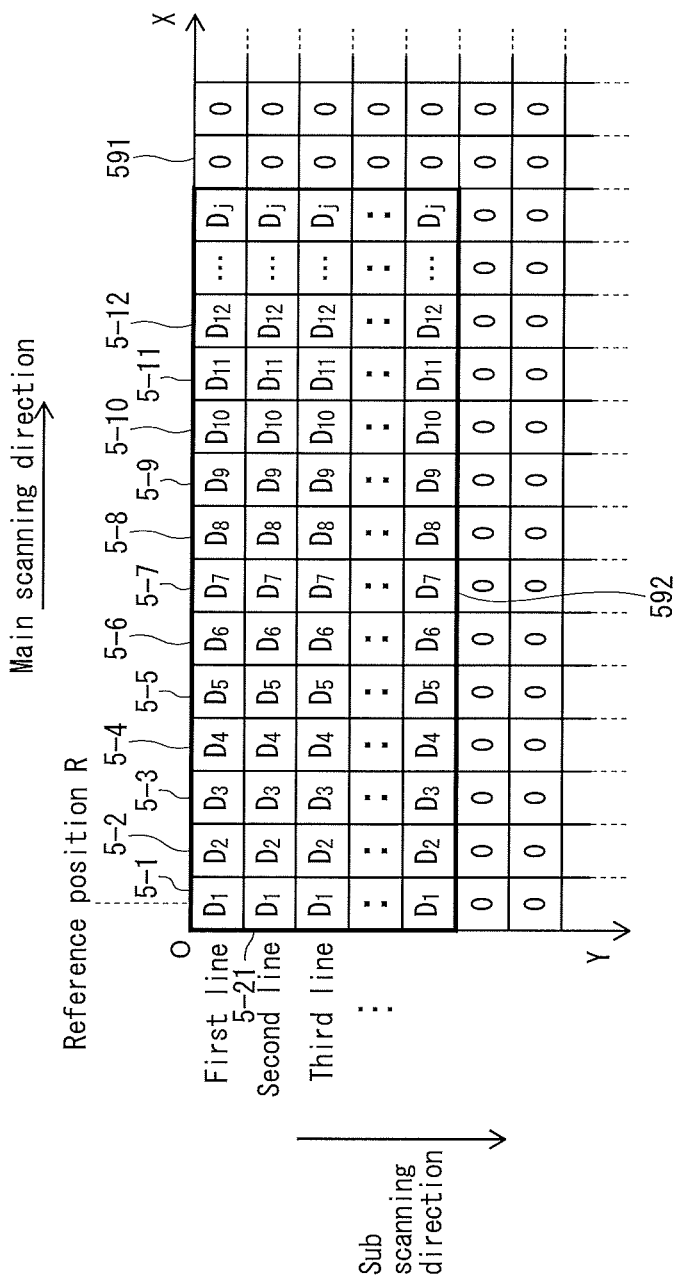
FIG. 14 is a schematic diagram showing an expansion of an orthogonal coordinate system of an X axis and a Y axis of a storage region of image memory.

FIG. 14 is a schematic diagram showing an expansion of an orthogonal coordinate system of an X axis and a Y axis of a storage region of image memory, the X axis corresponding to the main scanning direction, the Y axis corresponding to the sub scanning direction, stored in the memory region 591 of the image memory 581. In FIG. 14, a first line, second line . . . correspond to the first line, second line . . . shown in FIG. 13.

As shown in FIG. 14, the storage region 591 is divided into a plurality of pixel storage regions 5-1, 5-2, 5-3 . . . in a two-dimensional array in the main scanning direction and the sub scanning direction. In one pixel storage region, one pixel of the pixels of the input image 121 can be stored. FIG. 14 shows an example in which the pixels of the input image 121 are stored in the pixel storage regions when the write start position X matches the reference position R (X=1).

Here, the pixels of the input image 121, for each main scanning line, from a pixel at a lead position in the main scanning direction onwards, i.e., pixels 2-1, 2-2, 2-3 . . . are stored in ascending order in the pixel storage regions 5-1, 5-2, 5-3 . . . from a pixel storage region 5-1 corresponding to the write start position X (=1) in the main scanning direction onwards.

Storage of pixels is more specifically performed by writing one pixel value (gradation value) of a pixel to one pixel storage region. In the first line, a gradation value $D_1$ of the pixel 2-1 is written to the pixel storage region 5-1, and a gradation value $D_2$ of the pixel 2-2 is written to the pixel storage region 5-2. Likewise, gradation values $D_3$, $D_4$ . . . of the pixels 2-3, 2-4 . . . are written to the pixel storage regions 5-3, 5-4 . . . . The same is true for the second line onwards. The gradation values $D_1$, $D_2$ . . . are, for example, each a value from 0 to 255, but in this example all pixels have the same gradation value.

This storage processing is performed after initialization of the image memory 581. This initialization is a process of writing a predetermined value, for example 0, to all pixel storage regions of the storage region 591. Accordingly, storage processing is a process of overwriting (updating) the already-written value (0) in each pixel storage region with a gradation value.

A range 592 indicated by bold lines in FIG. 14 is a range storing all pixels of the input image 121. Pixels outside the range 592 are not storing pixels and still have the initialization value of 0 written thereto.

Assuming that the pixel storage region 5-1 and the threshold $P_{11}$ are at an origin O, the screening pattern generator 571 compares the magnitude of values stored in the pixel storage regions 5-1, 5-2 . . . , to thresholds of the threshold matrix 110 shown in FIG. 11, using the origin O as a reference to determine positional relationships therebetween.

For example, in the example shown in FIG. 14, on the first line, the gradation value $D_1$ stored in the pixel storage region 5-1 and the threshold $P_{11}$, and the gradation value $D_2$ stored in the pixel storage region 5-2 and the threshold $P_{21}$, and on the second line, the gradation value $D_1$ stored in the pixel storage region 5-21 and the threshold $P_{12}$. This comparison processing is executed for each pixel storage region in the range 592.

Thus, application of the threshold matrix 110 starts at the pixel storage region 5-1, which is at the reference position R, which is the lead position in the main scanning direction, and therefore the pixel storage region 5-1, which is first in the main scanning direction, is referred to as a screening extension start point Z, indicating a start point for screening processing.

The pixel storage regions 5-1, 5-2 . . . as shown in FIG. 14 correspond to the light-emitting elements A1, A2 . . . counting from the reference position R in the main scanning direction. That is, pixel storage regions in the main scanning direction from the pixel storage region 5-1, which is at the reference position R, onwards, correspond one-to-one with light-emitting elements in the main scanning direction from the light-emitting element A1, which is at the reference position R, onwards. Each pair of the pixel storage regions and the light-emitting elements has the same number as part of its reference sign. Thus, the light-emitting element A1, which is in the lead position in the main scanning direction, has the same positional relationship in the main scanning direction as the pixel storage region 5-1, and therefore the light-emitting element A1 is the screening extension start point Z in the following description.

The screening pattern generator 571, for each of the pixel storage regions, from comparison results, changes the data to indicate 0 when the value stored in the pixel storage region is equal to or less than the threshold, and changes the data to indicated 1 when the value stored in the pixel storage region is greater than the threshold. This binary data after conversion becomes a screening pattern that expresses a result of dithering the input image 121 (multi-level image). The binary data after conversion is stored in the image memory 582 as screening pattern data.

Figure 15:
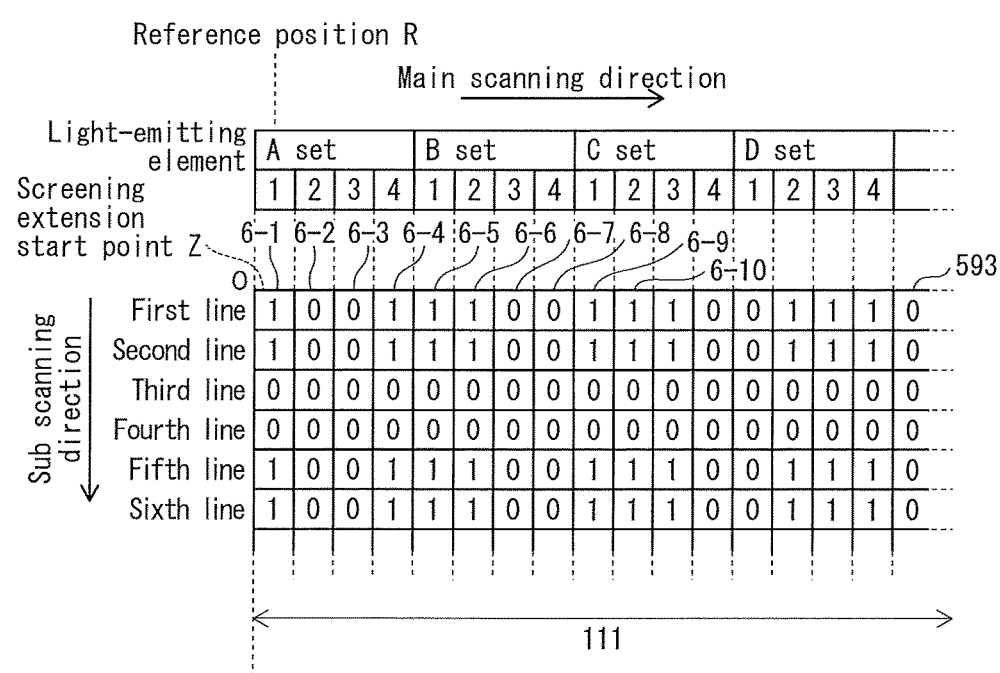
FIG. 15 shows an example of screening pattern data.

FIG. 15 schematically shows binary data of a screening pattern 111 stored in storage regions 593 of the image memory 582; the first line, second line . . . correspond to the first line, second line . . . shown in FIG. 13.

The storage region 593 is divided into a plurality of pixel storage regions 6-1, 6-2, 6-3 . . . , similarly to the storage region 591. One pixel storage region stores one pixel of the screening pattern 111. This storing processing is performed by writing a pixel value of one pixel to one pixel storage region, the pixel value being either "0" to indicate a white pixel or "1" to indicate a black pixel.

For example, a value "1" stored in the pixel storage region 6-1 of the first line is a value obtained from a result of comparison between the threshold $P_{11}$ and the gradation value $D_1$ of pixel 2-1 stored in the pixel storage region 5-1 of the first line shown in FIG. 14. Similarly, a value "0" stored in the pixel storage region 6-2 of the first line is a value obtained from a result of comparison between the threshold $P_{21}$ and the gradation value $D_2$ of pixel 2-2 stored in the pixel storage region 5-2 of the first line shown in FIG. 14. This is also true for other pixel storage regions 6-3, 6-4 . . . and pixel storage regions in the second line onwards.

Thus, the pixel storage regions 6-1, 6-2, . . . indicate pixels of the screening pattern 111, and all pixel values stored in the pixel region 593 of the image memory 582 can be said to form the screening pattern 111.

FIG. 15 only shows values stored in the pixel storage region 6-1, 6-2 . . . in the first through sixth lines near the origin O of the screening pattern 111, and other pixel storage regions are omitted. In FIG. 15, like in FIG. 14, the pixel storage regions 6-1, 6-2 . . . are shown corresponding one-to-one with the light-emitting elements A1, A2 . . . that share the same number counting upwards from the reference position R in the main scanning direction.

A value (0 or 1) stored in the pixel storage regions 6-1, 6-2 . . . indicates a pixel value of a pixel that is part of the screening pattern 111, and therefore values stored in the pixel storage regions 6-1, 6-2, 6-3 . . . indicate whether pixels of the screening pattern 111 are expressed as black or white due to corresponding light-emitting elements emitting light or not emitting light.

Figure 16:
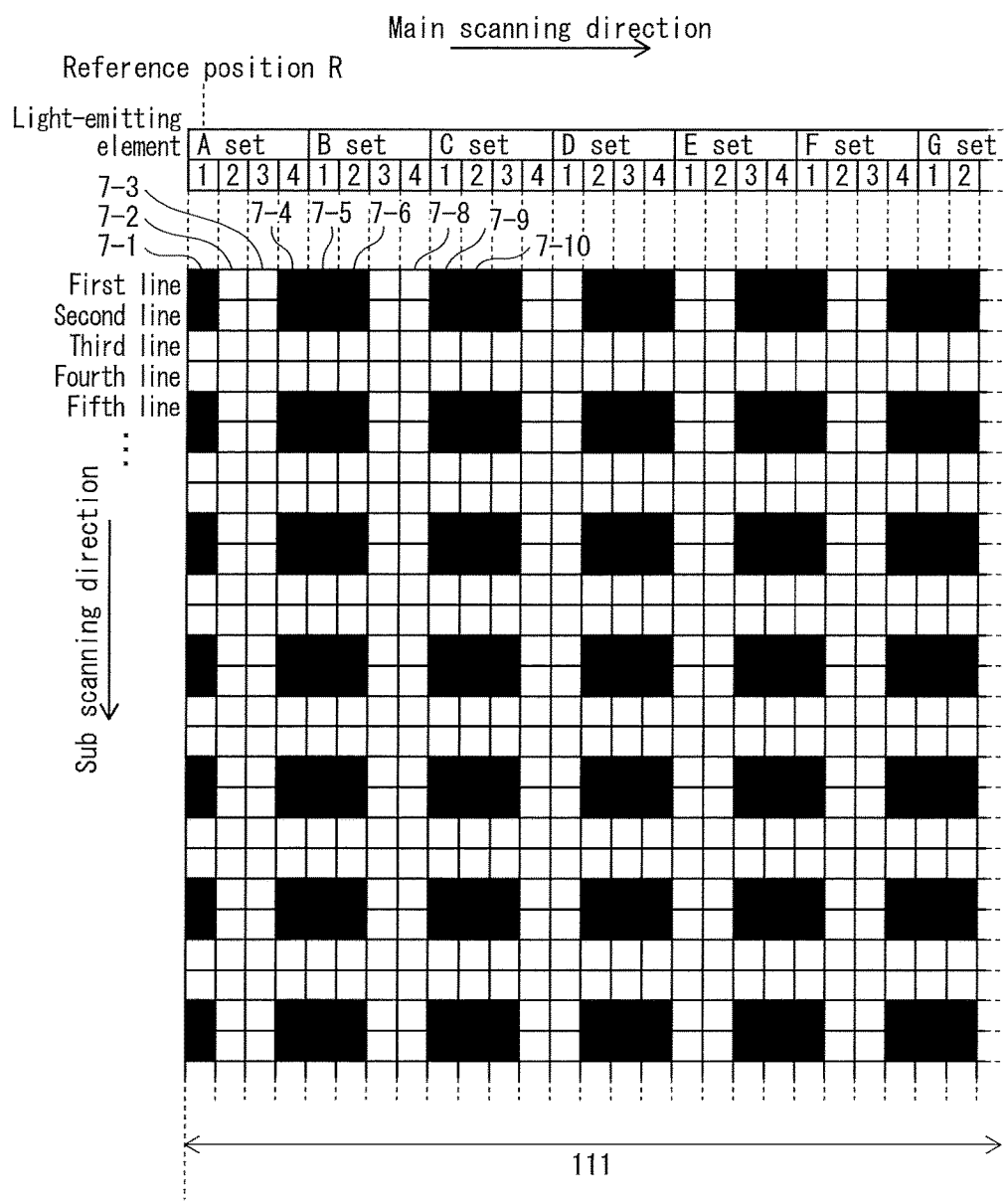
FIG. 16 shows an example of pixels in a screening pattern expressed as black and white pixels.

FIG. 16 shows an example of pixels in the screening pattern 111 expressed as black and white pixels. In FIG. 16, in the main scanning direction, the pixels 7-1, 7-2, 7-3 . . . correspond one-to-one with the light-emitting elements A1, A2, A3 . . . .

The pixel 7-1 in the first line of the screening pattern 111 is expressed as a black pixel by light emission of the light-emitting element A1 and the pixels 7-2, 7-3 are expressed as white pixels by non-light-emission of the light-emitting elements A2, A3. This is because, in the first line shown in FIG. 15, the pixel value of the pixel storage region 6-1 is "1" and the pixel values of the pixel storage regions 6-2, 6-3 are each "0". The same is true for other pixels.

The screening pattern 111, after the first black pixel 7-1 in the main scanning direction, has a pattern of two white pixels then three black pixels repeating in this order, in other words the screening pattern 111 is a screening pattern that changes concentration in the main scanning direction in a cyclic pattern.

Returning to FIG. 10, the screening pattern generator 571 reads the binary data of the screening pattern 111 stored in the image memory 582 from the image memory 582. This data is hereinafter referred to as pattern data.

The screening pattern generator 571 transmits the pattern data read from the image memory 582 to the output unit 58K.

When the output unit 58K receives pattern data, the output unit 58K transmits one main scanning line of data or a predefined number of lines of data to the exposure unit 13 of the imaging unit 10K as a light intensity signal.

The exposure unit 13 light modulates the light-emitting element array 100 according to the binary pattern data received, i.e. the screening pattern. More specifically, the binary pattern data is converted into a light intensity signal of analog voltage for each pixel unit, and for each main scanning line, the light-emitting elements A1, A2 . . . are controlled to emit or not-emit light, based on the light intensity signal after the conversion.

This control is described in more detail below. For example, the binary data of the pixel 7-1 of the screening pattern 111 is "1", and therefore the light-emitting element A1 is supplied an analog voltage indicating "1", so the light-emitting element A1 emits light. This analog voltage is after the light emission correction processing described above. Further, the binary data for each of the pixels 7-2, 7-3 of the screening pattern 111 is "0", and therefore the corresponding light-emitting elements A2, A3 are each supplied an analog voltage indicating "0", so the light-emitting elements A2, A3 do not emit light. The same is true for other pixels.

According to this exposure control, an electrostatic latent image of the screening pattern 111 is formed on the photoreceptor drum 11. The electrostatic latent image, after being developed by K color toner, is transferred from the photoreceptor drum 11 to the intermediate transfer belt 21, and from there to the sheet S. Thus, the K color screening pattern that uses the reference position R as the write start position X is printed on the sheet S.

When Write Start Position X is Changed

Figure 12:
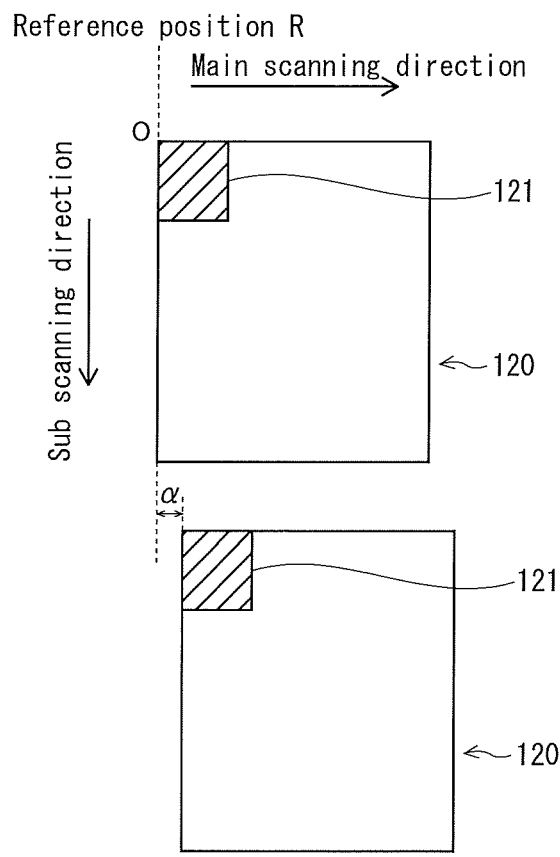
FIG. 12 shows an example of when a mid-range image is present in region of one page, before and after a change in write start position.

According to the above, an example is described of the screening pattern 111 being generated when the write start position X is 1, but the following screening processing of the input image 121 is executed when the write start position X is shifted by image stabilization operation by a distance α from the reference position R, as shown in FIG. 12, for example seven pixels in the main scanning direction (X=8).

The screening pattern generator 571 stores, in the storage region 591 of the image memory 581, gradation values of pixels of received multi-level K color data in positions shifted in the main scanning direction from the origin O by a distance equivalent to a shift of the write start position X from the reference position R.

Figure 17:
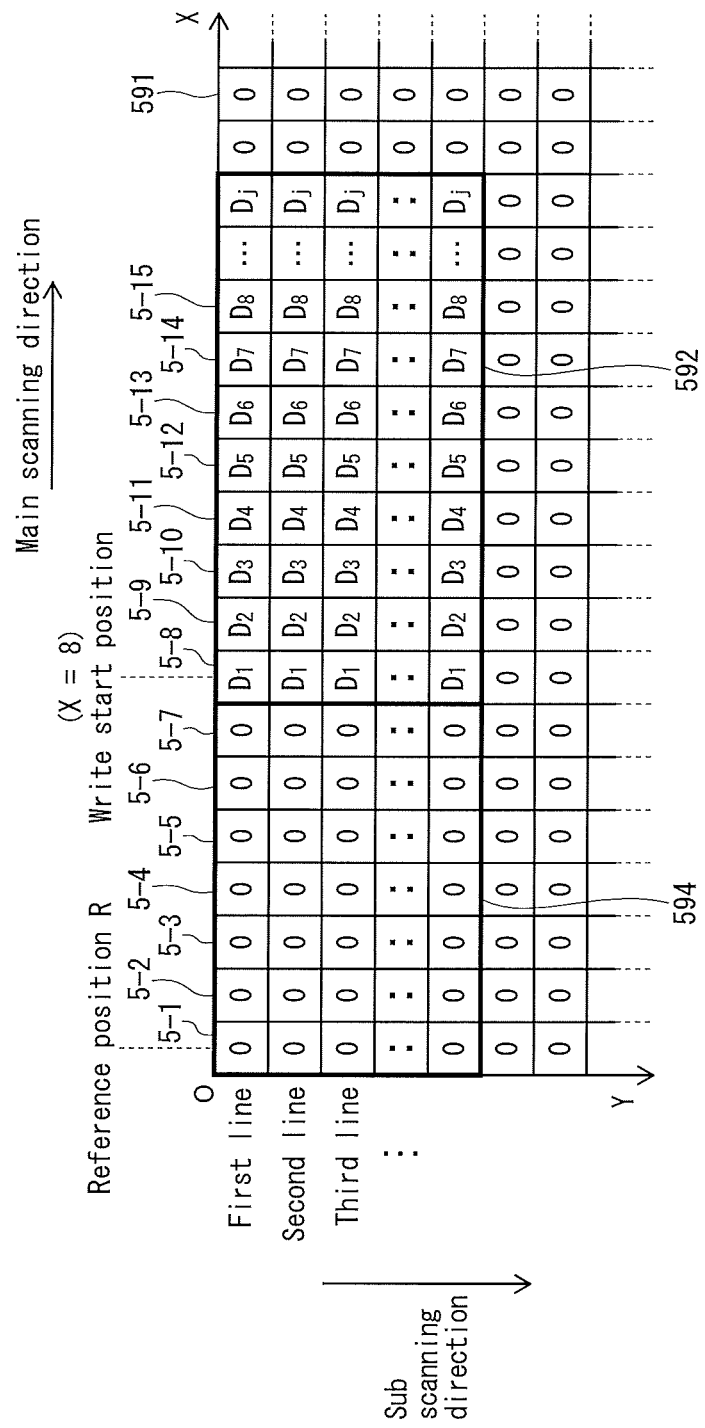
FIG. 17 shows a state of pixels stored in an image storage region.

FIG. 17 shows a state of gradation values of pixels stored in the storage region 591. As shown in FIG. 17, in contrast to the state shown in FIG. 14, in which the pixel storage regions 5-1, 5-2 . . . of the storage region 591 store gradation values $D_1, D_2, D_3$ . . . of pixels in each main scanning line, the gradation values are shifted in the main scanning direction by the write start position X, herein seven pixels, to be stored in pixel storage regions at positions corresponding to the shift.

The write start position X after the change (=8) is a position of the pixel 2-1 of the input image 121, and therefore the pixel storage region 5-8 corresponding to the write start position X becomes the pixel storage region storing the gradation value $D_1$ of the pixel 2-1. Further, the gradation value $D_2$ of the pixel 2-2 is stored in the pixel storage region 5-9.

Pixel storage regions 5-8, 5-9 . . . in an area 592 indicated by bold lines in FIG. 17 are storage regions storing gradation values of pixels of the input image 121.

The screening pattern generator 571, even when the write start position X is changed to 8, fixes the screening extension start point Z to the pixel storage region 5-1 (light-emitting element A1), and applies the threshold matrix 110 to values stored in pixel storage regions.

In this case, "0" values stored for example in the first line of pixel storage regions 5-1 to 5-7 in a range 594 indicated by a bold line are targets to which the threshold matrix 110 is applied. In the pixel storage regions 5-1 to 5-7, a value "0" is already written thereto due to initialization of the image memory 581 prior to storage processing being executed. This value "0" is not a gradation value of a pixel of the input image 121, but is a target for application of the threshold matrix 110 according to the present embodiment.

Thus, regardless of changes to the write start position X, the screening extension start point Z is fixed to the pixel storage region 5-1, in order to prevent variation in concentration of pixels of the screening pattern caused by changes to the write start position X.

The following describes in detail how concentrations of pixels of screening patterns are effected according to a working example and a comparative example, the comparative example being when the screening extension start point Z is changed according to changes to the write start position X, for example changing to the pixel storage region 5-8, and the working example being when the screening extension start point Z is fixed to the pixel storage region 5-1 regardless of changes to the write start position X.

Comparative Example

According to the state shown in FIG. 17, changing the screening extension start point Z to the pixel storage region 5-8 means that the threshold matrix 110 is applied in the main scanning direction from the gradation value $D_1$ stored in the pixel storage region 5-8 on the first line.

The gradation values D1, D2 . . . shown in FIG. 17 and the gradation values $D_1, D_2$ . . . shown in FIG. 14 are the same, but from FIG. 14 the write start position X is shifted seven pixels in the main scanning direction in FIG. 17. Accordingly, binary data of a screening pattern obtained by applying the threshold matrix 110 to the origin of the gradation value $D_1$ shown in FIG. 17 becomes the binary data shown in FIG. 15 shifted seven pixels in the main scanning direction.

Figure 18:
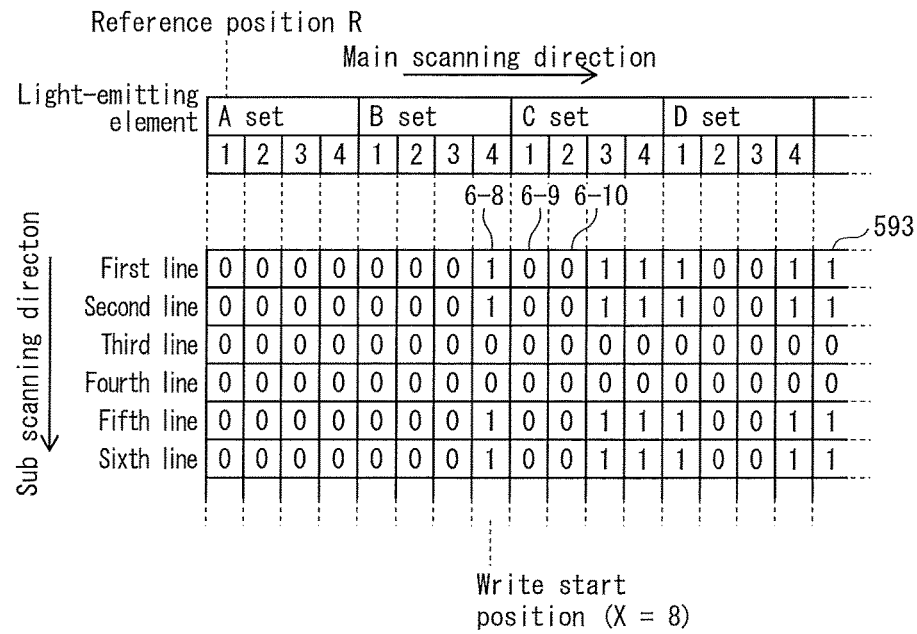
FIG. 18 shows an example of screening pattern data of a comparative example.

FIG. 18 shows an example of this binary data shifted in the main scanning direction. It can be seen that the binary data of each pixel storage region from the pixel storage region 6-8 in the main scanning direction is exactly the same as the data shown in FIG. 15.

Figure 19:
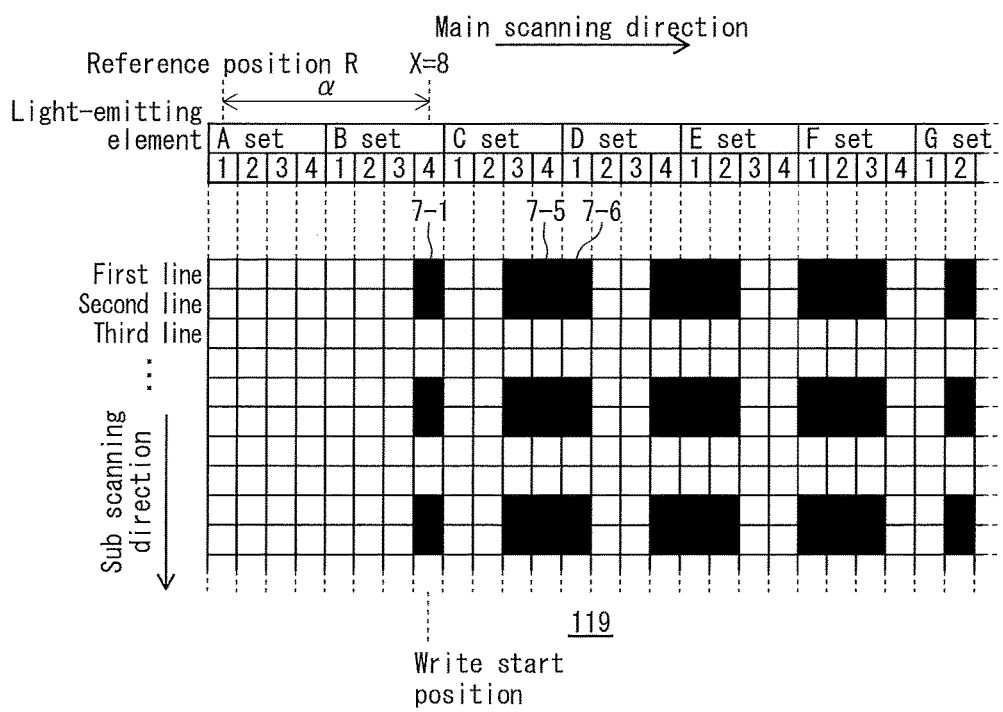
FIG. 19 shows an example of each pixel in a screening pattern of the comparative example, expressed as black and white pixels.

FIG. 19 shows an example of pixels in a screening pattern 119 of the comparative example expressed as black and white pixels. As shown in FIG. 19, the screening pattern 119 is the screening pattern 111 shown in FIG. 16 shifted by a distance α corresponding to seven pixels from the reference position R in the main scanning direction.

According to the screening pattern 119, a black pixel 7-1 is expressed by a light-emitting element B4, a black pixel 7-5 is expressed by a light-emitting element C4, and a black pixel 7-6 is expressed by a light-emitting element D1.

Figure 40A:
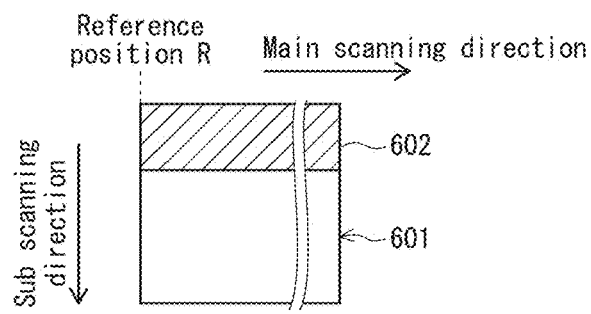
FIG. 40A shows an example of a page region including a mid-range image.
Figure 40B:
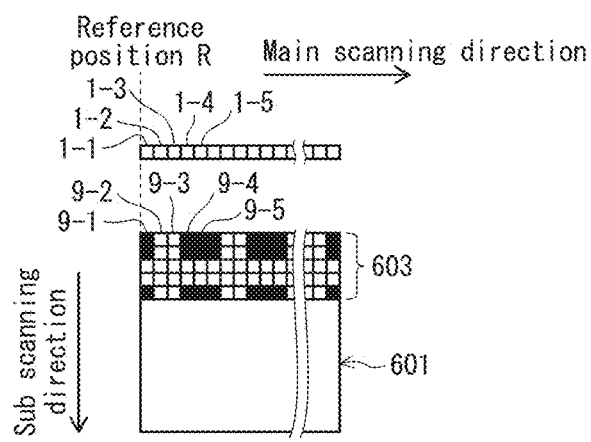
FIG. 40B shows an example of screening pattern according to screening processing.
Figure 40C:
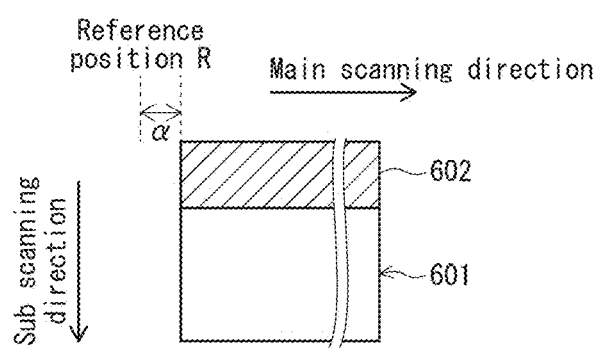
FIG. 40C shows an example of a write start position shifted by a distance α in a main scanning direction.
Figure 40D:
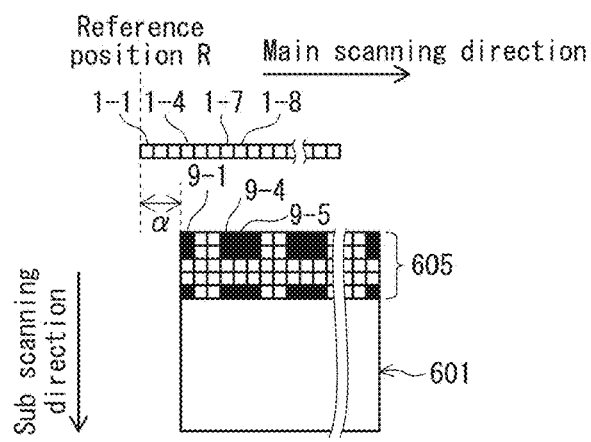
FIG. 40D shows an example of an entire screening pattern shifted by the distance α in the main scanning direction.
Figure 41A:
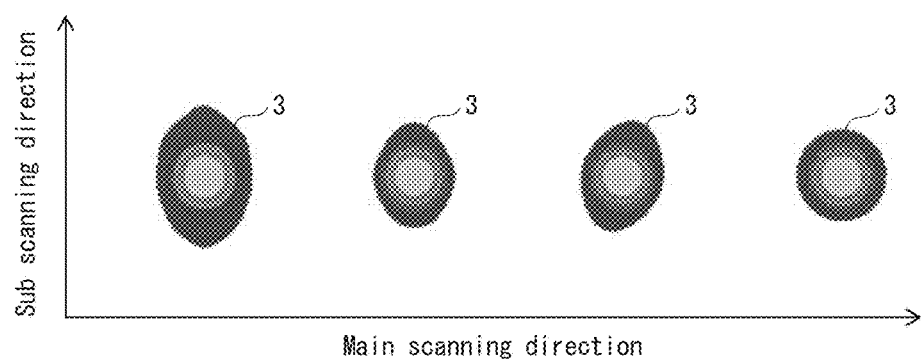
FIG. 41A is an enlarged schematic diagram showing an example of shapes of beam spots when light beams emitted from light-emitting elements are focused on a photoreceptor.
Figure 41B:
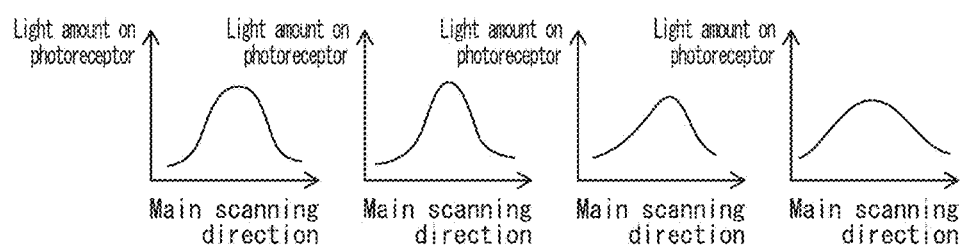
FIG. 41B shows an example of light intensity distribution waveforms for each of the beam spots.

That is, when comparing the screening pattern 111 shown in FIG. 16 in which the write start position X is the reference position R to the screening pattern 119 shown in FIG. 19 in which the write start position X is shifted seven pixels in the main scanning direction from the reference position R, different light-emitting elements are used even for a black pixel that has a same number, counting pixel by pixel from the write start position X in the main scanning direction. This is the same as the case shown in FIG. 40B and FIG. 40D.

As described under the heading "(2) RELATED ART", due to optical properties of the rod-lens array 62, shape and light intensity distribution of the beam spots 3 varies slightly when light beams are focused on the photoreceptor drum 11 after light is emitted from the light-emitting elements 1 and transmitted through different positions of the rod-lens array 62.

Figure 20:
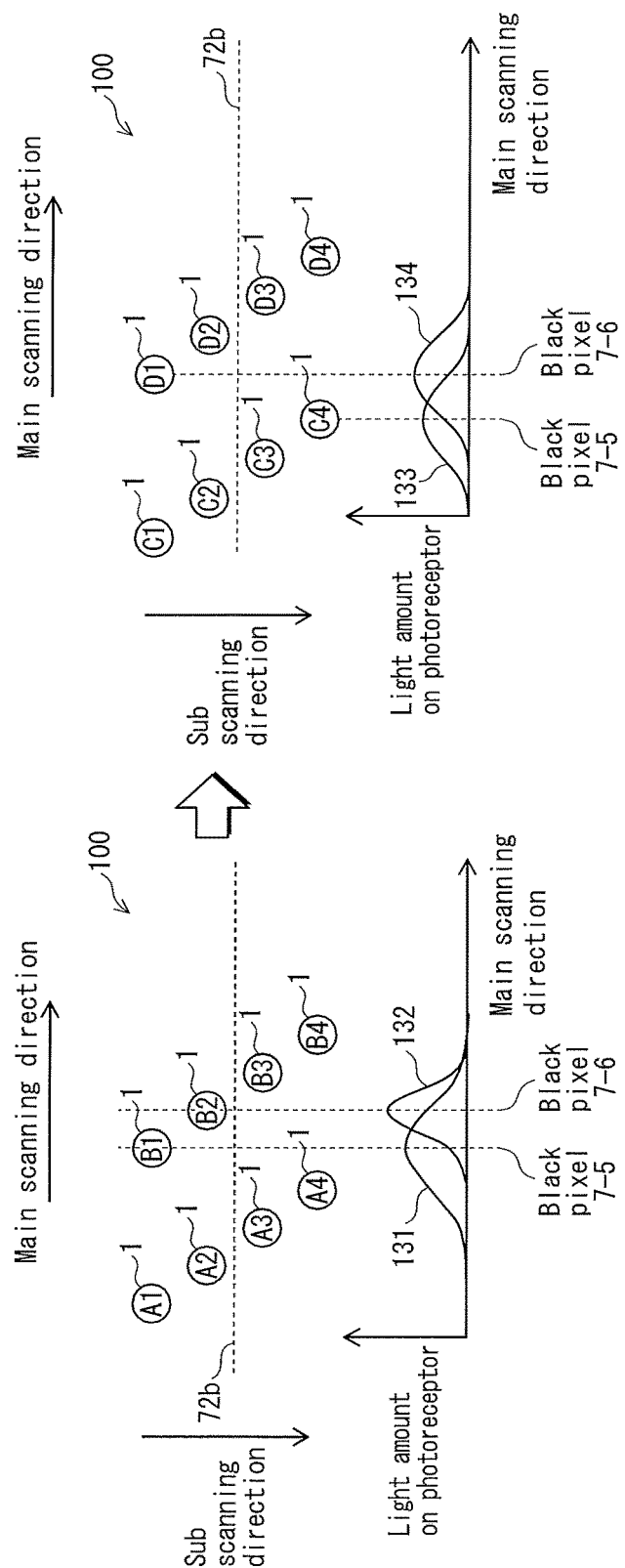
FIG. 20 shows examples of light intensity distribution of beam spots when light beams emitted from light-emitting elements are incident on a photoreceptor drum.

More specifically, according to the screening pattern 111 shown in FIG. 16, the black pixels 7-5, 7-6 are formed by the beam spots 3 on the photoreceptor drum 11 of light beams emitted from light-emitting elements B1, B2, and light intensity distribution of the beam spots 3 is, for example, as shown in graphs 131, 132 in FIG. 20.

In contrast, according to the screening pattern 119 shown in FIG. 19, the black pixels 7-5, 7-6 are formed by the beam spots 3 on the photoreceptor drum 11 of light beams emitted from light-emitting elements C4, D1, and light intensity distribution of the beam spots 3 is, for example, as shown in graphs 133, 134 in FIG. 20.

Even for the same black pixel 7-6, the graphs 132, 134 indicating light intensity distribution have greatly different shapes, and therefore it can be seen that a difference in exposure amounts of the black pixel 7-6 on the photoreceptor drum 11 is caused by a change in the write start position X.

Further, a portion of the graphs 131 and 132 overlap in the main scanning direction and a portion of the graphs 133 and 134 overlap in the main scanning direction. It can be seen that an exposure amount of the black pixel 7-5 is influenced by an exposure amount of the black pixel 7-6, which is adjacent, and the exposure amount of the black pixel 7-6 is altered by the change in the write start position X, and therefore a difference in the exposure amount of the black pixel 7-5 occurs due to the change in the write start position X.

In other words, the exposure amounts and dot shapes of the black pixel 7-5 and the black pixel 7-6 are different before and after the change in the write start position X. The same is true for other black pixels 7-1, 7-4, etc.

Thus, according to the difference in exposure amounts and shapes of black pixels before and after the change in the write start position X, a difference occurs in concentration and shape of black pixels after development of K color. When there is variation in concentration and shape of black pixels before and after the change in the write start position X, there is a risk of a user sensing a different gradation of an output image expressed through dithering according to screening processing of the input image 121, and image quality deterioration of a reproduced image may be perceived.

This difference in exposure amount and shape of a black pixel before and after a change in the write start position X is because the light-emitting element used for expressing the black pixel before and after the change is different. This is because, when the write start position X is changed and consequently the screening extension start point Z changes in the main scanning direction, the screening pattern 111 shown in FIG. 16 is entirely shifted from the reference position R in the main scanning direction.

Working Example

According to the working example, regardless of the change in the write start position X, the screening extension start point Z is fixed at the pixel storage region 5-1 (light-emitting element A1), and the threshold matrix 110 is applied to the origin of the pixel storage region 5-1 to form the screening pattern.

Figure 21:
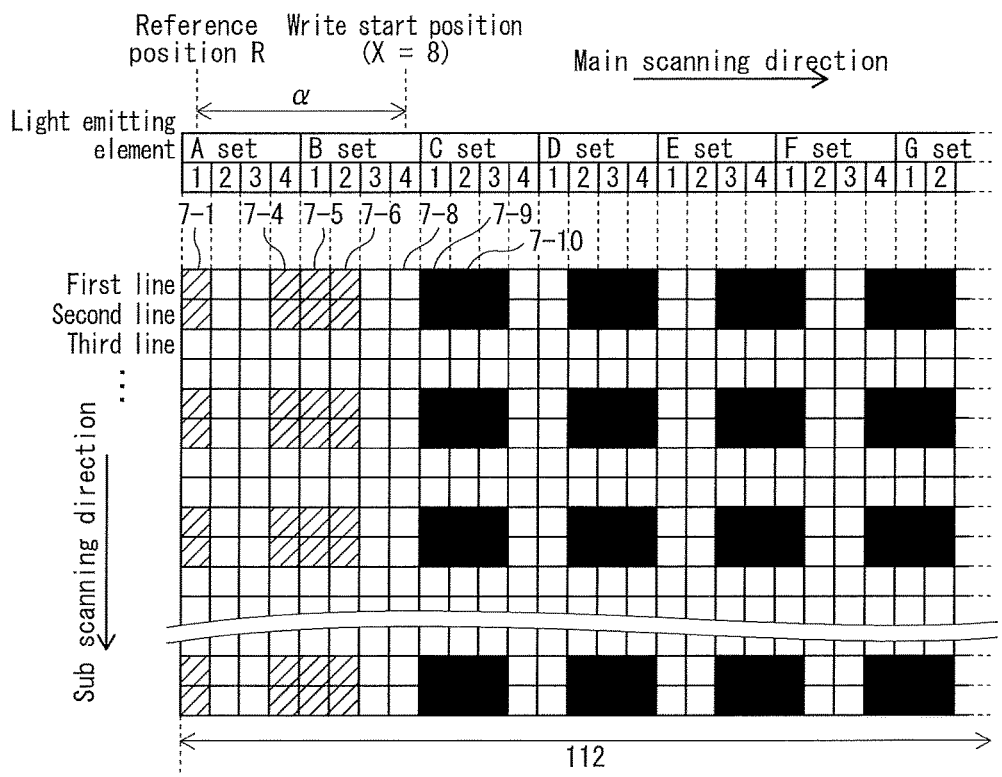
FIG. 21 shows an example of pixels of a screening pattern expressed as black and white pixels after a change in write start position according to a working example.
Figure 22:
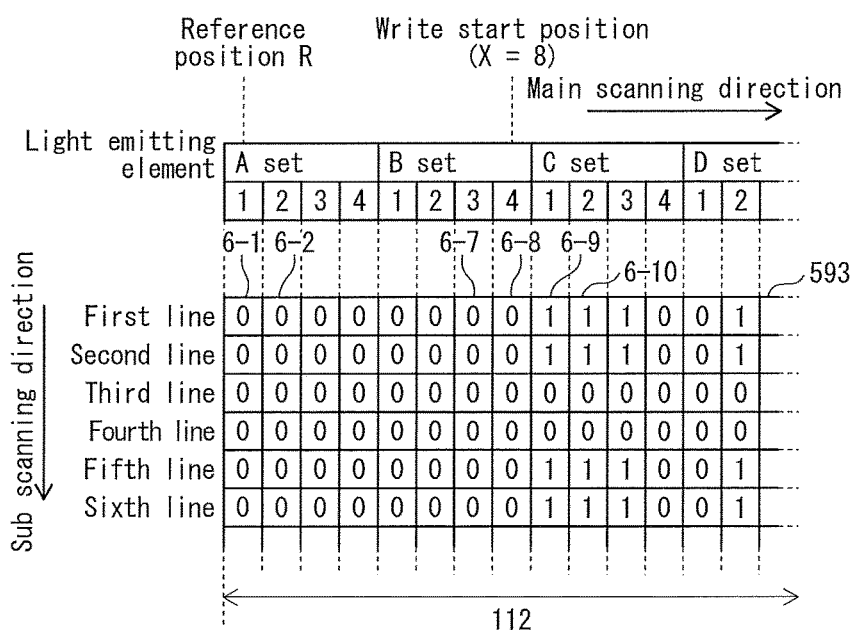
FIG. 22 shows an example of screening pattern data after the change in write start position according to the working example.

FIG. 21 shows an example of pixels of the screening pattern 112 expressed as black and white pixels when the write start position X is 8, according to the working example. FIG. 22 shows an example of the screening pattern 112 expressed in binary.

The screening pattern 112 shown in FIG. 21 is created when the screening extension start point Z is fixed to the light-emitting element A1 with respect to pixel values shown in FIG. 17. The screening pattern 112 is a pattern formed from the same pixels as those of the screening pattern 111 shown in FIG. 16, from the pixel 7-8 at the write start position X (=8) of each main scanning line and continuing to pixels 7-9, 7-10 . . . in the main scanning direction. This is explained below.

The gradation value of all pixels in the input image 121 are the same, and therefore the gradation values $D_8$, $D_9$, $D_{10}$ . . . stored in the pixel storage regions 5-8, 5-9, 5-10 . . . before the change in the write start position X shown in FIG. 14 are equal to the gradation values $D_1$, $D_2$, $D_3$ . . . stored in the pixel storage regions 5-8, 5-9, 5-10 . . . after the change shown in FIG. 17.

Accordingly, when the screening extension start point Z is fixed to the light-emitting element A1, a comparison result when the threshold matrix 110 is applied to the gradation values $D_8$, $D_9$, $D_{10}$ . . . stored in the pixel storage regions 5-8, 5-9, 5-10 . . . shown in FIG. 14 before the change (values 0, 1, 1 . . . stored in the pixel storage regions 6-8, 6-9, 6-10 . . . shown in FIG. 15) is the same as a comparison result when the threshold matrix 110 is applied to the gradation values $D_1$, $D_2$, $D_3$ . . . stored in the pixel storage regions 5-8, 5-9, 5-10 . . . shown in FIG. 17 after the change (values 0, 1, 1 . . . stored in the pixel storage regions 6-8, 6-9, 6-10 . . . shown in FIG. 22).

Fixing the screening extension start point Z to the pixel storage region 5-1 (light-emitting element A1) is equivalent to fixing a scope of the threshold matrix 110 in the main scanning direction with respect to the light-emitting elements A1, A2 . . . in the main scanning direction.

After application of the threshold matrix 110, as shown in FIG. 22, for each main scanning line, all values of the pixel storage regions 6-1 to 6-7 a reference position R side of the write start position X are "0". Values of the pixel storage regions 5-1 to 5-7 shown in FIG. 17 are all "0" due to initialization, which is equal to or below thresholds of the threshold matrix 110 (for example, any value from 0 to 255), and therefore comparison results are all "0".

Values of "0" in the pixel storage regions 6-1 to 6-7 correspond to binary data of pixels 7-1 to 7-7, the pixels 7-1 to 7-7 are the reference position R side of the write start position X, i.e., pixels that are not written when printing, and therefore according to the values of "0" in the pixel storage regions 6-1 to 6-7, the light-emitting elements A1 to B3 corresponding to the pixels 7-1 to 7-7 do not emit light. If an alternative configuration is used in which the comparison result is not "0", the comparison result is overwritten with "0".

In FIG. 21, the pixels 7-1, 7-4, 7-5, 7-6 positioned on the reference position R side of the write start position X (=8) were to be written as black pixels prior to the change in the write start position X, but after the change are not to be written (not to be printed), and this is indicated by hatching.

The screening pattern 111 and the screening pattern 112 result in patterns in which the pixel 7-8 at the same position in the main scanning direction with respect to the reference position R before and after the change in the write start position X is white and the pixel 7-9 is black.

Figure 23:
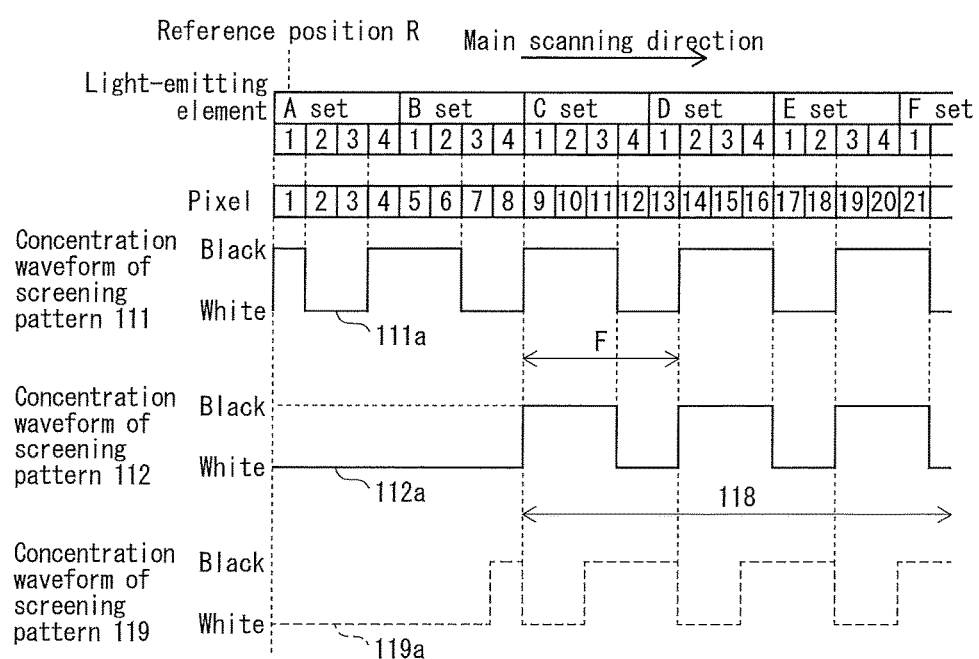
FIG. 23 shows examples of concentration waveforms in the main scanning direction of screening patterns pertaining to the working example and the comparative example.

FIG. 23 shows an example of concentration waveforms in the main scanning direction when concentration is represented by a low level for white pixels and a high level for black pixels for each pixel in one line for the screening patterns 111 and 112 pertaining to the working example and the screening pattern 119 pertaining to the comparative example. A concentration waveform 111a of the screening pattern 111 and a concentration waveform 112a of the screening pattern 112 are indicated by solid lines and a concentration waveform 119a of the screening pattern 119 is indicated by a dashed line.

As indicated by the concentration waveforms 111a and 112a, the screening patterns 111 and 112 of the working example satisfy the following (a) and (b). Here, (a) means a screening pattern in which concentration changes according to a constant cycle F. (b) means that when assigned a number in ascending order 1, 2, 3 . . . from a pixel at the reference position R, a concentration waveform of pixels from the 8th pixel 7-8 matches, that is, has the cycle F and the same phase pattern in the main scanning direction.

Thus, the black pixel 7-9 is exposed by the same light-emitting element C1 for both the screening pattern 111 and the screening pattern 112, and the black pixel 7-10 is exposed by the same light-emitting element C2 for both the screening pattern 111 and the screening pattern 112. The same is also true for other black pixels and second and subsequent lines.

Thus, even when the write start position X changes, light-emitting elements corresponding to pixels from the write start position X in the main scanning direction do not change with respect to the screening pattern 111, and pixel values (0 or 1) supplied to the light-emitting elements do not change.

Light-emitting elements and pixels in the main scanning direction of the screening pattern 111 may be referred to as an i-th (i being a positive integer) light-emitting element in the main scanning direction from the light-emitting element A1 corresponding to the reference position R and an i-th pixel in the main scanning direction from the pixel 7-1 corresponding to the reference position R, which correspond one-to-one with each other, and therefore the exposure control described above can be described by the following control.

That is, according to the control, when the write start position X corresponds to the write position of the i-th light-emitting element, pixel values are supplied to the i-th light-emitting element onwards in the main scanning direction, the pixel values being assigned from pixels of the screening pattern 111 from the i-th pixel onwards, counting from the leading pixel in ascending numerical order of the screening pattern in the main scanning direction.

Before or after a change in the write start position X, black pixels, for example pixels 7-9 and 7-10 are exposed by the same light-emitting elements C1 and C2, and therefore a difference in light intensity distribution of pixels of a screening pattern due to different light-emitting elements being used before and after the change, as shown in FIG. 20, is prevented, and variation in concentration is also prevented.

However, when looking at the concentration waveform 119a of the screening pattern 119 pertaining to the comparative example, the phase in the main scanning direction is shifted from the concentration waveform 111a of the screening pattern 111, and it can be seen that variation in concentration between the same black pixels occurs due to different light-emitting elements being used before and after the change in the write start position.

According to the screening patterns 111, 112, only a portion of the pattern in the vicinity of the write start position X is indicated, and a write end position is omitted, but length in the main scanning direction of the screening pattern 111 and the screening pattern 112 is the same. Accordingly, when comparing the screening pattern 112 to the screening pattern 111, for each main scanning line, the write start position X is shifted seven pixels in the main scanning direction, the write end position is also shifted seven pixels in the main scanning direction, and the pattern of the cycle F continues until the write end position.

Further, when visually comparing the screening pattern 111 and the screening pattern 112, in the screening pattern 111 the pixel 7-1 at the write start position X (=1) of the first line is a black pixel, and in the screening pattern 112 the pixel 7-8 at the write start position X (=8) of the first line is a white pixel, and therefore when a black pixel/white pixel difference occurs at the write start position X, strictly speaking, it cannot be said that the screening patterns are completely identical. However, both screening patterns are very small white and black pixels arranged in a certain cycle in the main scanning direction, and when viewed by the human eye are identified as patterns expressing the same simulated gradation, and therefore not being completely identical is not connected to image quality deterioration.

Screening Pattern Generation Control

Figure 24:
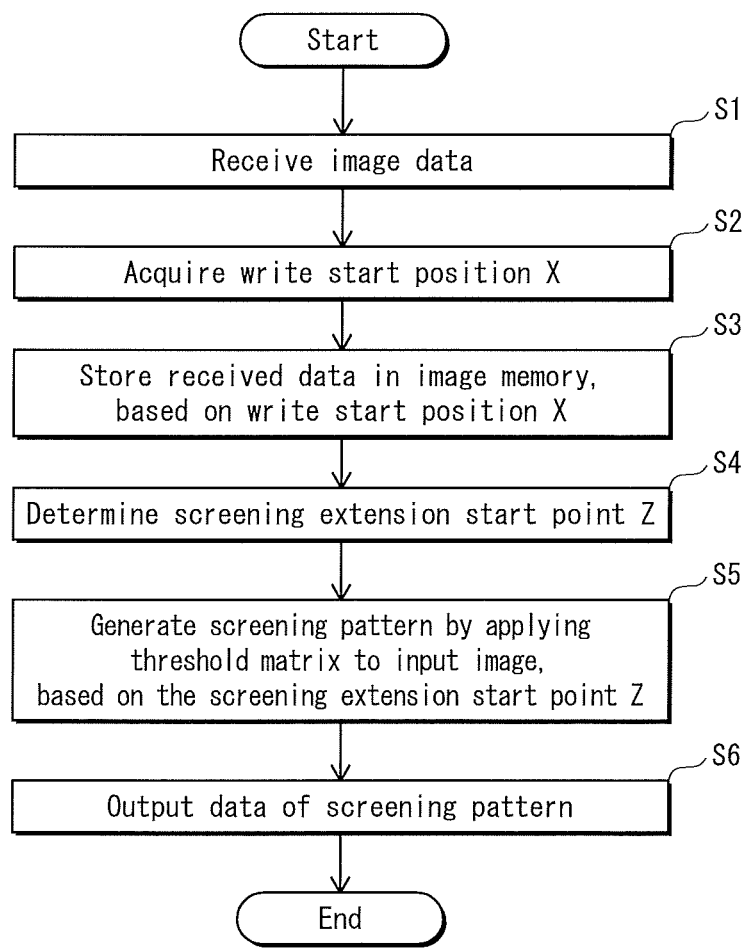
FIG. 24 is a flowchart showing creation processing of a screening pattern.

FIG. 24 is a flowchart showing creation processing of a screening pattern of K color executed by the screening processor 57K, which is executed each time a screening pattern is generated.

As shown in FIG. 24, image data of an input image that is a target of K color screening is received (step S1). Subsequently, a current write start position X for K color is acquired (step S2). This acquisition is performed by reading data of a K color write start position βk from the write start position storage unit 52.

Subsequently, the received image data is stored in the image memory 581 based on the write start position X acquired (step S3). This storage is performed by writing gradation values $D_1$, $D_2$ . . . of pixels 2-1, 2-2 . . . of the image data, for each main scanning line, to pixel storage regions 5-1, 5-2 . . . of the image memory 581 shown in FIG. 14 and FIG. 17, and more specifically to pixel storage regions from a pixel storage region corresponding to the write start position X in the main scanning direction with respect to the reference position R in the main scanning direction onwards (in the example of FIG. 14, pixel storage regions 5-1, 5-2, 5-3 . . . , and in the example of FIG. 17, pixel storage regions 5-8, 5-9, 5-10 . . . ).

Subsequently, the screening extension start point Z is determined (step S4). Here, the screening extension start point Z is fixed at the pixel storage region 5-1. According to Embodiment 2, described later, the screening extension start point Z is changed according to the write start position X.

Based on the screening extension start point Z, the threshold matrix 110 is applied to the input image to generate a screening pattern (step S5).

More specifically, as shown in FIG. 14 and FIG. 17, the threshold matrix 110 is applied to values stored in pixel storage regions with the pixel storage region 5-1 (light-emitting element A1) of the image memory 581 as an origin, to execute screening processing and obtain pattern data as shown in FIG. 15 and FIG. 22. The pattern data is stored in the image memory 582.

Subsequently, pattern data of the screening pattern that is generated is outputted to the output unit 58X (step S6) and processing ends.

As described above, according to Embodiment 1, regardless of whether or not there is a change to the write start position X, the screening extension start point Z is fixed to the pixel storage region 5-1 (light-emitting element A1) and the threshold matrix applied.

Thus, in a pattern portion 118 (see FIG. 23: pixels from the write start position after the change onwards in the main scanning direction), the screening pattern 112 after a change in the write start position X has the same cycle F of concentration changes and the same phase in the main scanning direction as the screening pattern 111 before the change.

Thus, among pixels that constitute the screening pattern 111 and the screening pattern 112, before and after the change in the write start position X, the same-numbered pixels, counting from the reference position R in the main scanning direction, for example pixels 7-8, 7-9, etc., are associated with the same light-emitting elements, for example light-emitting elements B4, C1, etc.

Accordingly, light-emitting elements corresponding to black pixels of the screening pattern before and after a change in the write start position X do not change, and variation in concentration of pixels of screening patterns can be suppressed.

An example is described of the write start position X changing from 1 to 8, but this is not a limitation, and the write start position may change from 8 to 2, for example. In this case, gradation values $D_1$, $D_2$, $D_3$ . . . of pixels 2-1, 2-2, 2-3 . . . of the input image are stored in the pixel storage regions 5-2, 5-3, 5-4 . . . as shown in FIG. 17. The threshold matrix 110 is applied to the origin point of the pixel storage region 5-1, which is fixed as the screening extension start point Z, and the screening pattern generated. According to this screening pattern, for each main scanning line, the pixel 7-1, which is the reference position R side of the write start position X (=2), becomes a white pixel, in contrast to the screening pattern 111 shown in FIG. 16, and from pixel 7-2 onwards each pixel in the main scanning direction is the same pattern as the screening pattern 111.

Embodiment 2

According to Embodiment 1, the screening extension start point Z is fixed, regardless of changes to the write start position X, but according to Embodiment 2, position of the screening extension start point Z changes according to changes in the write start position X, which is a difference from Embodiment 1. In order to avoiding overlapping description, description of content that is the same as Embodiment 1 is omitted below, and the same elements are assigned the same reference signs. Further, unless otherwise stated, from the colors Y to K, only the screening pattern for K color is described.

Figure 25A:
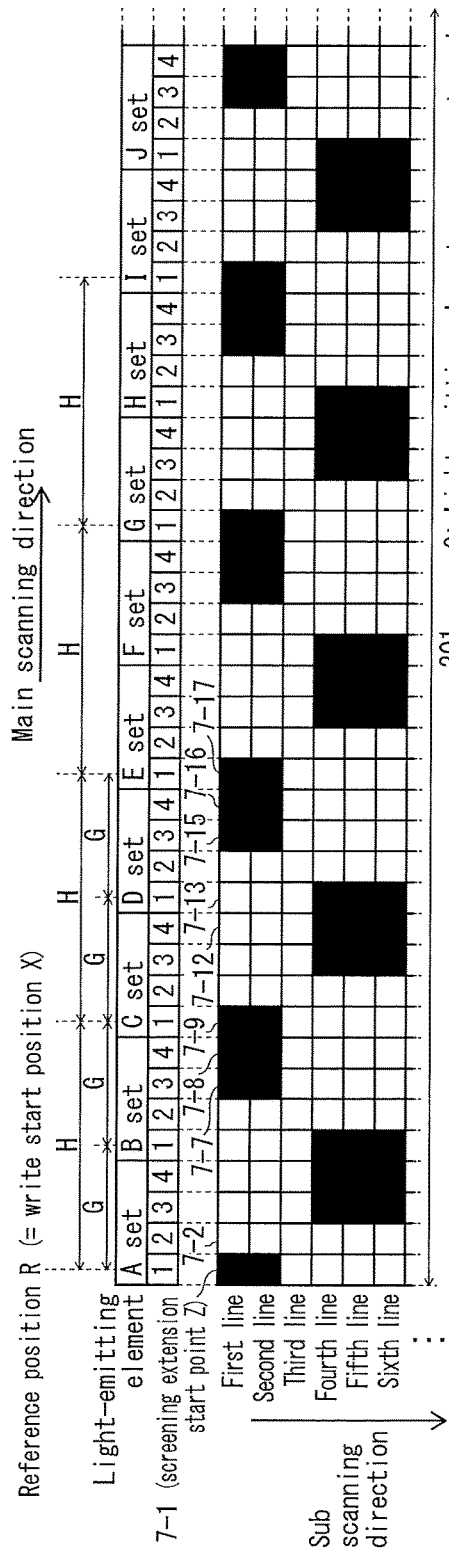
FIG. 25A shows an example of a screening pattern pertaining to Embodiment 2 when a write start position is at a reference position.

FIG. 25A shows an example of a screening pattern 201 when the write start position X is at the reference position R. In the screening pattern 201, on the first line and the second line, first pixels 7-1 at the reference position R are black, and from second pixels onwards are rows of five white pixels, then rows of three black pixels, repeating in this order. On the fourth to sixth lines, first and second pixels are white pixels, and from third pixels onwards are rows of three black pixels, then five white pixels, repeating in this order.

The screening pattern 201 is different from the screening pattern 111 shown in FIG. 16, but both are cyclic patterns in which black pixels appear in a certain cycle, that is, both are examples of screening patterns that cyclically change concentration in the main scanning direction.

Figure 25B:
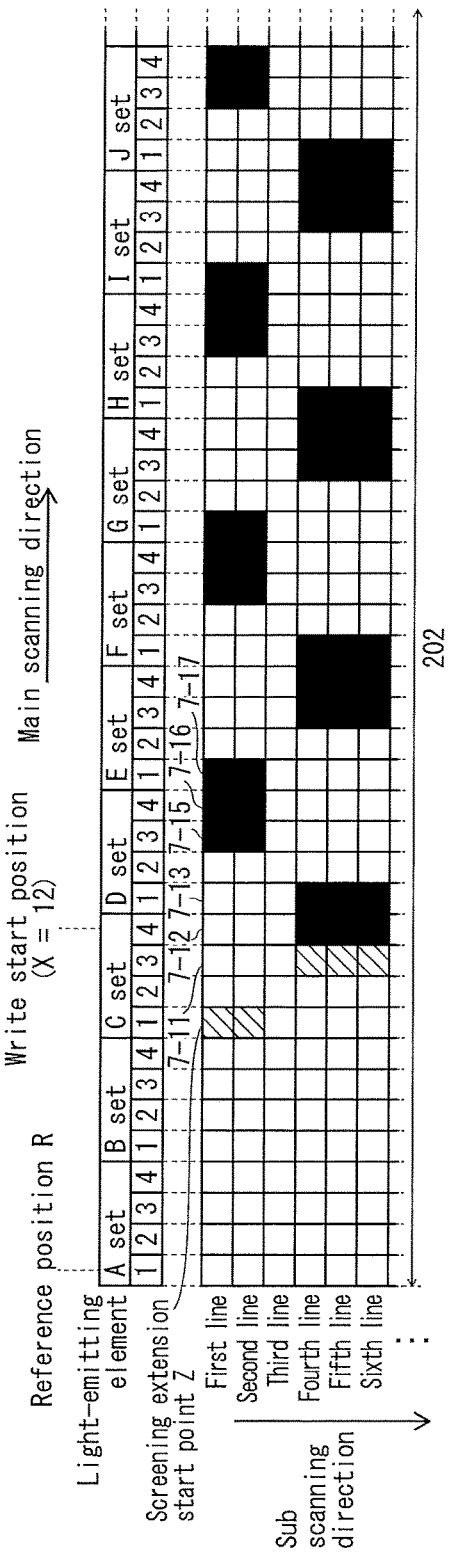
FIG. 25B shows an example of a screening pattern pertaining to Embodiment 2 when the write start position changes.

FIG. 25B shows an example of a screening pattern 202 in which the write start position X is changed to 12 from the screening pattern 201 shown in FIG. 25A.

The screening pattern 202, for each main scanning line, follows exactly the same pattern (same cycle, same phase) in the main scanning direction from the write start position X (=12) for the pixels 7-12, 7-13 . . . as the pixels 7-12, 7-13 . . . in the screening pattern 201. For example, black pixels 7-15, 7-16, 7-17 are expressed by the same light-emitting elements D3, D4, E1 according to the screening pattern 201 and the screening pattern 202. Thus, as in Embodiment 1, irregularity of concentration of pixels of the screening pattern is avoided.

According to the screening pattern 201, the screening extension start point Z is the light-emitting element A1 (corresponding to the pixel storage region 5-1), while according to the screening pattern 202, the screening extension start point Z is the light-emitting element C1 (corresponding to the pixel storage region 5-9).

The screening extension start point Z indicates a start point for application of the threshold matrix 110 to values stored in the pixel storage regions 5-1, 5-2 . . . of the image memory 581, as shown in FIG. 14 and FIG. 17. Accordingly, changing the screening extension start point Z from the light-emitting element A1 to the light-emitting element C1 means that, for each main scanning line, among the pixel storage regions 5-1, 5-2 . . . of the image memory 581, the threshold matrix 110 is applied to pixel storage regions from the pixel storage region 5-9 onwards in the main scanning direction.

Screening processing using the threshold matrix 110 is performed by a CPU (not illustrated) provided to the screening processors 57Y, 57M, 57C, 57K, but as the number of comparisons between gradation values of pixels of the input image and thresholds of the threshold matrix 110 increases, load on the CPU increases.

Accordingly, adopting a configuration in which the threshold matrix 110 is not applied to a portion of the pixel storage regions can decrease the load on the CPU, and reduce total time required for screening processing.

When changing the screening extension start point Z, it becomes necessary that the screening pattern 202 after the change to the write start position X satisfies conditions of having the same cycle F and the same phase in the main scanning direction as the screening pattern 201 before the change to the write start position X.

According to Embodiment 2, the pixel storage region (or light-emitting element) of the screening extension start point Z after the change in the write start position X is determined based on an arrangement cycle G of light-emitting elements 1 in the sub scanning direction and a screening arrangement cycle H in the main scanning direction. The following describes specifics of this method.

The arrangement cycle G of light-emitting elements 1 is a sub scanning direction row number when the plurality of light-emitting elements 1 is arranged in a staggered arrangement in which a plurality of light-emitting element rows each including light-emitting elements are lined up along the main scanning direction, the plurality of light-emitting element rows being lined-up along the sub scanning direction, and each of the light-emitting elements 1 included in each of the light-emitting element rows being disposed in a different position along the main scanning direction. Here, G is equal to 4. The arrangement cycle G is a fixed value in the light-emitting element array 100.

The screening arrangement cycle H is the same as the cycle F shown in FIG. 23, and indicates a cycle of concentration changes due to pixels in the main scanning direction from the write start position X being black and white. In the example of FIG. 25A, H is equal to 8.

In order along the main scanning direction, light-emitting elements A1, A2, A3, A4, B1 . . . are assigned numbers in ascending order so that A1 is 1, A2 is 2, A3 is 3, A4 is 4, B1 is 5 . . . .

The CPU determines whether or not a number i of a light-emitting element corresponding to the write start position X matches a value U, which is equal to 1 plus a common multiple of G and H.

For example, when the write start position X is 17, i is 17, common multiples are 8, 16, 24 . . . , U is 9, 17, 25 . . . , and therefore i matches U with a value of 17. In this case, a light-emitting element E1 (corresponding to pixel storage region 5-17) corresponding to X=17 is determined to be the screening extension start point Z.

When the light-emitting element E1 is designated the screening extension start point Z, the conditions are satisfied of the cycle F of concentration changes and phase of the screening pattern in the main scanning direction being the same before and after the change in the write start position X.

When values do not match, when there is a light-emitting element J, which is a j-th light-emitting element closest to the i-th light-emitting element and closer to the reference position R than the i-th light-emitting element, where j is equal to a value of U, e.g., 9, 17, 25 . . . , the light-emitting element J becomes the screening extension start point Z.

For example, when the write start position X is equal to 12, as shown in FIG. 25B, i is 12 and does not match any value of U. In this case, a 9th light-emitting element C1 is present that is closer to the reference position R than the 12th light-emitting element C4 and closest to the 12th light-emitting element C4, and therefore the light-emitting element C1 (corresponding to the pixel storage region 5-9) is determined to be the screening extension start point Z. Thus, the threshold matrix 110 is applied to pixel storage regions in the main scanning direction from the pixel storage region 5-9 corresponding to the light-emitting element C1 in the main scanning direction for each main scanning line of the input picture.

As described above, when the write start position X corresponds to a write position of an i-th light-emitting element, and i, which is equal to X, matches a value of U, an i-th pixel storage region from the pixel storage region 5-1 at a lead position in the main scanning direction becomes the screening extension start point Z. When i does not match a value of U and there is a value of j that is equal to a value of U and closest to i among values less than i, a j-th pixel storage region becomes the screening extension start point Z.

When the screening extension start point Z is the light-emitting element C1, and the threshold matrix 110 is applied, five pixels indicated by hashing in FIG. 25B become white pixels. That is, in FIG. 25A the pixels are black, but due to the change of the write start position X to 12, they become white.

These five pixels are closer to the reference position R than the write start position X (=12), and so are not writing target pixels (will not be printed), and therefore values of five pixel storage regions corresponding to the five pixels are "0" due to initialization of the image memory 581. When compared to thresholds of the threshold matrix 110, the result of comparison is "0", indicating a white pixel.

When the light-emitting element J is not present, the light-emitting element A1 becomes the screening extension start point Z. For example, in FIG. 25A, when the write start position X is equal to 8, the light-emitting element J is not present, and the light-emitting element A1 is determined to be the screening extension start point Z. The determination of the screening extension start point Z is executed in step S4 shown in FIG. 24.

The screening arrangement cycle H is determined according to arrangement in the main scanning direction of white pixels and black pixels of a screening pattern, and therefore the screening arrangement cycle H is different for different screening patterns.

According to the present embodiment, the same threshold matrix 110 is applied to the same input image before and after a change in the write start position X, and therefore the screening arrangement cycle H of a screening pattern obtained through screening processing is the same. Thus, for each input picture, the screening arrangement cycle H of a screening pattern after screening processing is stored in a storage (not illustrated) in association with the input picture. For example, a screening arrangement cycle Ha for an input picture A and a screening arrangement cycle Hb for an input picture B.

Subsequently, when screening processing is executed with respect to a given input image, which matches any one of input images A, B . . . , the screening arrangement cycle H corresponding to the given input image can be read from the storage. Thus, the screening arrangement cycle H corresponding to the input image to be screened can be acquired. For example, each input image is pre-assigned an identification number, and the above can be implemented by management of the identification number.

Figure 26A:
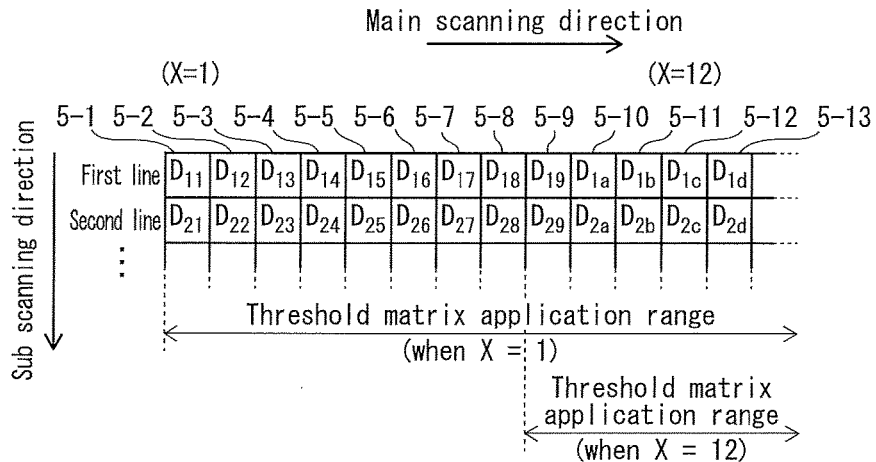
FIG. 26A shows multi-level data for pixels of an input image.

FIG. 26A shows gradation values $D_{11}$, $D_{12}$ . . . of pixels of an input image stored in pixel storage regions 5-1, 5-2 . . . of the image memory 581.

When the pixel storage region 5-1 at the reference position R is the write start position X (=1), the screening extension start point Z is the pixel storage region 5-1, and the threshold matrix 110 is applied to each pixel storage region in the main scanning direction from the pixel storage region 5-1 for each main scanning line.

When the write start position X is changed to 12 (FIG. 25B), the screening extension start point Z is changed to the pixel storage region 5-9, and the threshold matrix 110 is applied to each pixel storage region in the main scanning direction from the pixel storage region 5-9 for each main scanning line.

Figure 26B:
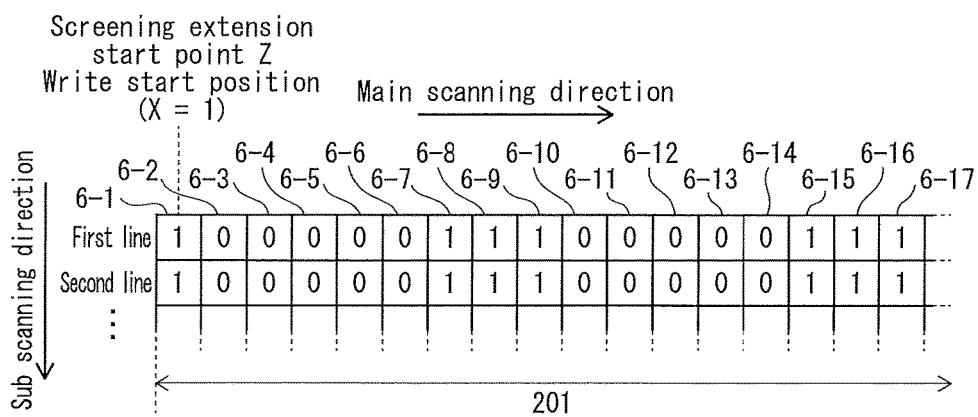
FIG. 26B shows an example of a screening pattern indicated in FIG. 26A, expressed in binary.

FIG. 26B shows an example in which when the screening extension start point Z is the pixel storage region 5-1, and the screening pattern 201 after screening processing is expressed in binary. Binary data (0 or 1) of the screening pattern 201 is shown stored in pixel storage regions 6-1, 6-2, 6-3 . . . of the image memory 582.

Figure 26C:
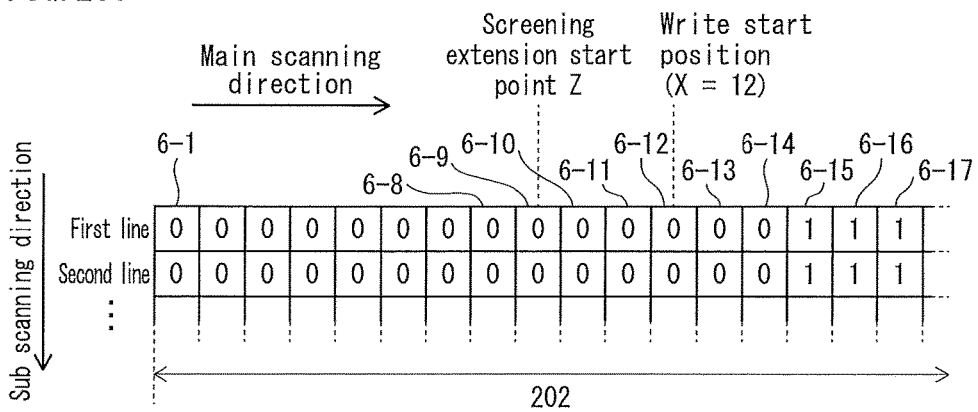
FIG. 26C shows an example of a screening pattern indicated in FIG. 26B, expressed in binary.

FIG. 26C shows an example in which when the screening extension start point Z is changed to the pixel storage region 5-9, and the screening pattern 202 after screening processing is expressed in binary. In FIG. 26C, pixel storage regions 6-1 to 6-11 have values "0" indicating white pixels, and values of pixel storage regions in the main scanning direction from the pixel storage region 6-12 are the same as binary data (0 or 1) to the screening pattern 201 shown in FIG. 26B.

Thus, even when the screening extension start point Z is changed, as in the screening pattern 201 and the screening pattern 202 shown in FIG. 25A and FIG. 25B, for each main scanning line, pixels in the main scanning direction from the pixel 7-12 have the pattern in which the cycle F of concentration changes of white pixels and black pixels is the same and phase is the same. Processing to generate the screening pattern 201 and the screening pattern 202 is executed in step S5 shown in FIG. 24.

Thus, according to Embodiment 2, a pixel that becomes the screening extension start point Z changes according to a change in the write start position X, and therefore processing load of the CPU during screening processing decreases and processing time is reduced.

Embodiment 3

According to Embodiments 1 and 2, the threshold matrix 110 is applied to an input image and a screening pattern generated, but this is not a limitation.

Figure 27:
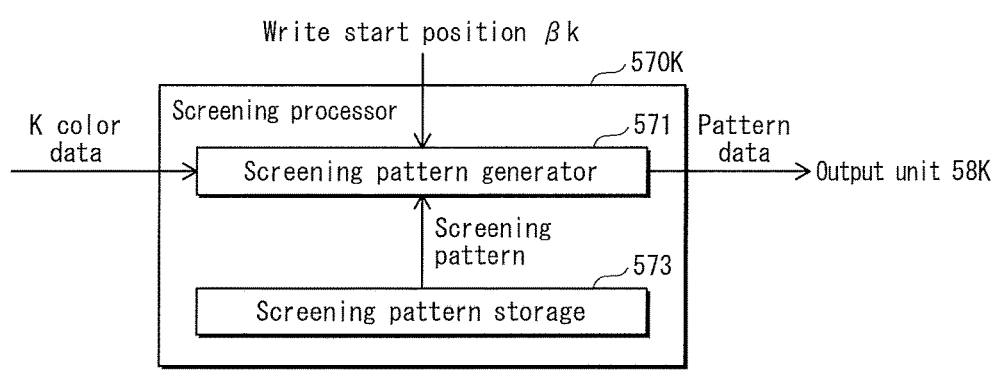
FIG. 27 shows an example configuration of a screening processor pertaining to Embodiment 3.

For example, instead of the screening processor 57K shown in FIG. 10, a screening processor 570K shown in FIG. 27 is used. A plurality of different types of screening patterns are stored in advance in a screening pattern storage 573 of the screening processor 570K, for expressing different gradation values, and a screening pattern generator 571 selects one screening pattern to apply to gradation values of an input image.

In the case of this configuration, the following screening processing is executed.

Data of a selected screening pattern is stored in the image memory 582. For example, when the selected screening pattern is the screening pattern 111, binary data of the screening pattern 111 is stored in the image memory 582. This state of storage is the same as the state shown in FIG. 15.

The present value of the write start position X is acquired. Subsequently, for pixel storage regions of the image memory 582, all pixel storage regions that are closer to the reference position R than the pixel storage region at the write start position X are overwritten with a value of 0 to generate pattern data of a screening pattern.

For example, when the write start position X is 1, a screening pattern identical to the screening pattern 111 shown in FIG. 16 is generated. When the write start position X is 8, a screening pattern identical to the screening pattern 112 shown in FIG. 21 is generated.

According to this configuration, processing to compare thresholds of the threshold matrix 110 to gradation values of every pixel of an input image becomes unnecessary, and processing is correspondingly simplified. A configuration is possible in which only one screening pattern is prepared in advance.

Embodiment 4

According to Embodiment 2, the screening extension start point Z changes according to a change in the write start position X, but according to Embodiment 4, based on the configuration of Embodiment 1, regardless of a change in the write start position X, the screening extension start point Z changes when a predefined condition is satisfied, and this is where Embodiment 4 differs from Embodiment 1 and Embodiment 2.

Figure 28A:
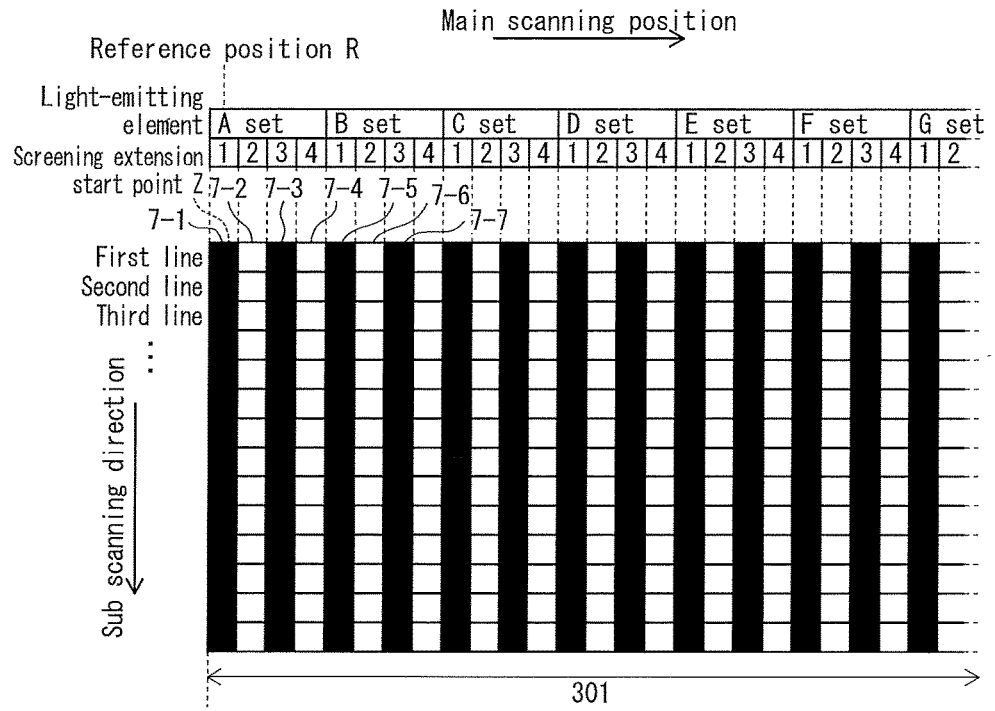
FIG. 28A shows an example of a screening pattern pertaining to Embodiment 4.

FIG. 28A shows an example of a screening pattern 301 when the screening extension start point Z is the light-emitting element A1 corresponding to the pixel 7-1 at the reference position R.

As shown in FIG. 28A, the screening pattern 301, for each main scanning line, is a pattern of alternating black pixels and white pixels in the main scanning direction: black pixel 7-1, white pixel 7-2, black pixel 7-3, white pixel 7-4 . . . .

When the screening pattern 301 is generated, light-emitting elements A1, A3, B1, B3 . . . , which correspond to black pixels 7-1, 7-3, 7-5, 7-7 . . . , emit light, and light-emitting elements A2, A4, B2 . . . , which correspond to white pixels 7-2, 7-4, 7-6 . . . , do not emit light. That is, when the screening pattern 301 is generated, light-emitting elements 1 that emit light and light-emitting elements 1 that do not emit light are fixed, and a cumulative light emission time of elements that emit light continues to increase.

The light-emitting elements 1 have a property of light emission amounts gradually decreasing as the cumulative light emission time increases. Accordingly, when elements that emit light and elements that do not emit light are fixed, a large difference in light emission time occurs between the elements that emit light and the elements that do not emit light, and light-emitting elements for which the cumulative light emission time becomes long may prematurely reach the end of their functional life.

In order to avoid only specific light-emitting elements emitting light for each screening pattern generated, each light-emitting element may alternate between emitting light and not emitting light between a certain period of time and a next period of time.

When pixels are arranged in a pattern of alternating between black pixels and white pixels in the main scanning direction as shown in the screening pattern 301, switching each pixel between emitting light and not emitting light can be achieved by switching the screening extension start point Z between the light-emitting element A1 and the light-emitting element A2 each time the screening pattern is generated.

Figure 28B:
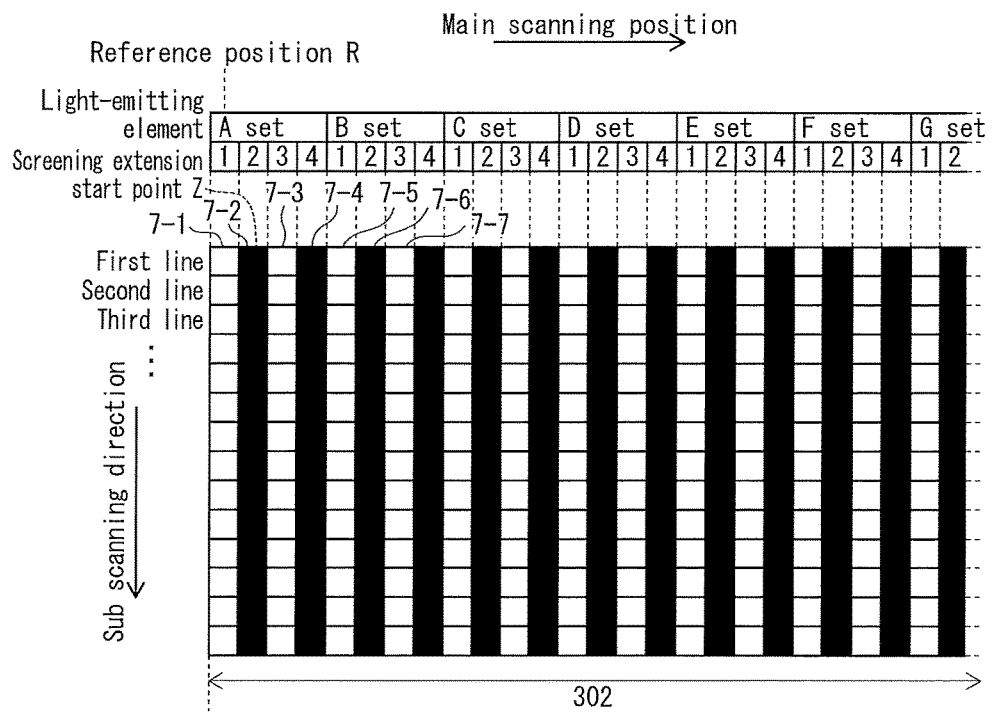
FIG. 28B shows an example of a screening pattern when the screening pattern shown in FIG. 28A has a changed screening extension start point.

FIG. 28B shows an example of a screening pattern 302 when the screening extension start point Z is switched from the light-emitting element A1 to the light-emitting element A2.

As shown in FIG. 28B, the screening pattern 302 is a pattern in which, for each main scanning line, white pixels and black pixels alternate in the main scanning direction, so the entirety of the screening pattern 301 shown in FIG. 28A is shifted one pixel in the main scanning direction. That is, the screening pattern 301 and the screening pattern 302 have the same cycle F in the main scanning direction, but the phase thereof is shifted one pixel. However, the screening pattern 301 and the screening pattern 302 have the same cycle F, and therefore the same gradation can be simulated.

As a predefined condition for switching the screening extension start point Z, a cumulative print count Pa according to print jobs can be used, for example. The cumulative print count Pa is a total number of sheets S that have been printed on, and each time printing on one of the sheets S is executed, the cumulative print count Pa is incremented by 1, and updated to a new cumulative print count Pa. The cumulative print count Pa is stored in a storage that is not illustrated.

A predefined value can be used to determine that the predefined condition is satisfied, for example each time the cumulative print count Pa reaches a multiple of 1000.

FIG. 29 shows a relationship between the cumulative print count Pa and the screening extension start point Z. As shown in FIG. 29, when the cumulative print count Pa reaches multiples of 1000, i.e., 1000, 2000, 3000 . . . , the screening extension start point Z switches between the light-emitting element A1 and A2. Generation of a K color screening pattern is executed to satisfy this relationship.

Figure 30:
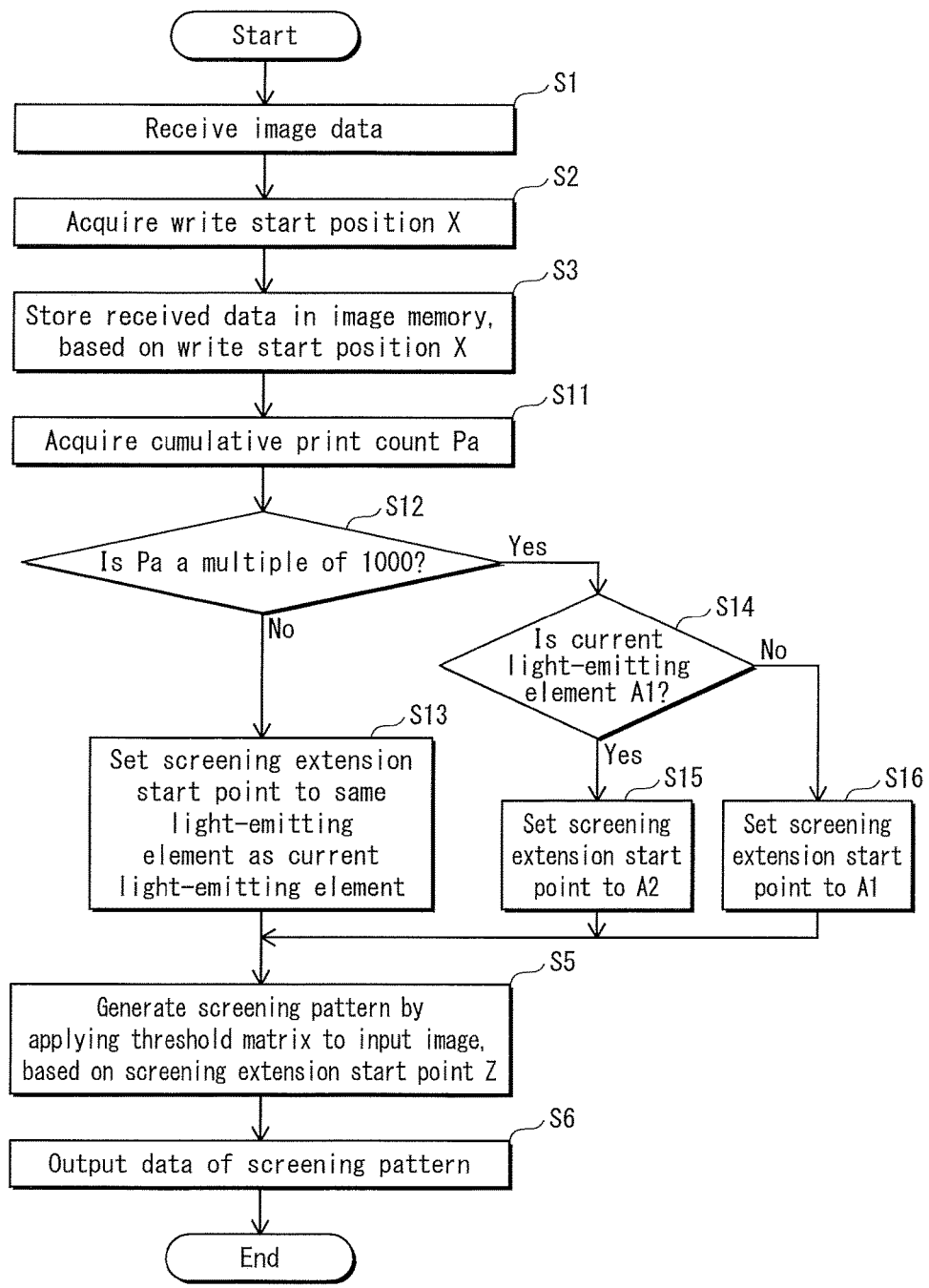
FIG. 30 is a flowchart showing creation processing of a screening pattern pertaining to Embodiment 4.

FIG. 30 is a flowchart showing content of generation of a K color screening pattern pertaining to Embodiment 4. Instead of step S4 from the flowchart shown in FIG. 24, steps S11 to S16 are executed.

In step S11, the cumulative print count Pa is acquired. This acquisition is performed by reading the cumulative print count Pa from the storage, as mentioned above.

Subsequently, the screening processor determined whether or not the cumulative print count Pa is a multiple of 1000 (step S12) (1000 in the following example).

When the cumulative print count Pa is any value from 1 to 999, the screening processor determines that the cumulative print count Pa is not equal to a multiple of 1000 ("No" at step S12), the screening extension start point Z is set to the light-emitting element A1 or A2 of the current screening extension start point A (step S13), and processing proceeds to step S5.

For example, when the screening extension start point Z is set to the light-emitting element A1, in step S5, a screening pattern is generated by applying the threshold matrix 110 to an origin, which is the pixel storage region 5-1 corresponding to the light-emitting element A1, with respect to an input image. For example, the screening pattern 301 shown in FIG. 28A is generated. Subsequently, after executing step S6, processing is completed.

Subsequently, when screening processing is executed with respect to the same input image, steps from step S1 are executed, but if the cumulative print count Pa does not reach 1000 ("No" at step S12), steps S13, S5, S6 are executed in order.

Figure 31A:
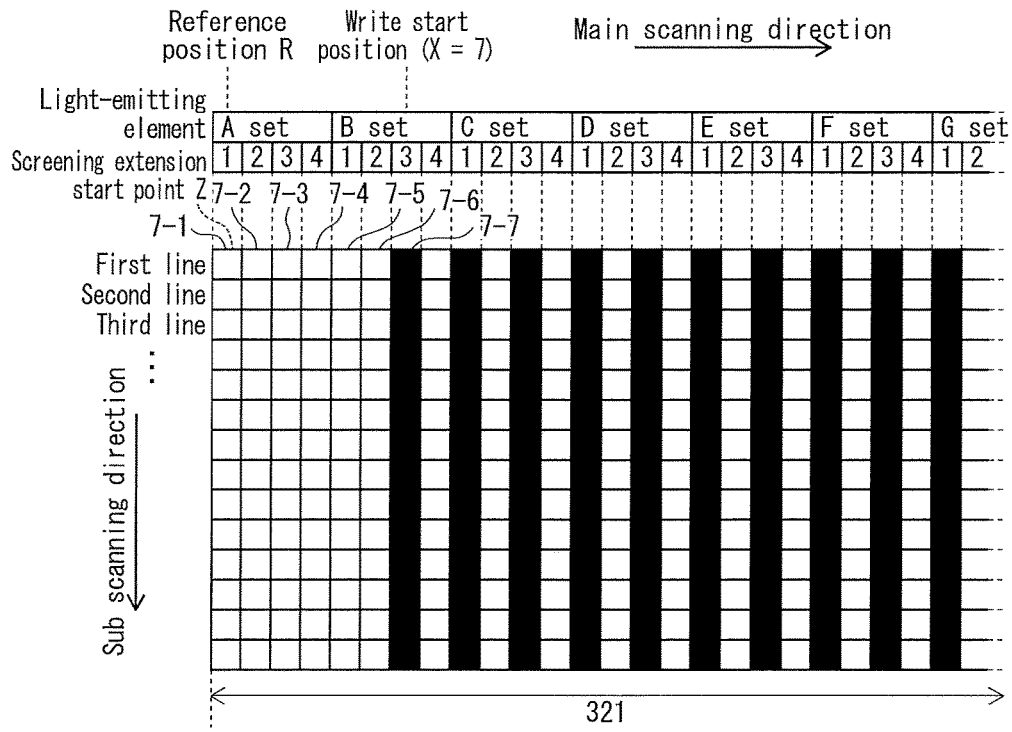
FIG. 31A shows an example of a screening pattern created after a write start position is changed according to the screening pattern shown in FIG. 28A.

For example, when the write start position X is changed due to execution of an image stabilization operation between screening processing when the cumulative print count Pa is 700 and subsequent screening processing, the following processing occurs. For example, when the screening extension start point Z is the light-emitting element A1, and the write start position X is changed to 7, for each main scanning line, pixels 7-1 to 7-6 are white pixels, and from pixel 7-7 onwards a screening pattern is generated indicating a pattern with a same cycle and phase as the screening pattern 301, as shown in a screening pattern 321 in FIG. 31A.

Until the cumulative print count Pa reaches 1000, the processing described above is repeated. Thus, before and after the change in the write start position X, the same black pixel, for example 7-7, is associated with the same light-emitting element, for example B-3. Accordingly, while the cumulative print count Pa is 1 to 999, unevenness in concentration of black pixels of a screening pattern due to a change in write start position X is prevented. Until the cumulative print count Pa reaches 1000, the screening extension start point Z is maintained as the light-emitting element A1.

Returning to FIG. 30, when the screening processor determines that the cumulative print count Pa is equal to 1000 ("Yes" at step S12), the screening processor determines whether or not the screening extension start point Z is the light-emitting element A1 (step S14).

When the screening processor determines that the screening extension start point Z is the light-emitting element A1 ("Yes" at step S14), the screening extension start point Z is set to the light-emitting element A2 (step S15), and processing proceeds to step S5.

In step S5, a screening pattern is generated by applying the threshold matrix 110 to the pixel storage region 5-2 as the screening extension start point Z, which corresponds to the light-emitting element A2, with respect to the input image. For example, when the write start position X is 1, the screening pattern 302 shown in FIG. 28B is generated. Subsequently, after executing step S6, processing is completed.

Subsequently, when screening processing is executed, steps from step S1 are executed, but if the cumulative print count Pa is a value from 1000 to less than 2000 ("No" at step S12), steps S13, S5, S6 are executed in order.

Figure 31B:
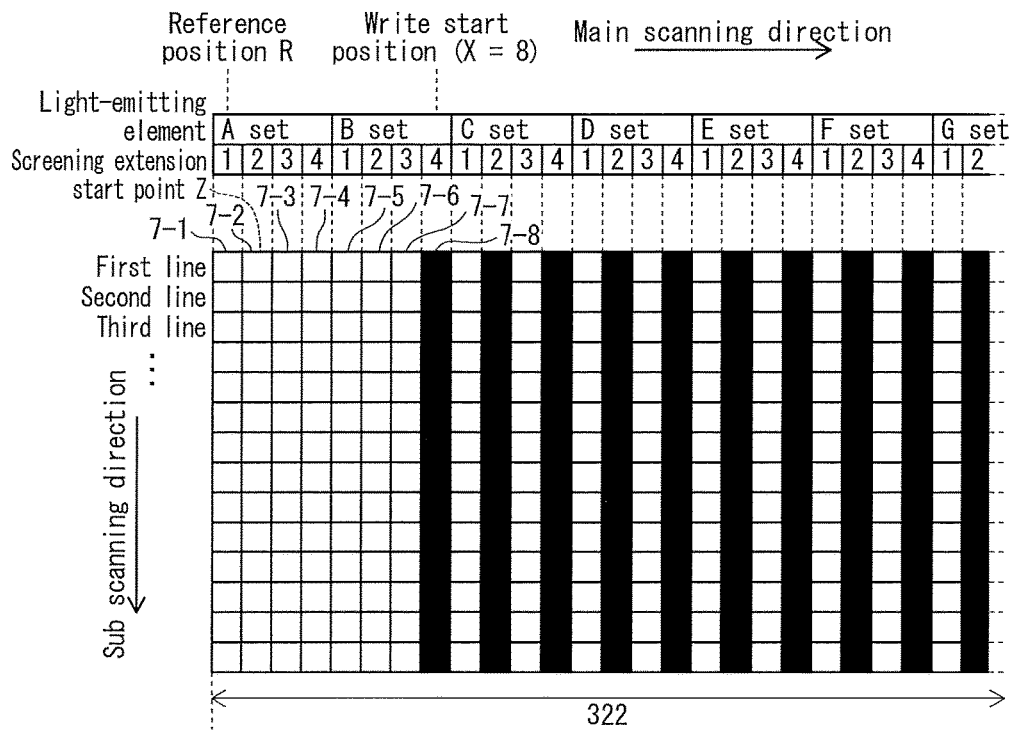
FIG. 31B shows an example of a screening pattern created after a write start position is changed according to the screening pattern shown in FIG. 28B.

For example, when the write start position X is changed due to execution of an image stabilization operation between screening processing when the cumulative print count Pa is 1500 and subsequent screening processing, the following processing occurs. For example, when the screening extension start point Z is the light-emitting element A2 and the write start position X is changed to 8, for each main scanning line, pixels 7-1 to 7-7 indicate white pixels, and a screening pattern is generated indicating a pattern having an identical cycle and phase to the screening pattern 302 from pixel 7-8 onwards, as in a screening pattern 322 shown in FIG. 31B.

Until the cumulative print count Pa reaches 2000, the processing described above is repeated. Thus, before and after the change in the write start position X, the same black pixel, for example 7-8, is associated with the same light-emitting element, for example B-4, and therefore, while the cumulative print count Pa is 1000 to 1999, unevenness in concentration of black pixels of a screening pattern due to a change in write start position X is prevented. Until the cumulative print count Pa reaches 2000, the screening extension start point Z is maintained as the light-emitting element A2.

Returning to FIG. 30, when the screening processor determines that the cumulative print count Pa is equal to 2000 ("Yes" at step S12), and the screening processor determines that the screening extension start point Z is the light-emitting element A2 ("No" at step S14), the screening extension start point Z is set to the light-emitting element A1 (step S16), and processing proceeds to step S5.

In this case, in step S5, a screening pattern is generated by applying the threshold matrix 110 to the pixel storage region 5-1 as the screening extension start point Z, which corresponds to the light-emitting element A1, with respect to the input image, as when the cumulative print count Pa is 1 to 999. For example, the screening pattern 301 shown in FIG. 28A is generated.

Each time the cumulative print count Pa reaches a multiple of 1000, the screening extension start point Z switches between the light-emitting element A1 and A2. Thus, when the screening pattern 301 is generated, light-emitting elements A1, A3, B1 . . . corresponding to pixels 7-1, 7-3, 7-5 . . . emit light, and when the screening pattern 302 is generated, light-emitting elements A2, A4, B2 . . . corresponding to pixels 7-2, 7-4, 7-6 . . . emit light.

Thus, the cumulative light emission time of each of the light-emitting elements 1 is averaged out, generation of the screening patterns 301, 302 avoiding a shortening of lifespan due to only specific light-emitting elements emitting light, and therefore a lifespan of the light-emitting element array 100 can be increased.

From a time of switching the screening extension start point Z until the cumulative print count Pa reaches a multiple of 1000, the screening extension start point Z is maintained as one of the light-emitting element A1 or the light-emitting element A2, and even when the write start position X is changed due to execution of an image stabilization operation, the screening pattern before the change and the screening pattern after the change both have the same cycle and phase.

Accordingly, even after the cumulative print count Pa has reached 3000, unevenness in concentration of black pixels of a screening pattern due to a change in write start position is prevented between a switching of the screening extension start point Z and a subsequent switch.

According to the above, an example is described using a value of 1000 as a value of the cumulative print count Pa as a predefined condition for switching the screening extension start point Z, but other values may be used. Further, information indicating a cumulative light emission time of the light-emitting elements 1 is not limited to the cumulative print count Pa. For example, a cumulative execution time of print jobs or a cumulative drive time of the photoreceptor drum 11 can be used. Such information is acquired when generating a screening pattern, and switching of the screening extension start point Z is executed when the screening processor determines that the cumulative light emission time has reached a predefined time based on the information acquired.

Embodiment 5

According to Embodiments 1 to 4, the light-emitting elements 1 used in generating the screening pattern are not specifically limited, but according to Embodiment 5, use of specific light-emitting elements is limited.

Figure 32A:
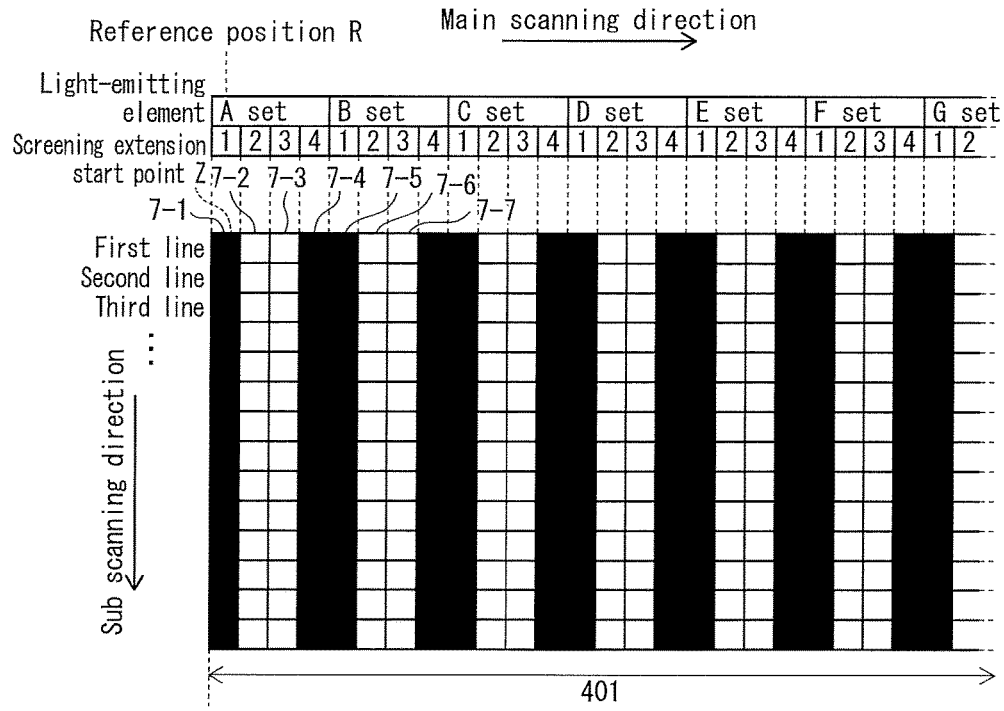
FIG. 32A and FIG. 32B show examples of screening patterns pertaining to Embodiment 5.

FIG. 32A shows an example of a screening pattern 401 (first screening pattern) that limits light-emitting elements used.

As shown in FIG. 32A, the screening pattern 401, for each main scanning line, expresses black pixels by light-emitting elements A1, A4, B1, B4, C1, C4 . . . at either end of light-emitting element sets A, B, C . . . , and therefore in the main scanning direction there is a cycle of a black pixel 7-1, white pixels 7-2, 7-3, black pixels 7-4, 7-5, white pixels 7-6, 7-7, black pixel 7-8 . . . .

Light-emitting elements A1, B1, C1 . . . are in the light-emitting element row 101 shown in FIG. 6, and light-emitting elements A4, B4, C4 . . . are in the light-emitting element row 104. The light-emitting element row 101 is farther in the sub scanning direction from the central axis 62b of the rod-lens array 62 than the light-emitting element row 102, and the light-emitting element row 104 is farther in the sub scanning direction from central axis 62b of the rod-lens array 62 than the light-emitting element 103.

The rod-lens array 62 normally has lens properties such that variability in light intensity distribution of the beam spots 3 is more likely to occur when focusing light on the photoreceptor drum 11 from light beams transmitted therethrough at positions distant from the central axis 62b than from light beams transmitted therethrough at positions near or on the central axis 62b.

Among the light-emitting element rows 101, 102, 103, 104, this means that the effect of variation in light intensity distribution due to the lens properties is more likely to occur for the light-emitting elements 1 in the light-emitting element rows 101, 104 at farthest positions from the central axis 62b in the sub scanning direction than for the light-emitting elements 1 in the light-emitting element rows 102, 103 near the central axis 62b in the sub scanning direction.

The screening pattern 401 shown in FIG. 32A results in black pixels being expressed by light-emitting elements A1, A4, B1, B4, C1, C4 . . . in the light-emitting element rows 101, 104 at either end in the sub scanning direction, which are more likely to be affected by variation in light intensity distribution. Accordingly, as in Embodiment 1, even when the write start position X changes and control is performed wherein a screening pattern before the change and a screening pattern after the change have the same pattern cycle F and phase, if variation in light intensity distribution due to lens properties is large, concentration of black pixels of the screening pattern can be easily affected.

Figure 32B:
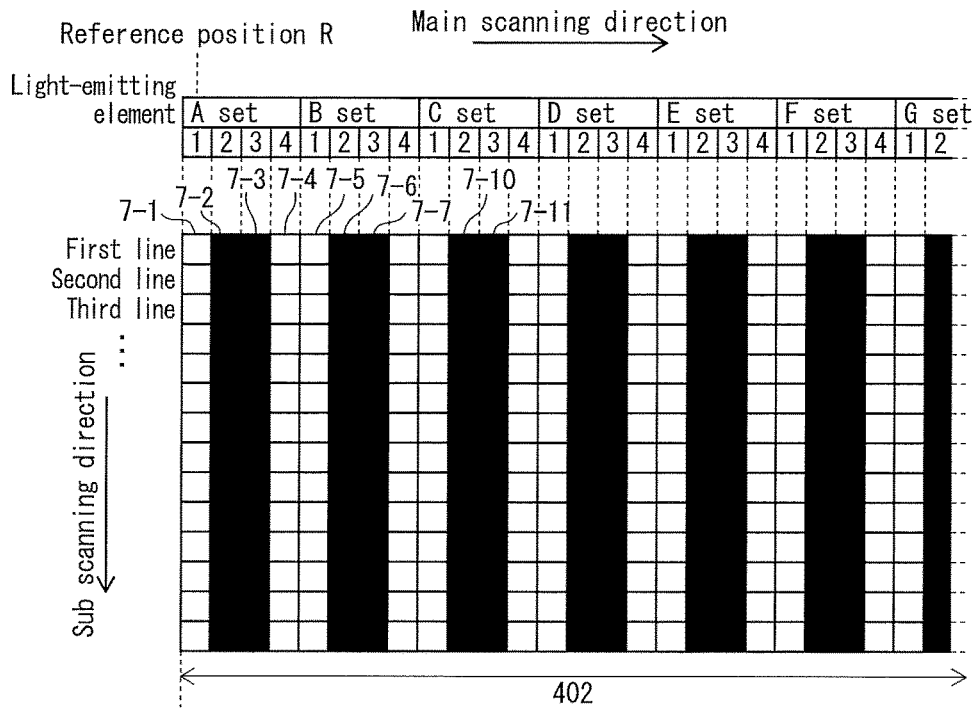

According to Embodiment 5, black pixels 7-2, 7-3, 7-6 7-7, 7-10, 7-11 . . . are expressed by light-emitting elements A2, A3, B2, B3, C2, C3 . . . in the light-emitting element rows that are central and not easily affected by light intensity distribution variation due to lens properties of the rod-lens array 62, as in a screening pattern 402 (second screening pattern) shown in FIG. 32B.

More specifically, first, binary data (pattern data) of a screening pattern is acquired by applying the threshold matrix to an input image.

Figure 33:
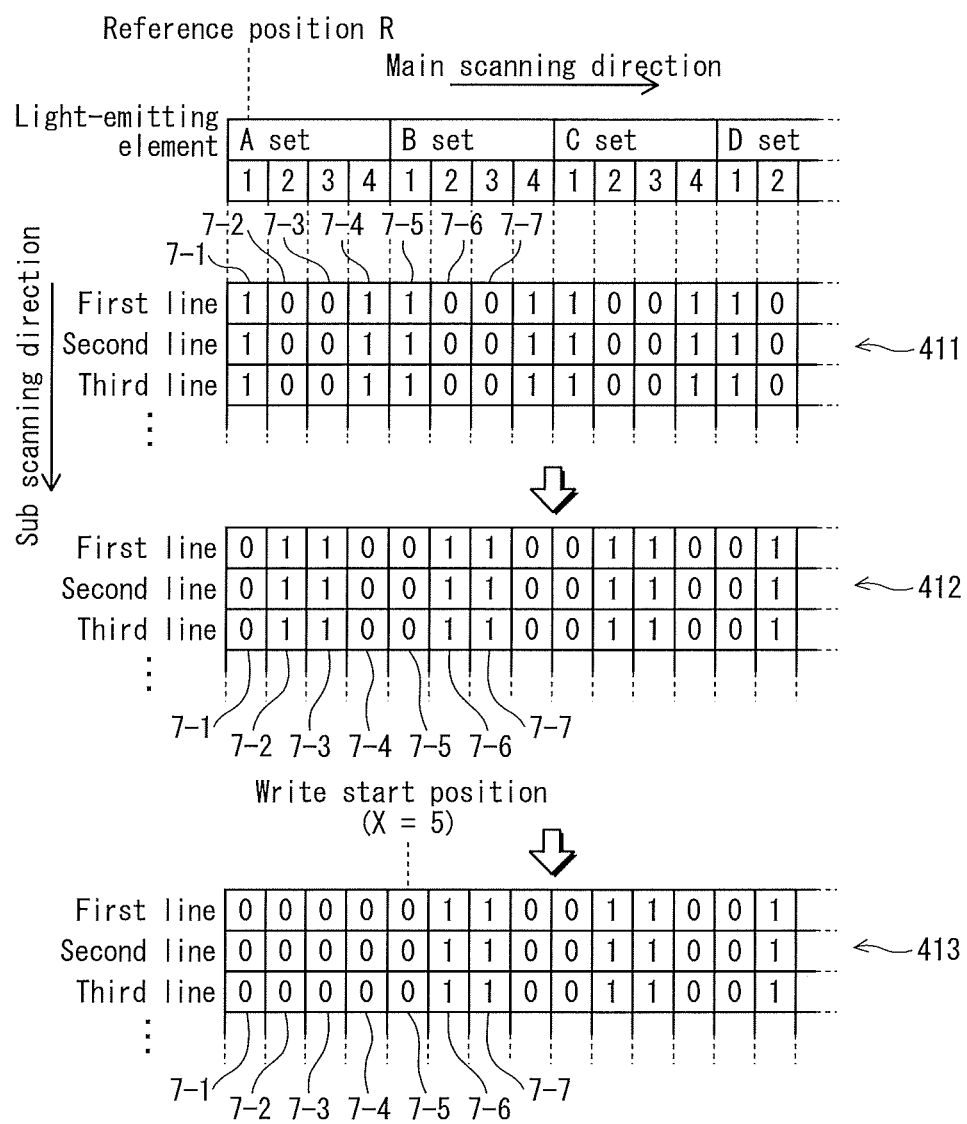
FIG. 33 shows examples of screening patterns expressed in binary.

FIG. 33 shows an example of pattern data 411, which corresponds to binary data of the screening pattern 401.

Looking at the pattern data 411, black pixels 7-1, 7-4, 7-5, 7-8 . . . are expressed by the light-emitting elements A1, A4, B1, B4 . . . . These light-emitting elements are in the light-emitting element rows 101, 104 that are easily affected by variation in light intensity distribution due to lens properties of the rod-lens array 62, and therefore an effect on concentration of black pixels is more likely.

Figure 34:
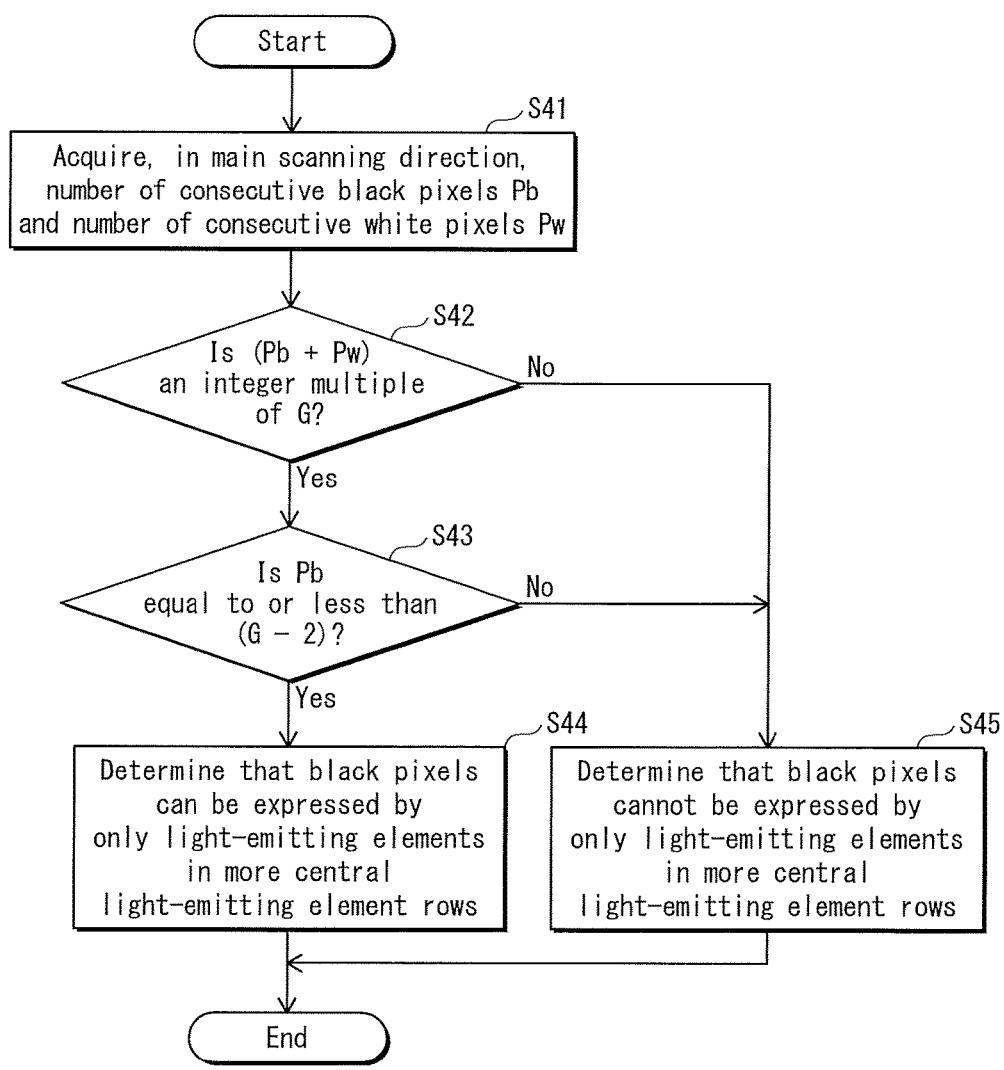
FIG. 34 is a flowchart showing judgment processing pertaining to Embodiment 5.

When black pixels are only expressed by light-emitting elements in the light-emitting element rows 101, 104, the screening processor 57K determines whether or not the black pixels can be expressed by only using light-emitting elements in the light-emitting element rows 102, 103, by the flowchart of processing shown in FIG. 34.

FIG. 34 is a flowchart showing this processing.

As shown in FIG. 34, pixel values of the pattern data 411 are referenced to acquire, in the main scanning direction, a black pixel consecutive count Pb and a white pixel consecutive count Pw (step S41). In the example in FIG. 33, Pb is 2 and Pw is 2.

Subsequently, the screening processor 57K determines whether or not (Pb+Pw) is an integer multiple of the arrangement cycle G of the light-emitting elements 1 (step S42). In the example of the pattern data 411 shown in FIG. 33, G is 4 and (Pb+Pw) is 4, which is an integer multiple.

When (Pb+Pw) is an integer multiple of G ("Yes" in step S42), the screening processor 57K determines whether or not Pb is equal to or less than (G−2) (step S43). Here, (G−2) is the number of light-emitting element rows aside from the light-emitting element rows at either end in the sub scanning direction. In the example of FIG. 6, there are two central light-emitting element rows, the light-emitting element rows 102, 103. In the example of the pattern data 411 shown in FIG. 33, Pb=2, and (G−2) is 2, and therefore the determination is affirmative.

When an affirmative determination is made ("Yes" in step S43), the screening processor 57K determines that the black pixels can be expressed by using only light-emitting elements in the light-emitting element rows 102, 103 (step S44), and this processing ends.

In this case, the screening processor 57K does not change a pattern cycle (cycle of concentration changes in the main scanning direction) for each main scanning line, expresses black pixels by light-emitting elements in the light-emitting element rows 102, 103, which are central, and expresses white pixels by light-emitting elements in the light-emitting element rows 101, 104, which are at either end in the sub scanning direction, by executing processing that shifts the phase of the pattern data 411 by two pixels to change to pattern data 412 (FIG. 33).

More specifically, the pattern data 412 is generated by collectively shifting pixel values of the pattern data 411 by two pixels in the main scanning direction, so values of pixels 7-2, 7-3, 7-6, 7-7 . . . are rewritten with values of "1" as black pixels, and values of pixels 7-1, 7-4, 7-5 . . . are rewritten with values of "0" as white pixels.

When the write start position X matches the reference position R, the pattern data 412 is used as is to generate the screening pattern 402. When the write start position X is changed, to 5 for example, by a subsequent image stabilization operation, values of pixels 7-1 to 7-4 that are on the reference position R side of the write start position X are set to 0, i.e. white pixels, and a screening pattern is generated according to pattern data 413 shown in FIG. 33. This screening pattern corresponds to the screening pattern 402 shown in FIG. 32B, in which pixels 7-2 and 7-3 for each line are converted from black pixels to white pixels.

On the other hand, when a negative determination is made at either step S42 or S43 shown in FIG. 34 ("No" at step S42, "No" at step S43), the screening processor 57K determines that black pixels cannot be expressed by using only light-emitting elements in the light-emitting element rows 102, 103 (step S45), and the processing ends.

When this negative determination is made, black pixels are expressed by light-emitting elements in at least one of the light-emitting element rows 101, 104. Thus, according to the present embodiment, in this case, pixel rewriting is not executed, and the screening pattern 401 is generated by using the pattern data 411 as is.

As described above, it becomes possible to express black pixels by using only light-emitting elements in the light-emitting element rows 102, 103, which are more central and less likely to be influenced by variation in light intensity distribution due to lens properties of the rod-lens array 62, and therefore black pixels of the screening pattern 402 can be expressed at a stabilized concentration.

An example has been described in which the arrangement cycle G of light-emitting elements is equal to 4, but this is also applicable to configurations in which G is equal to 3, 5, or greater.

Figure 35A:
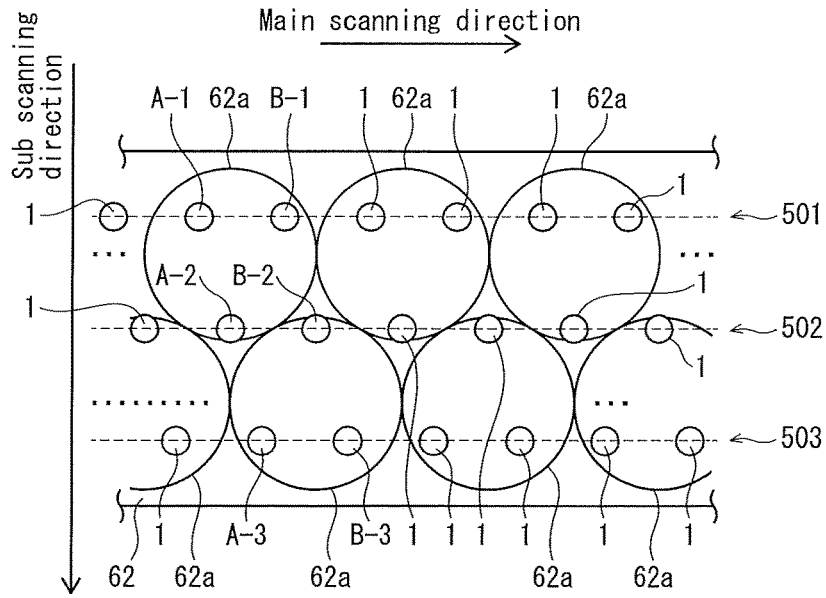
FIG. 35A is a plan view schematically showing positional relationships of light-emitting elements of a light-emitting element array and a rod-lens array in a main scanning direction and sub scanning direction, pertaining to a modification.

For example, when G is equal to 3, a light-emitting element row 502 is central, light-emitting element rows 501, 503 are at either end in the sub scanning direction, the A set of light-emitting elements includes A1, A2, A3, and the B set of light-emitting elements includes B1, B2, B3, as shown in FIG. 35A. The light-emitting elements A1, A3, B1, B3 in the light-emitting element rows 501, 503 are more easily affected by variation in light intensity distribution due to lens properties of the rod-lens array 62 than the light-emitting elements A2, B2 in the light-emitting element row 502.

Figure 35B:
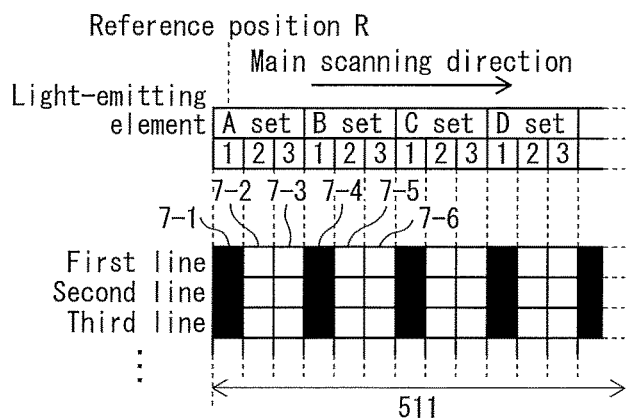
FIG. 35B and FIG. 35C show examples of screening patterns pertaining to the modification.

FIG. 35B shows an example of a screening pattern 511 in which, for each main scanning line, one black pixel is followed by two white pixels and this pattern repeats in the main scanning direction, as in a black pixel 7-1, white pixels 7-2, 7-3, a black pixel 7-4, white pixels 7-5, 7-6 . . . . According to the screening pattern 511, black pixels 7-1, 7-4 . . . are expressed by the light-emitting elements A1, B1 . . . , which are easily affected by variation in light intensity distribution due to lens properties of the rod-lens array 62.

In the screening pattern 511, Pb=1, Pw=2, and therefore (Pb+Pw) is an integer multiple of G (3), and Pb is equal to or less than (G−2), satisfying those conditions.

Figure 35C:
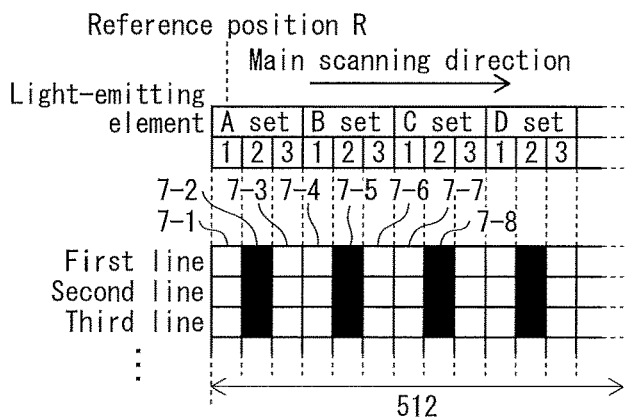

Accordingly, black pixels 7-2, 7-5, 7-8 . . . can be expressed by only using the light-emitting elements A2, B2, C2 . . . in the light-emitting element row 502, as in a screening pattern 512 shown in FIG. 35C.

Thus, as in rewriting the pattern data 411 to the pattern data 412, shown in FIG. 33, the screening pattern 511 shown in FIG. 35B can be rewritten to the screening pattern 512 shown in FIG. 35C, thereby more stably expressing the black pixels of the screening pattern 512.

According to the description above, black pixels are expressed by only using light-emitting elements in light-emitting element rows that are central, but this is not a limitation.

For example, among light-emitting element rows that are at an extreme in the sub scanning direction, in the case of black pixels being expressed by light-emitting elements in one of the light-emitting element rows and not by light-emitting elements in the other of the light-emitting element rows, a configuration can be adopted that rewrites pattern data. According to this configuration, the effect of suppressing variation in concentration of black pixels due to lens properties of the rod-lens array 62 is diminished, but the effect of suppression is still greater than when black pixels are expressed by the light-emitting element rows at both extremes in the sub scanning direction.

According to this configuration, in step S42, when (Pb+Pw)/G is a unit fraction, processing is executed to proceed to step S43.

Figure 36:
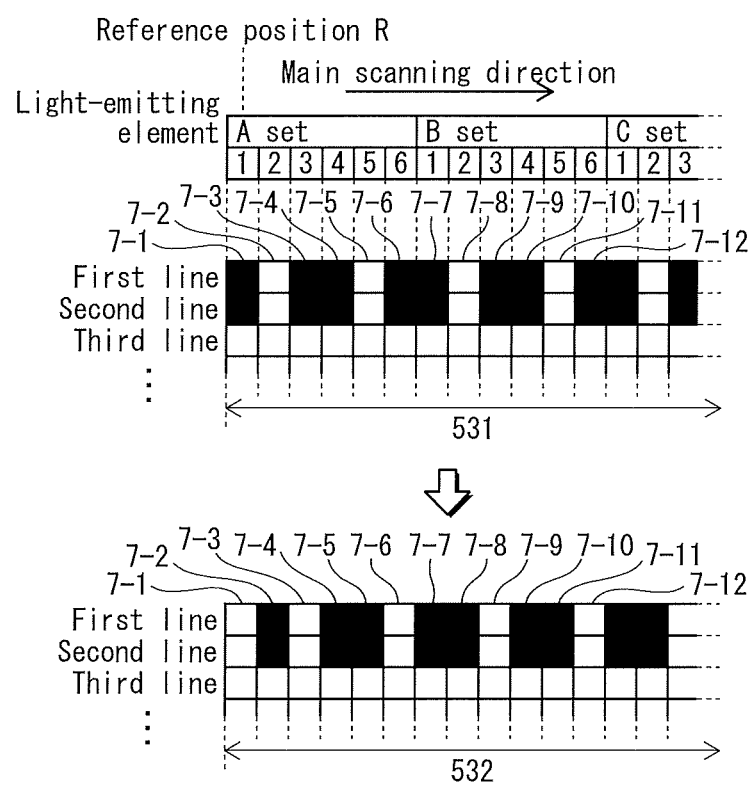
FIG. 36 shows an example of screening patterns pertaining to another modification.

For example, when G=6, and, for each main scanning line, one black pixel 7-1 is followed by one white pixel 7-2, two black pixels 7-3, 7-4, one white pixel 7-5, two black pixels 7-6, 7-7 . . . , as shown in a screening pattern 531 in FIG. 36, the black pixels 7-1, 7-6, 7-7, 7-12 . . . are expressed by the light-emitting elements A1, A6, B1, B6, C1 . . . , which are easily affected by variation in light intensity distribution due to lens properties of the rod-lens array 62.

In the screening pattern 531, Pb=2, Pw=1, and therefore (Pb+Pw)/G is ½, and Pb is equal to or less than (G−2), satisfying those conditions.

In this case, as in a screening pattern 532, for each main scanning line, pixel 7-1 is white, pixel 7-2 is black, pixel 7-3 is white, pixels 7-4, 7-5 are black, pixel 7-6 is white, pixel 7-7 is black . . . , so pixel values are rewritten without changing pattern cycle, changing pixels 7-1, 7-6, 7-12 from black pixels to white pixels.

Thus, compared with the screening pattern 531, the screening pattern 532 reduces by half the number of black pixels expressed by light-emitting elements that are easily affected by variation in light intensity distribution due to lens properties of the rod-lens array 62.

Further, Embodiments 4 and 5 can be combined.

Figure 37A:
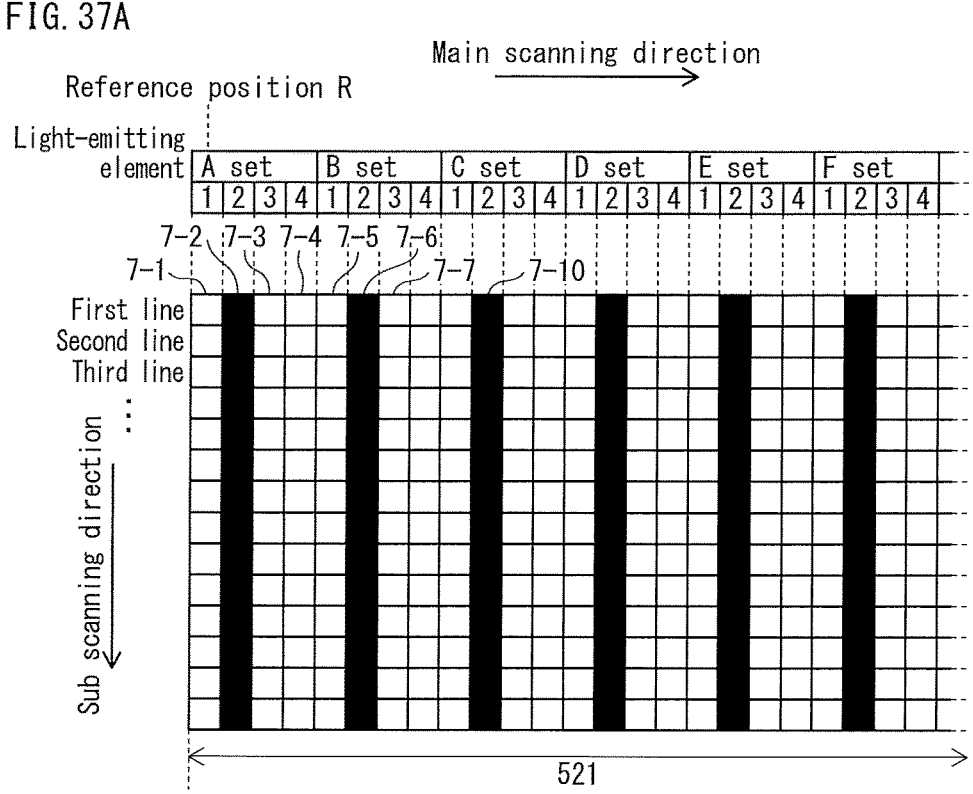
FIG. 37A and FIG. 37B show examples of screening patterns pertaining to another modification.

That is, as in screening pattern 521 shown in FIG. 37A, when a pattern is such that one black pixel and 3 white pixels repeat in the main scanning direction, Pb=1, Pw=3, (Pb+Pw) is an integer multiple of G (G=4), and Pb is equal to or less than (G−2), satisfying these conditions.

In the screening pattern 521, light-emitting elements for expressing black pixels 7-2, 7-6, 7-10 . . . are the light-emitting elements A2, B2, C2 . . . , which are central and not easily influenced by variation in light intensity distribution due to lens properties of the rod-lens array 62. However, when the light-emitting elements A2, B2, C2 . . . emit light whenever the screening pattern 521 is generated, the cumulative light emission time of these light-emitting elements becomes greater than that of other light-emitting elements, incurring a risk of a shorter lifespan for these light-emitting elements.

However, a configuration can be used in which elements that emit light are switched by changing the screening extension start point Z every predefined period (for example, when the cumulative print count Pb reaches a multiple of 1000), as in Embodiment 4.

Figure 37B:
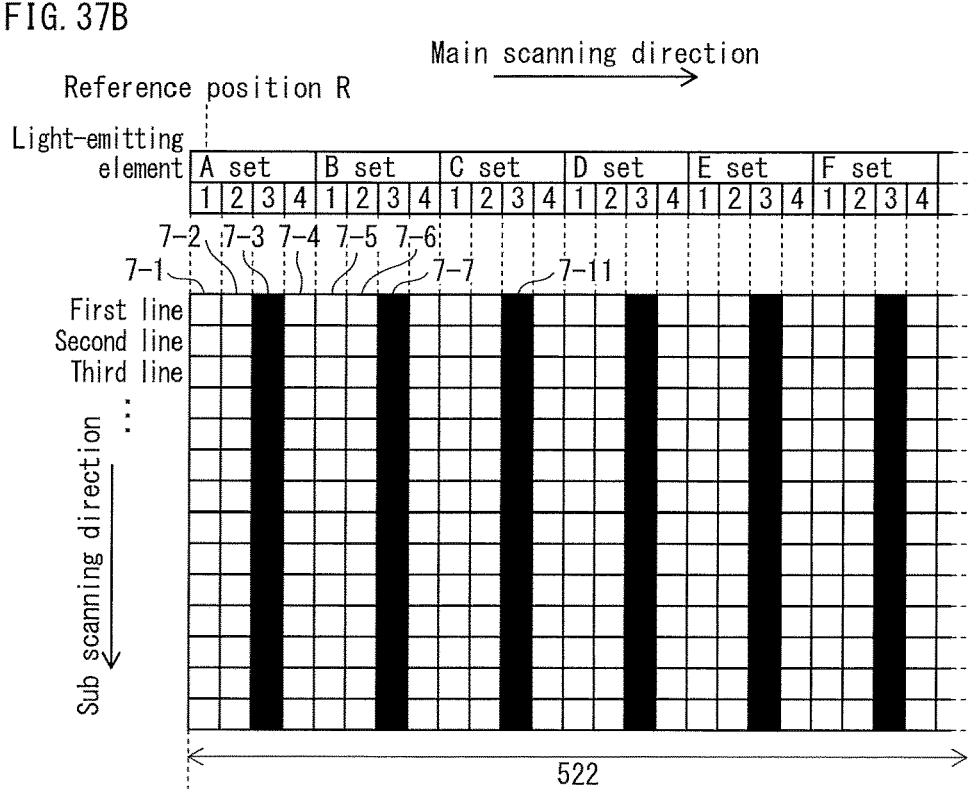

More specifically, a screening pattern 522 as shown in FIG. 37B can be generated.

The screening pattern 522 corresponds to a pattern of the screening pattern 521 collectively shifted one pixel in the main scanning direction, with the same cycle F as the screening pattern 521. In the screening pattern 522, light-emitting elements for expressing black pixels 7-3, 7-7, 7-11 . . . are the light-emitting elements A3, B3, C3 . . . , which are central and not easily influenced by variation in light intensity distribution due to lens properties of the rod-lens array 62.

According to a configuration that switches between the screening pattern 521 and the screening pattern 522 each defined period, light-emitting elements A2, A3, B2, B3 . . . , which are central, have evened out cumulative light emission times, and variation in concentration of black pixels is suppressed by use of screening patterns using light-emitting elements in central light-emitting element rows, which are less easily affected by variation in light intensity distribution due to lens properties of the rod-lens array 62.

The present invention is not limited to optical writing devices and image forming devices, and may be a method of generating a screening pattern that expresses an image as a dithered image by application of screening processing in an optical writing device that writes to a photoreceptor by using a light beam.

Further, the method may be a program executed by a computer. Furthermore, a program pertaining to the present invention can be stored on any kind of computer-readable storage medium, such as magnetic tape, flexible disk, magnetic disk, DVD-ROM, DVD-RAM, CD-ROM, CD-R, MO, PD, etc., and may be generated or on or transferred by the storage medium, and can be supplied or transmitted via wired and wireless networks including the internet, broadcasting, electronic communication circuitry, satellite transmission, etc.

Modifications

Description is provided based on embodiments of the present invention, but the present invention is not limited to the embodiments described, and the following modifications are possible.

(1) According to the embodiments, the screening pattern 111 shown in FIG. 16, the screening patterns 201, 202 shown in FIG. 25A, 25B, etc., are described as examples of screening patterns, but screening patterns are not limited to these examples.

Figure 38:
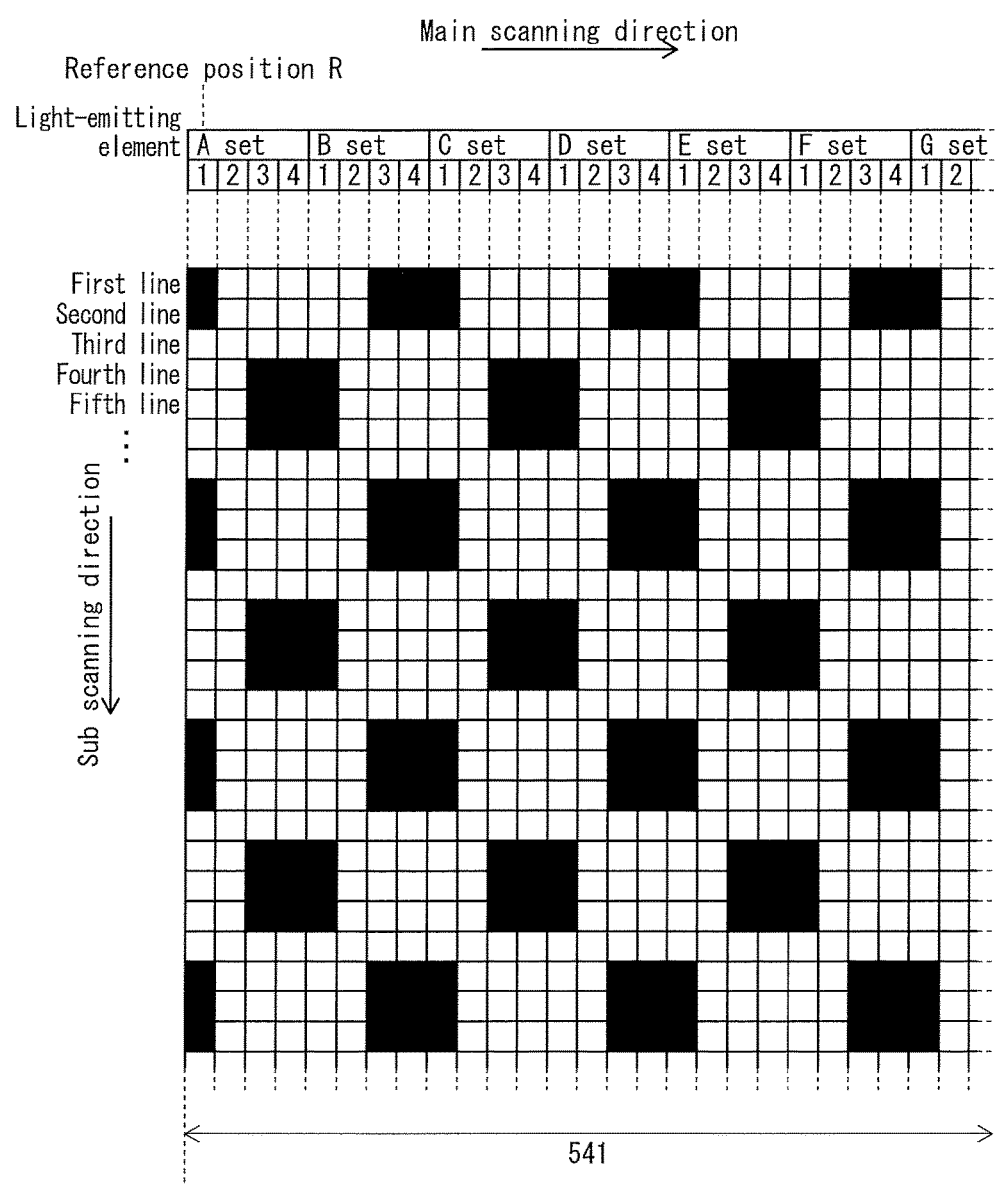
FIG. 38 shows an example of a screening pattern pertaining to a modification.
Figure 39:
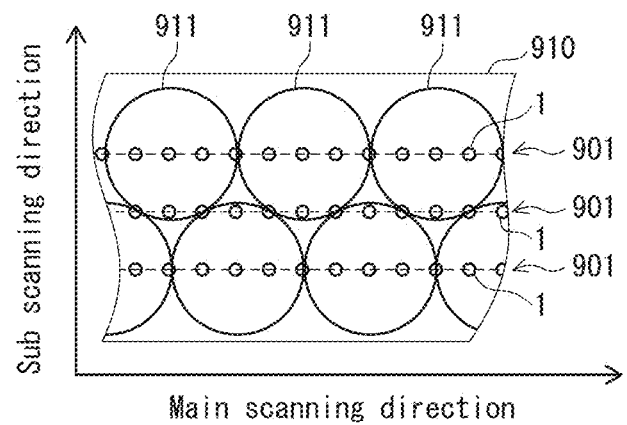
FIG. 39 is a schematic plan view showing a positional relationship of conventional light-emitting elements and a rod-lens array when the light-emitting elements are viewed through the rod-lens array from a photoreceptor side.

For example, the present invention is applicable when a screening pattern 541 shown in FIG. 38 is generated. That is, regardless of a change in the write start position X, the screening extension start point Z is fixed to corresponding to the light-emitting element A1, as in Embodiment 1, for example. Further, position can be changed to reduce comparison processing load, as in Embodiment 2. Thus, suppression of variation of concentration of pixels of a screening pattern can be achieved before and after a change in the write start position X.

(2) According to the embodiments, an optical writing device writes a K color image to the photoreceptor drum 11 by using light beams from a plurality of light-emitting elements, and the image processor 55 includes a screening processor 57K and an output unit 58K, the imaging unit 10K including an exposure unit 13. However, this is just an example. Another example is a configuration in which the imaging unit 10K includes the screening processor 57K, the output unit 58K, and the exposure unit 13. The same is true for the other imaging units 10Y, 10M, 10C.

(3) According to the embodiments, the reference position in the main scanning direction of the light-emitting element array 100 is described as corresponding to the light-emitting element A1, but this is not a limitation. For example, a configuration can be adopted that changes a corresponding pixel according to size of a sheet S used.

More specifically, this can be applied in the case of a configuration that uses all of the light-emitting elements 1 when the sheet S is a large size, and uses a specified plurality of the light-emitting elements 1 that are centrally-disposed in the main scanning direction among all of the light-emitting elements 1 when the sheet S is a small size. When the sheet S is a small size, the light-emitting element 1 disposed furthest upstream in the main scanning direction among the specified plurality of the light-emitting elements 1 corresponds to the reference position. The write start position X is determined in the main scanning direction of the photoreceptor drum 11 with respect to this reference position.

(4) According to the embodiments, an example is described of a case in which the write start position X is changed by image stabilization operation, but this is not a limitation.

For example, the present invention can be applied to cases such as input operations that indicate a change in position of the write start position X in the main scanning direction according to user instructions, or more specifically a preference inputted from an operation panel by a user.

(5) According to the embodiments, a configuration is described in which a plurality of light-emitting elements are arranged in a zigzag pattern in the main scanning direction, but this is not a limitation. For example, the present invention can be applied to a configuration in which a plurality of light-emitting elements are disposed in a single light-emitting element row in a line along the main scanning direction. Further, the light-emitting elements are described as OLEDs, but the present invention is not limited to this example, and is applicable to a configuration in which LEDs, for example, are used as the light-emitting elements.

(6) According to the embodiments, a configuration is described that uses the rod-lens array 62 as an optical lens that focuses light beams L emitted from the light-emitting elements onto a photoreceptor, but this is not a limitation. Any lens array can be used, such as a microlens array, that transmits therethrough light beams from a plurality of light-emitting elements to focus on different positions of a photoreceptor, and for which optical properties such as refractive index and light collecting are not necessarily exactly the same for each different position.

(7) According to the embodiments, a configuration is described that uses a color printer as the optical writing device, but this is not a limitation. A monochrome printer can be used.

Further, the present invention is not limited to a printer, and can be applied to an optical writing device used in an image forming device such as a photocopier or multi-function peripheral (MFP) that includes a photoreceptor such as the photoreceptor drum 11 to which an image such as an electrostatic latent image is written by using the light beams L. Further, without being limited to image forming devices, the present invention can be applied generally to optical writing devices that write to photoreceptors by using light beams L.

Further, the content of the embodiments and the modifications can be combined in any possible combination.

Summary

Content of the embodiments and the modifications illustrates one aspect of the present invention for solving the technical problem described under the heading "(2) RELATED ART", and a summary of the embodiments and modifications is provided below.

An optical writing device pertaining to one aspect of the present invention is an optical writing device that drives a light-emitting element array of light-emitting elements, modulating light emitted therefrom according to a screening pattern that expresses an image as a dithered image, the optical writing device performing optical writing by focusing light emitted from the light-emitting element array through a lens array onto a surface of a photoreceptor, the optical writing device comprising: an acquisition unit that acquires a write start position for writing to the photoreceptor in a main scanning direction; and a control unit that performs a control when the write start position corresponds to an i-th light-emitting element of the light-emitting element array, counting from a reference position that corresponds to a first light-emitting element in ascending numerical order of the light-emitting elements in the main scanning direction, i being a positive integer greater than 1, wherein the control unit supplies pixel values to the i-th light-emitting element onwards, the pixel values being assigned from pixels of the screening pattern from an i-th pixel onwards, counting from a leading pixel in ascending numerical order of the screening pattern in the main scanning direction.

The optical writing device preferably further comprises: a storage unit storing the screening pattern, wherein the control unit reads the pixel values from the screening pattern stored in the storage unit.

The optical writing device is preferably configured so the control unit includes a screening processor that uses a threshold matrix of a plurality of thresholds in a two-dimensional array, corresponding to the main scanning direction and a sub-scanning direction, to compare each pixel of the image to a corresponding threshold in the threshold matrix, the screening processor generating the screening pattern based on results of the comparison.

The optical writing device is preferably configured so the control unit includes a storage in which a plurality of pixel storage regions are arranged in a two-dimensional array, corresponding to the main scanning direction and the sub-scanning direction, wherein pixels of the image from a pixel at a lead position of the image onwards in a sequence of ascending numerical order in the main scanning direction are stored in the pixel storage regions from each i-th pixel storage region onwards, counting from first pixel storage regions in ascending numerical order of the pixel storage regions in the main scanning direction, and the screening processor executes the comparison from the first pixel storage regions onwards in the sequence of the pixel storage regions.

The optical writing device is preferably configured so a plurality of light-emitting elements of the light-emitting element array are disposed in a staggered arrangement along the main scanning direction, and the screening processor executes the comparison from each i-th pixel storage region onwards when i is equal to U, where U is equal to 1 plus a common multiple of G and H, G is the number of light-emitting elements in one set of light-emitting elements in different positions in the sub-scanning direction of the light-emitting elements in the staggered arrangement, and H is the number of pixels in a repeating cycle of concentration changes of the screening pattern in the main scanning direction.

The optical writing device is preferably configured so the screening processor executes the comparison from each j-th pixel storage region onwards when i is not equal to U, where j is equal to a value of U that is closest to i among values of U less than i.

The optical writing device is preferably configured so a plurality of light-emitting elements of the light-emitting element array are disposed in a staggered arrangement in which each light-emitting element is disposed at a position in the main scanning direction that is different from a position in the main scanning direction of any other one of the plurality of light-emitting elements, two or more of the plurality of light-emitting elements arranged in a line in the main scanning direction constitute a light-emitting element row, and three or more of the light-emitting element rows are disposed along the sub-scanning direction, the screening processor includes a judgment unit that, after the screening pattern is generated and before the control is performed, when light-emitting elements included in light-emitting element rows at either extreme in the sub-scanning direction among the three or more light-emitting element rows are to emit light, judges whether or not a second screening pattern can be used to write to the photoreceptor by using light-emitting elements included in light-emitting element rows other than one of the light-emitting element rows at either extreme in the sub-scanning direction, the second screening pattern having the same cycle in the main scanning direction as the screening pattern, and when the judgment unit makes an affirmative judgment, the screening processor performs a process of changing to the second screening pattern by collectively shifting pixel values of pixels of the screening pattern along the main scanning direction before the control is performed.

The optical writing device is preferably configured so the screening pattern is a pattern of a row of Pb pixels in the main scanning direction corresponding to light-emitting elements that emit light and a row of Pw pixels in the main scanning direction corresponding to light-emitting elements that do not emit light, repeating alternately, and G is the number of light-emitting elements in one set of light-emitting elements in different positions in the sub-scanning direction of the light-emitting elements in the staggered arrangement, and the judgment unit makes an affirmative judgment when Pb+Pw is an integer multiple of G and/or (Pb+Pw)/G is a unit fraction.

The optical writing device is preferably configured so the control unit acquires information indicating a cumulative light emission time of the light-emitting element array, and based on the information acquired, when the control unit judges that the cumulative light emission time reaches a predefined time, the control unit uses another screening pattern that has a different phase from the screening pattern but has an identical cycle of concentration changes in the main scanning direction as the screening pattern.

The optical writing device is preferably configured so the lens array is a rod-lens array or a microlens array.

The optical writing device is preferably configured so each of the light-emitting elements in the light-emitting element array is an organic EL element.

An image forming device that pertains to another aspect of the present invention is an image forming device that writes an image to a photoreceptor by using a light beam from an optical writing unit, the optical writing unit driving a light-emitting element array of light-emitting elements, modulating light emitted therefrom according to a screening pattern that expresses an image as a dithered image, and performing optical writing by focusing light emitted from the light-emitting element array through a lens array onto a surface of a photoreceptor, the optical writing unit comprising: an acquisition unit that acquires a write start position for writing to the photoreceptor in a main scanning direction; and a control unit that performs a control when the write start position corresponds to an i-th light-emitting element of the light-emitting element array, counting from a reference position that corresponds to a first light-emitting element in ascending numerical order of the light-emitting elements in the main scanning direction, i being a positive integer greater than 1, wherein the control unit supplies pixel values to the i-th light-emitting element onwards, the pixel values being assigned from pixels of the screening pattern from an i-th pixel onwards, counting from a leading pixel in ascending numerical order of the screening pattern in the main scanning direction.

According to the configurations above, different light-emitting elements are not used for the same pixels in a screening pattern before and after a change in write start position in the main scanning direction, and therefore occurrence of variation in concentration in the screening pattern is prevented.

Although the present invention has been described and illustrated in detail, it is clearly understood that the same is by way of illustration and example only and is not to be taken by way of limitation, the scope of the present invention being interpreted by terms of the appended claims.

What is claimed is:

1. An optical writing device that drives a light-emitting element array of light-emitting elements, modulating light emitted therefrom according to a screening pattern that expresses an image as a dithered image, the optical writing device performing optical writing by focusing light emitted from the light-emitting element array through a lens array onto a surface of a photoreceptor, the optical writing device comprising:
    a screening processor configured to acquire a write start position for writing to the photoreceptor in a main scanning direction; and
    a hardware processor configured to perform a control when the write start position corresponds to an i-th light-emitting element of the light-emitting element array, counting from a reference position that corresponds to a first light-emitting element in ascending numerical order of the light-emitting elements in the main scanning direction, i being a positive integer greater than 1, wherein the control unit supplies pixel values to the i-th light-emitting element onwards, the pixel values being assigned from pixels of the screening pattern from an i-th pixel onwards, counting from a leading pixel in ascending numerical order of the screening pattern in the main scanning direction.

2. The optical writing device of claim 1, further comprising:
    a storage unit storing the screening pattern, wherein
    the hardware processor reads the pixel values from the screening pattern stored in the storage unit.

3. The optical writing device of claim 1, wherein
    the screening processor is further configured to use a threshold matrix of a plurality of thresholds in a two-dimensional array, corresponding to the main scanning direction and a sub-scanning direction, to compare each pixel of the image to a corresponding threshold in the threshold matrix, the screening processor generating the screening pattern based on results of the comparison.

4. The optical writing device of claim 3, wherein
    the hardware processor includes a storage in which a plurality of pixel storage regions are arranged in a two-dimensional array, corresponding to the main scanning direction and the sub-scanning direction, wherein
    pixels of the image from a pixel at a lead position of the image onwards in a sequence of ascending numerical order in the main scanning direction are stored in the pixel storage regions from each i-th pixel storage region onwards, counting from first pixel storage regions in ascending numerical order of the pixel storage regions in the main scanning direction, and
    the screening processor executes the comparison from the first pixel storage regions onwards in the sequence of the pixel storage regions.

5. The optical writing device of claim 4, wherein
    a plurality of light-emitting elements of the light-emitting element array are disposed in a staggered arrangement along the main scanning direction, and
    the screening processor executes the comparison from each i-th pixel storage region onwards when i is equal to U, where U is equal to 1 plus a common multiple of G and H, G is the number of light-emitting elements in one set of light-emitting elements in different positions in the sub-scanning direction of the light-emitting elements in the staggered arrangement, and H is the number of pixels in a repeating cycle of concentration changes of the screening pattern in the main scanning direction.

6. The optical writing device of claim 5, wherein
    the screening processor executes the comparison from each j-th pixel storage region onwards when i is not equal to U, where j is equal to a value of U that is closest to i among values of U less than i.

7. The optical writing device of claim 3, wherein
a plurality of light-emitting elements of the light-emitting element array are disposed in a staggered arrangement in which each light-emitting element is disposed at a position in the main scanning direction that is different from a position in the main scanning direction of any other one of the plurality of light-emitting elements, two or more of the plurality of light-emitting elements arranged in a line in the main scanning direction constitute a light-emitting element row, and three or more of the light-emitting element rows are disposed along the sub-scanning direction,
the screening processor is further configured to, after the screening pattern is generated and before the control is performed, when light-emitting elements included in light-emitting element rows at either extreme in the sub-scanning direction among the three or more light-emitting element rows are to emit light, judge whether or not a second screening pattern can be used to write to the photoreceptor by using light-emitting elements included in light-emitting element rows other than one of the light-emitting element rows at either extreme in the sub-scanning direction, the second screening pattern having the same cycle in the main scanning direction as the screening pattern, and
when screening processor makes an affirmative judgment, the screening processor performs a process of changing to the second screening pattern by collectively shifting pixel values of pixels of the screening pattern along the main scanning direction before the control is performed.

8. The optical writing device of claim 7, wherein
the screening pattern is a pattern of a row of Pb pixels in the main scanning direction corresponding to light-emitting elements that emit light and a row of Pw pixels in the main scanning direction corresponding to light-emitting elements that do not emit light, repeating alternately, and G is the number of light-emitting elements in one set of light-emitting elements in different positions in the sub-scanning direction of the light-emitting elements in the staggered arrangement, and
the screening processor makes an affirmative judgment when Pb+Pw is an integer multiple of G and/or (Pb+Pw)/G is a unit fraction.

9. The optical writing device of claim 1, wherein
the hardware processor acquires information indicating a cumulative light emission time of the light-emitting element array, and
based on the information acquired, when the hardware processor judges that the cumulative light emission time reaches a predefined time, the hardware processor uses another screening pattern that has a different phase from the screening pattern but has an identical cycle of concentration changes in the main scanning direction as the screening pattern.

10. The optical writing device of claim 1, wherein
the lens array is a rod-lens array or a microlens array.

11. The optical writing device of claim 1, wherein
each of the light-emitting elements in the light-emitting element array is an organic EL element.

12. An image forming device that writes an image to a photoreceptor by using a light beam from an optical writing unit, the optical writing unit driving a light-emitting element array of light-emitting elements, modulating light emitted therefrom according to a screening pattern that expresses an image as a dithered image, and performing optical writing by focusing light emitted from the light-emitting element array through a lens array onto a surface of a photoreceptor, the optical writing unit comprising:
a screening processor configured to acquire a write start position for writing to the photoreceptor in a main scanning direction; and
a hardware processor configured to perform a control when the write start position corresponds to an i-th light-emitting element of the light-emitting element array, counting from a reference position that corresponds to a first light-emitting element in ascending numerical order of the light-emitting elements in the main scanning direction, i being a positive integer greater than 1, wherein the hardware processor supplies pixel values to the i-th light-emitting element onwards, the pixel values being assigned from pixels of the screening pattern from an i-th pixel onwards, counting from a leading pixel in ascending numerical order of the screening pattern in the main scanning direction.

* * * * *